(12) United States Patent
Phillips et al.

(10) Patent No.: US 11,741,427 B2
(45) Date of Patent: Aug. 29, 2023

(54) MONITORING REMOVAL AND REPLACEMENT OF TOOLS WITHIN AN INVENTORY CONTROL SYSTEM

(71) Applicant: Snap-On Incorporated, Kenosha, WI (US)

(72) Inventors: Preston Phillips, Conway, AR (US); David C. Fly, Maumelle, AR (US); Matthew J. Lipsey, Sherwood, AR (US); Joseph Chwan, Mechanicsburg, PA (US); Frederick J. Rogers, North Little Rock, AR (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 17/670,285

(22) Filed: Feb. 11, 2022

(65) Prior Publication Data

US 2022/0165109 A1 May 26, 2022

Related U.S. Application Data

(63) Continuation of application No. 16/199,792, filed on Nov. 26, 2018, now Pat. No. 11,270,540, which is a
(Continued)

(51) Int. Cl.
*B25H 3/02* (2006.01)
*G06Q 10/087* (2023.01)
(Continued)

(52) U.S. Cl.
CPC ............ *G06Q 10/087* (2013.01); *B25H 3/00* (2013.01); *B25H 3/028* (2013.01); *G06F 3/0486* (2013.01);
(Continued)

(58) Field of Classification Search
CPC ............ G07C 9/00912; G07C 9/00031; G07C 9/00039; G07C 9/00111; G07C 9/00896;
(Continued)

(56) References Cited

U.S. PATENT DOCUMENTS

| | | |
|---|---|---|
| 5,205,436 A | 4/1993 | Savage |
| 5,591,956 A | 1/1997 | Longacre et al. |

(Continued)

FOREIGN PATENT DOCUMENTS

| | | |
|---|---|---|
| CN | 101170683 A | 4/2008 |
| CN | 101170683 A | 4/2008 |

(Continued)

OTHER PUBLICATIONS

Chinese Nat'l. IP Administration—Office Action dated Dec. 2, 2016, in related Chinese Patent Application No. 201380039633.7, with English translation, 13 pgs.
(Continued)

*Primary Examiner* — Nay Tun
(74) *Attorney, Agent, or Firm* — McDermott Will & Emery LLP

(57) ABSTRACT

An inventory control system is described that includes a tool storage device including a drawer or a tray providing a pallet, wherein the pallet includes storage locations for objects; a sensing device configured to form an image of the storage locations; and a data processor configured to determine presence or absence of the pallet and presence or absence of objects within the storage locations of the pallet using the information from the image.

20 Claims, 27 Drawing Sheets

Related U.S. Application Data continuation of application No. 15/720,726, filed on Sep. 29, 2017, now Pat. No. 10,347,066, which is a continuation of application No. 13/916,192, filed on Jun. 12, 2013, now Pat. No. 9,811,962.

(60) Provisional application No. 61/658,729, filed on Jun. 12, 2012.

(51) Int. Cl.

| | | |
|---|---|---|
| *G06F 3/0486* | (2013.01) | |
| *B25H 3/00* | (2006.01) | |
| *G07C 9/22* | (2020.01) | |
| *G07C 9/23* | (2020.01) | |
| *G07C 9/28* | (2020.01) | |
| *G06V 20/52* | (2022.01) | |
| *G07C 9/00* | (2020.01) | |
| *A47F 3/02* | (2006.01) | |
| *G06F 18/213* | (2023.01) | |

(52) U.S. Cl.
CPC ......... *G06V 20/52* (2022.01); *G07C 9/00912* (2013.01); *G07C 9/22* (2020.01); *G07C 9/23* (2020.01); *G07C 9/28* (2020.01); *A47F 3/02* (2013.01); *G06F 18/213* (2023.01); *G07C 9/00896* (2013.01)

(58) Field of Classification Search
CPC ... G07C 9/22; G07C 9/23; G07C 9/28; B25H 3/00; B25H 3/028; G06F 3/0486; G06F 18/213; G06K 9/00771; G06K 9/46; G06K 9/4671; G06K 9/52; G06K 9/6212; G06K 9/6232; G06Q 10/087; A47F 3/02; G06V 20/52
See application file for complete search history.

(56) References Cited

U.S. PATENT DOCUMENTS

| | | | |
|---|---|---|---|
| 5,725,096 A | 3/1998 | Winnard | |
| 6,112,502 A | 9/2000 | Frederick | |
| 6,568,593 B2 | 5/2003 | Hetzer | |
| 6,707,381 B1 | 3/2004 | Maloney | |
| 6,744,436 B1 | 6/2004 | Chirieleison, Jr. et al. | |
| 6,801,820 B1 | 10/2004 | Lilly et al. | |
| 6,840,451 B2 | 1/2005 | Allen | |
| 6,915,952 B1 | 7/2005 | Allen | |
| 6,989,749 B2 | 1/2006 | Mohr | |
| 7,109,864 B2 | 9/2006 | Maloney | |
| 7,336,174 B1 | 2/2008 | Maloney | |
| 7,743,391 B2 | 6/2010 | Balaji et al. | |
| 7,932,824 B2 | 4/2011 | Flores | |
| 7,942,321 B2 | 5/2011 | Linton et al. | |
| 7,956,847 B2 | 6/2011 | Christie | |
| 7,965,190 B2 | 6/2011 | Maloney | |
| 8,036,939 B2 | 10/2011 | Gil et al. | |
| 8,438,084 B1 | 5/2013 | Tesler et al. | |
| 8,577,136 B1 | 11/2013 | Ascher et al. | |
| 2001/0025503 A1 | 2/2001 | Weaver | |
| 2001/0029892 A1 | 10/2001 | Cook et al. | |
| 2002/0129769 A1 | 9/2002 | Kim et al. | |
| 2002/0143672 A1 | 10/2002 | Sawasaki | |
| 2002/0178013 A1 | 11/2002 | Hoffman et al. | |
| 2003/0095710 A1 | 5/2003 | Tessadro | |
| 2003/0102970 A1 | 6/2003 | Creel et al. | |
| 2003/0154141 A1 | 8/2003 | Capazario et al. | |
| 2004/0046020 A1 | 3/2004 | Andreasson et al. | |
| 2004/0104652 A1 | 6/2004 | Holmes et al. | |
| 2004/0220692 A1 | 11/2004 | Shenefelt et al. | |
| 2005/0117053 A1 | 6/2005 | Houmeau et al. | |
| 2005/0137943 A1 | 6/2005 | Holzman | |
| 2005/0192702 A1 | 9/2005 | Moutsokapas | |
| 2006/0015414 A1 | 1/2006 | Congram et al. | |
| 2006/0271222 A1 | 11/2006 | Lilly | |
| 2007/0023193 A1 | 2/2007 | King | |
| 2007/0102505 A1 | 5/2007 | Yokota et al. | |
| 2007/0108273 A1 | 5/2007 | Harper et al. | |
| 2007/0177045 A1 | 8/2007 | Karasawa | |
| 2007/0182818 A1 | 8/2007 | Buehler | |
| 2007/0188615 A1 | 8/2007 | Beniyama et al. | |
| 2007/0237369 A1 | 10/2007 | Brunner et al. | |
| 2008/0059338 A1 | 3/2008 | Hubbard | |
| 2008/0077510 A1 | 3/2008 | Dielemans | |
| 2008/0087725 A1* | 4/2008 | Liu ..................... | G06Q 10/087 235/385 |
| 2008/0088454 A1 | 4/2008 | Flores et al. | |
| 2008/0117053 A1 | 5/2008 | Maloney | |
| 2008/0303904 A1 | 12/2008 | Hsieh | |
| 2008/0309583 A1 | 12/2008 | Hsieh | |
| 2008/0313058 A1 | 12/2008 | Budnik | |
| 2009/0030950 A1 | 1/2009 | Maneval | |
| 2009/0060349 A1 | 3/2009 | Linaker et al. | |
| 2009/0063306 A1 | 3/2009 | Fano et al. | |
| 2009/0072029 A1 | 3/2009 | Martin | |
| 2009/0109004 A1 | 4/2009 | Van Alstyne | |
| 2009/0150022 A1 | 6/2009 | McMillin et al. | |
| 2009/0155941 A1 | 6/2009 | Konuma et al. | |
| 2009/0178616 A1 | 7/2009 | Byun | |
| 2009/0208198 A1 | 8/2009 | Khuntia | |
| 2009/0288604 A1 | 11/2009 | Kim | |
| 2010/0039513 A1 | 2/2010 | Glickman et al. | |
| 2010/0039682 A1 | 2/2010 | Poet et al. | |
| 2010/0045423 A1 | 2/2010 | Glickman et al. | |
| 2010/0046791 A1 | 2/2010 | Glickman et al. | |
| 2010/0070365 A1 | 3/2010 | Siotia et al. | |
| 2010/0111411 A1 | 5/2010 | Ernst et al. | |
| 2010/0121482 A1 | 5/2010 | Jackson et al. | |
| 2010/0179890 A1 | 7/2010 | Cianciotto, Jr. et al. | |
| 2010/0205044 A1 | 8/2010 | Scheer | |
| 2010/0252626 A1 | 10/2010 | Elizondo et al. | |
| 2010/0271479 A1 | 10/2010 | Heydlauf | |
| 2010/0307416 A1 | 12/2010 | Park et al. | |
| 2010/0312859 A1 | 12/2010 | Lev et al. | |
| 2011/0025503 A1 | 2/2011 | Weaver | |
| 2011/0121699 A1 | 5/2011 | Freimuth | |
| 2011/0153614 A1 | 6/2011 | Solomon | |
| 2011/0157357 A1 | 6/2011 | Weisensale et al. | |
| 2011/0202170 A1 | 8/2011 | Dawes et al. | |
| 2011/0249086 A1 | 10/2011 | Guo et al. | |
| 2011/0307783 A1 | 12/2011 | Robert et al. | |
| 2012/0026284 A1 | 2/2012 | Watanabe | |
| 2012/0038775 A1 | 2/2012 | Prieterjahn et al. | |
| 2012/0074227 A1 | 3/2012 | Ferren et al. | |
| 2012/0173679 A1 | 7/2012 | Li | |
| 2012/0271742 A1 | 10/2012 | Solomon | |
| 2012/0327222 A1 | 12/2012 | Nagamachi | |
| 2013/0051611 A1* | 2/2013 | Hicks ................. | G06Q 10/0875 382/103 |
| 2013/0070090 A1 | 3/2013 | Bufalini et al. | |
| 2013/0201002 A1 | 8/2013 | Wollin | |
| 2013/0232039 A1 | 12/2013 | Jackson et al. | |
| 2013/0346261 A1* | 12/2013 | Phillips .................. | G06V 10/40 705/28 |
| 2014/0032694 A1 | 1/2014 | Cohn et al. | |
| 2014/0039679 A1 | 2/2014 | Ando | |
| 2014/0129395 A1 | 5/2014 | Groenovelt et al. | |
| 2014/0160315 A1 | 6/2014 | Gallagher et al. | |
| 2014/0258165 A1 | 9/2014 | Heil | |
| 2015/0095317 A1 | 4/2015 | Tays | |
| 2015/0201166 A1 | 7/2015 | Glickman et al. | |
| 2015/0244992 A1 | 8/2015 | Beuhler | |
| 2018/0093814 A1 | 4/2018 | Espinosa | |

FOREIGN PATENT DOCUMENTS

| | | |
|---|---|---|
| CN | 201291451 Y | 8/2009 |
| CN | 101883084 A | 11/2010 |
| CN | 101883084 A | 11/2010 |
| CN | 102165469 A | 8/2011 |
| CN | 102165469 A | 8/2011 |
| CN | 102177524 A | 9/2011 |
| EP | 1808275 A2 | 7/2007 |

(56) References Cited

FOREIGN PATENT DOCUMENTS

| GB | 2453977 A | 4/2009 |
|---|---|---|
| GB | 2480322 A | 11/2011 |
| WO | 2008-029159 A1 | 3/2008 |
| WO | 2009-027842 A2 | 3/2009 |
| WO | WO2009027842 A2 | 3/2009 |
| WO | 2009-053703 A2 | 4/2009 |
| WO | WO2009053703 A2 | 4/2009 |
| WO | 2010-017531 A1 | 2/2010 |
| WO | 2010017533 A2 | 2/2010 |
| WO | 2011-073678 A1 | 6/2011 |

OTHER PUBLICATIONS

Chinese Nat'l. IP Administration—Office Action dated Mar. 10, 2017, in related Chinese Patent Application No. 201380039710.9, with English translation, 35 pgs.
Chinese Nat'l. IP Administration—Office Action dated Jun. 14, 2018, in related Chinese Patent Application No. 201380039710.9, with English translation, 37 pgs.
Chinese Nat'l. IP Administration—Office Action dated Feb. 11, 2018, in related Chinese Patent Application No. 201380039670.8, with English translation, 27 pgs.
Chinese Nat'l. IP Administration—Office Action dated Jun. 29, 2021, in related Chinese Patent Application No. 201810319608.9, with English translation, 21 pgs.
European Patent Office—Extended European Search Report for related European Application No. 21165775.4 dated Jan. 26, 2022; 8 pgs.
European Patent Office—Extended European Search Report for related European Application No. 21206855.5 dated Jan. 26, 2022; 8 pgs.
European Patent Office—Extended European Search Report dated May 15, 2020 for related European Application No. 19214443.4; 8 pgs.
ISA/US—Int'l. Search Report dated Jun. 4, 2014 for related I.A. No. PCT/US2013/045469, 2 pgs.
ISA/US—Written Opinion dated Jun. 4, 2014 for related I.A. No. PCT/US2013/045469, 4 pgs.
Liu, et al., Study on Crossing Platform Idea for IP Intelligent Measuring and Control System Base on XML, Manufacturing Automation, vol. 28, No. 4, pp. 4-7. [English Abstract only].
CNIPA—Office Action dated Jun. 14, 2018 for related Chinese App. No. 201380039710.9, 37 pgs.
CNIPA—Office Action dated Feb. 11, 2018 for related Chinese Patent Application No. 201380039670.8, with English translation, 27 pgs.
Liu, et al., Study on Crossing Platform Idea for IP Intelligent Measuring and Control System Base on XML, Manufacturing Automation, vol. 28, No. 4, pp. 4-7. [Abstract only in English].

* cited by examiner

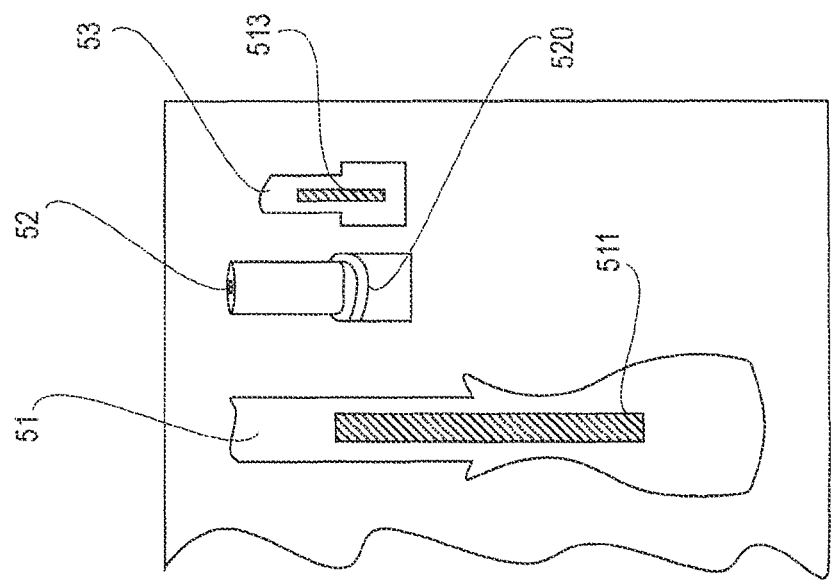
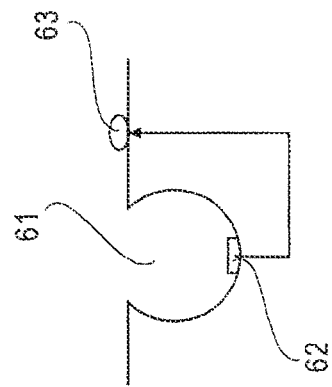
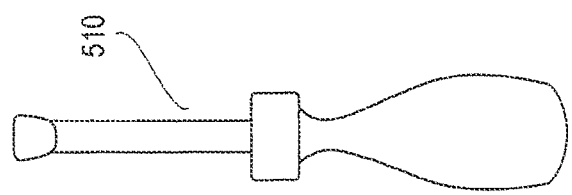
FIG. 5A
FIG. 5B

AUDIT TRACK

Audit Trail

| Date / Time | Employee Name |
|---|---|
| 7/31/2008 5:31:12 PM | Andy Mechanic |
| 7/31/2008 3:38:04 PM | Mike Gill |
| 7/31/2008 10:23:04 AM | David Jackson |
| 7/31/2008 9:14:04 AM | Joe Chwan |
| 7/31/2008 8:40:04 AM | Andy Mechanic |
| 7/30/2008 6:37:04 PM | David Jackson |
| 7/30/2008 1:59:04 PM | David Jackson |
| 7/30/2008 11:02:12 AM | Mike Gill |
| 7/30/2008 10:01:43 AM | Joe Chwan |
| 7/30/2008 9:45:24 AM | Mike Gill |
| 7/30/2008 9:28:16 AM | David Jackson |
| 7/30/2008 8:54:27 AM | Joe Chwan |
| 7/30/2008 7:31:18 AM | David Jackson |

FIG. 9A

MONITORING REMOVAL AND REPLACEMENT OF TOOLS WITHIN AN INVENTORY CONTROL SYSTEM

CLAIM OF PRIORITY AND CROSS REFERENCE TO RELATED APPLICATIONS

This application is a continuation of U.S. patent application Ser. No. 16/199,792 filed Nov. 26, 2018, which is a continuation of U.S. patent application Ser. No. 15/720,726, filed Sep. 29, 2017, now allowed as U.S. Pat. No. 10,347,066, which is a continuation of U.S. patent application Ser. No. 13/916,192, filed on Jun. 12, 2013, now allowed as U.S. Pat. No. 9,811,962, which claims the benefit of provisional patent application No. 61/658,729, filed Jun. 12, 2012, the entire contents of which are incorporated herein by reference.

This application is related to U.S. patent application Ser. No. 13/916,351 filed Jun. 12, 2013, which claims the benefit of provisional patent application No. 61/658,729, filed Jun. 12, 2012, each of which is owned by Applicant and is incorporated herein by reference and which is not admitted to be prior art with respect to the present invention by its mention in the cross-reference section.

BACKGROUND

When tools are used in a manufacturing or service environment, it is important that tools be returned to a storage unit, such as a tool box, after use. Employers typically perform a manual inventory check of the tool box to minimize or eliminate the problem of misplacement or theft of expensive tools. Companies can conduct random audits of employee's toolbox to prevent theft and monitor tool location.

Some industries have high standards for inventory control of tools, for preventing incidents of leaving tools in the workplace environment where they could cause severe damages. For the aerospace industry, it is important to ensure that no tools are accidentally left behind in an aircraft or missile being manufactured, assembled or repaired. The Aerospace Industries Association even establishes a standard called National Aerospace Standard including recommended procedures, personnel management and operations to reduce foreign object damage (FOD) to aerospace products. FOD is defined as any object not structurally part of the aircraft. The most common foreign objects found are nuts, bolts, safety wire, and hand tools. Inventory control over tools is critical to prevent tools from being left in an aircraft.

Some toolboxes try to build in inventory determination features to track inventory conditions of tools stored in those toolboxes. For example, some toolboxes dispose contact sensors, magnetic sensors or infrared sensors in or next to each tool storage locations, to detect whether a tool is placed in each tool storage location. Based on signals generated by the sensors, the toolboxes are able to determine whether any tools are missing. While this type of inventory check may be useful to some extents, it suffers from various drawbacks. For instance, if a sensor detects that something is occupying a storage location, the toolbox will determine that no tool is missing from that storage location. However, the toolbox does not know whether the right kind of tool is indeed placed back in the toolbox or it is just some objects placed in the storage location to cheat the system. Furthermore, disposing sensors for numerous storage locations in a toolbox is tedious and costly, and the large number of sensors is prone to damages or malfunctions which will produce false negative or positive alarms.

Accordingly, there is a need for an effective inventory control system to assist tracking and accounting for usage of tools, and whether they are properly put back after usage. To address these issues, automated tool control systems have been developed which determine an inventory condition of objects by capturing and processing images of storage locations that are used to store the objects. Such an exemplary tool storage system is described in U.S. patent application Ser. No. 12/484,127, filed Jun. 12, 2009, the entire disclosure of which is hereby incorporated by reference in its entirety.

Many industries today have high expectations for efficiency when purchasing electronic systems, including those systems designed to provide tool control and security. Aerospace industries are particularly interested in ensuring the users of those tools are aware of the calibration and inspection status of the tools. When tool status changes, Aerospace industries expect to be able to know and track these changes when they occur. Some toolboxes are capable of tracking user accesses to the tool storage unit, issue and return of tools, and reporting of this data. While these types of inventory check and reporting may be useful to some extent they may not fully take advantage of the capabilities of advancing electronic capabilities in today's automated tool control systems, especially those systems equipped with imaging capabilities. For instance, if a tool storage device contains multiple occurrences of the same tool in a drawer or tray and each of the identical tools is issued to a different user, one of the users returning the tool to the drawer or tray may not know to which storage location to return the issued tool.

As another example, if a tool is determined to be an incorrect tool for the storage location in the drawer, in those systems that do not employ imaging technology, there is no means to backtrack to determine exactly when and by whom the tool was placed there. But, in systems equipped with imaging technology, it is possible to view the audit images of the specific drawer or tray and determine how the incorrect tool event occurred by comparing time stamps and user data. This is a manual method and is time consuming.

Accordingly, an inventory control system is needed that can improve efficiencies and reduce time spent in identifying tool storage locations for issued tools to be returned, tools incorrectly issued to the user, tools due for calibration and inspection, tools out for calibrations and inspection, broken tools, lost tools, and to identify tool storage locations in simple tool searches.

Furthermore, inventory control systems can operate in their own network independent of other network systems or interfaces. However, many customers, especially the large aerospace industrial and government users may want to be able to communicate with the inventory control system. Accordingly, there is a need for an inventory control system that is fully compatible with local and global computer networks, such as Internet, to exchange information with remote computers and databases.

BRIEF DESCRIPTION OF THE DRAWINGS

The present disclosure is illustrated by way of example, and not by way of limitation, in the accompanying drawings, wherein elements having the same reference numeral designations represent like elements throughout and wherein:

FIGS. 5A and 5B are exemplary identifier designs for use in this disclosure;

FIGS. 9A-9D are illustrative images of an exemplary audit record and images taken during access to an exemplary system according to this disclosure;

DETAILED DESCRIPTIONS

Figure 1A:
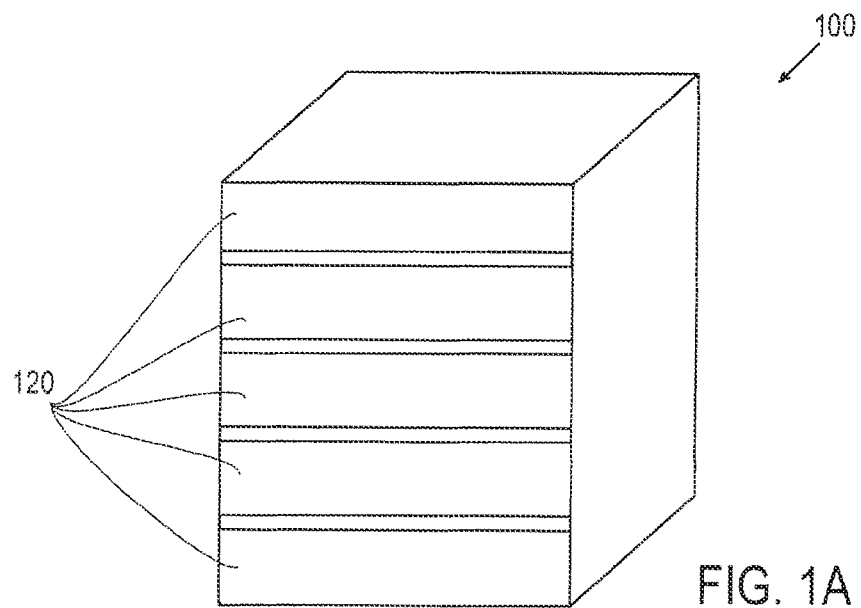
FIGS. 1A and 1B show exemplary storage units in which implementations according to this disclosure may be implemented.

In the following description, for the purposes of explanation, numerous specific details are set forth in order to provide a thorough understanding of the present disclosure. Specifically, operations of illustrative implementations that utilize machine vision to identify inventory conditions of a storage unit are described in the context of tool management and tool inventory control. It will be apparent, however, to one skilled in the art that concepts of the disclosure may be practiced or implemented without these specific details. Similar concepts may be utilized in other types of inventory control systems such as warehouse management, jewelry inventory management, sensitive or controlled substance management, mini bar inventory management, drug management, vault or security box management, etc. In other instances, well-known structures and devices are shown in block diagram form in order to avoid unnecessarily obscuring the present disclosure.

Inventory control systems have reason to track a range of data concerning the contents of the system. Inventory storage locations must be identified and located prior to an issue or return from stock. Certain inventory may have required maintenance procedures that must be performed at a particular date. This maintenance may include calibration, certification, inspection, lubrication, component replacement, complete replacement, diagnostic test, etc. Certain inventory may have a limited effective lifetime and require replacement after a given time period or a given number of uses. During the course of normal operations, certain inventory may be considered to be in an unusable state due to damage, malfunction, corrosion, contamination, etc. Certain inventory is considered consumable and it is desirable to track on-hand quantities to enable on demand replacement. It is desirable to track many aspects of the inventory issue and return process for accountability or efficiency purposes. Due to the large amount of data that can be associated with each item in the inventory control system, it is essential to have efficient means for recording and reporting the data.

According to this disclosure, an inventory control system for monitoring the removal and replacement of objects has at least one drawer or tray including storage locations for storing objects, and at least one image sensing device configured to form an image of the storage locations. The inventory control system also includes a data processor configured to receive information representing the image of the storage locations, and further configured to apply a visual contrast element to the image to indicate one of the objects is an item of interest.

When tools are used in a manufacturing or service environment, it is important that tools be returned to a storage unit, such as a tool box, after use. It is also important that full advantage be taken of the electronic capabilities of the system. These capabilities may include means and methods that improve user efficiency, enhance tool security, ensure that users are aware of tool calibration and inspection requirements, and that users are aware of specific tool status changes. Other capabilities disclosed in this disclosure ensure data is transferred between the electronic inventory control system and its administration computer and from the inventory control system's administration computer to the customer's database both securely and efficiently.

Furthermore, if an industry desires to group tools together for specific job requirements or as a kit of similar or identical tools, there may be need to subdivide the foam layouts with cutouts for specific tools into pallets. The pallets can be issued from the tool storage unit as a whole with all the kitted tools included therein, or individual tools can be issued and returned while the pallet remains in the tool storage device.

The inventory control system of the instant application may also allow for organizing the tool control storage devices into groups depending on their intended target usage and authorization level. Examples of groups for the tool control storage devices may include avionics, tail section, wing section, etc. The tool control storage devices may be typically controlled by the type of tools contained within the tool box. Examples of working groups for users may be by shift or by work area such as avionics group or engine group.

Users may also be grouped by authorization levels on the box or the administrative application. Authorization levels for users on the tool control tool storage device may be User, Maintenance, and Administrator. Authorization levels for groups on the administrative application may be User, Maintenance, and Administrator, Super user and Super viewer.

Many inventory control systems can operate on their own network independent of any other network system or interface. However, many customers, especially the large aerospace industrial and government users intend to link the inventory control system and data base with their own network and database. This allows for transfer of data between systems. This disclosure describes the use of web services as defined by the WWW consortium (W3C) for use as the data link/interface between the inventory control system and the customer's database system. In addition, this disclosure describes use of web services as defined by the W3C for use as the data link/interface between remote administration application users and the inventory control system and between remote viewers of specific displayed data and the administrative application of the inventory control system.

Since one of the functions of the inventory control systems is to ensure that all tools are accounted for and that no work product leaves the work area with a tool in it when work is concluded, this disclosure describes the ability for the administrative application to lock down the tool storage devices until authorized auditors complete an audit of the contents. The capability to lock down selected tool storage devices may be on a timed basis and/or may be by authorized users. It may be preceded by a requirement to return all tools to the box prior to lock down. The administrator may define authorized auditors for each tool storage device and the number of auditors required to complete an audit on each individual tool storage device.

In the inventory control systems with display capabilities of the tool storage device in the drawer or tray opening and drawer or tray closing configurations, the current capabilities to link the pan and zoom features between the two related images for each drawer or tray cycle do not exist. The images may need to be panned and zoomed individually. It may be desirable to link the pan and zoom features together for both images so the region of interest to the viewer is the displayed to the user at all times. It may also desirable to allow the user to right click the mouse when in the viewing function and return both images to normal resolution and placement simultaneously.

In another aspect, for automated tool storage devices, when in typical usage, if a kit is included in the tool storage device and the kit is in a container and the kit contains single or multiple components, the users of the storage device may be required to open the kit and verify the contents each time the kit is returned to the tool storage device after being issued. Verification may involve one user or more than one user. In current practice, the users may rely on memory or prior knowledge to verify the contents of the returned kits. Due human error, reliance on memory or prior knowledge may lead to erroneous verification and a possible lost tool or a tool left in the work product. The inventory control system of the instant application may be configured to display a list of the kit content on the tool storage device screen and to also have the capability to display a photographic image of the kit content on the tool storage device screen. The photographic image may be provided by an imaging equipped automated tool storage device or by a simple photograph downloaded from an external camera.

In many cases, industries publish a written work order to describe the work to be done, the location of the work, a document number for work processes and a document number for the tools to be used in the performance of the job requirements and other possible work related activities and documents. The work orders may include a bar code or other identifying mark, which is machine readable and for which the machine (computer) can be programmed to store information. The inventory control system of the instant application may be equipped with a device to read the identifying mark (bar code) on the work order and associate it with stored data such as work location and required tool lists. The inventory control system may be capable of displaying the stored data, i.e. work location required tool lists or other stored data associated with the identifying mark on the work order.

Since the inventory control system can be equipped with a touch screen monitor, the system is capable of displaying work locations to be selected by the user. Currently, the inventory control system may require the work location to be chosen after the user has swiped his badge across the systems card reader. By selecting a work location, the user may then be allowed access to the tools storage device based on previously set access rights. The current configuration of the work locations displayed on the touch screen of the inventory control system is a grid with the text of the work location name included inside each individual block. The grid with work locations text may be displayed on multiple pages depending on the number of work locations available. This disclosure describes a method where a visual representation of the work product is displayed on the screen and the work areas are defined as sections of the work product. For example, if the work product is an area, then the graphic representation could be an overhead view of the aircraft. By selecting a section of the aircraft, the user is selecting the work location required to gain access to the tool storage device. The graphical representations of the work product could be broken to multiple levels as well. For instance, if a user chose the tail section of the aircraft to be worked on, the tail section can be displayed, with its individual work locations, such as rudder, right rear flap, left rear flap, etc.

Some industries, especially in aerospace where government agencies or contractors are interested in higher levels of security, may require multi-factor authentication to gain access to the tool storage device and administrative computer in an automated tool control system. An example of multi-factor authentication used to enhance security is described in this disclosure. For example, a user may be required to scan a badge containing security information which in turn triggers a display to enter a pin number on the tool storage devices touch screen. Once the multi-factor requirements have been satisfied, the user may be allowed access to the automated tool storage device.

Many industries store employee data in Active Directory, such as name, employee number, badge number, and other identifying data. It may be desirable to have the capability to download certain employee information from Active Directory for use in the inventory control system. The inventory control system may use this information to identify authorized users and their appropriate access to the tool storage device or administrations computer workstation. The current method of loading employee data into the inventory control system may include adding the user information such as name, employee or badge number, or photograph manually. This disclosure describes a process whereby Active Directory information can be transferred to the inventory control system and used appropriately.

The inventory control system of the instant application may include a touch screen display with scroll bars capability. The scroll bars, however, may be small and may be sometimes difficult to scroll the screen up, down and sideways. To this end, the display of the inventory control system of the instant application may also include a touch screen flick and pinch functions for manipulating the display.

With this overview, reference now is made in detail to the examples illustrated in the accompanying drawings and discussed below.

Overview of Exemplary Tool Storage Systems

Figure 1B:
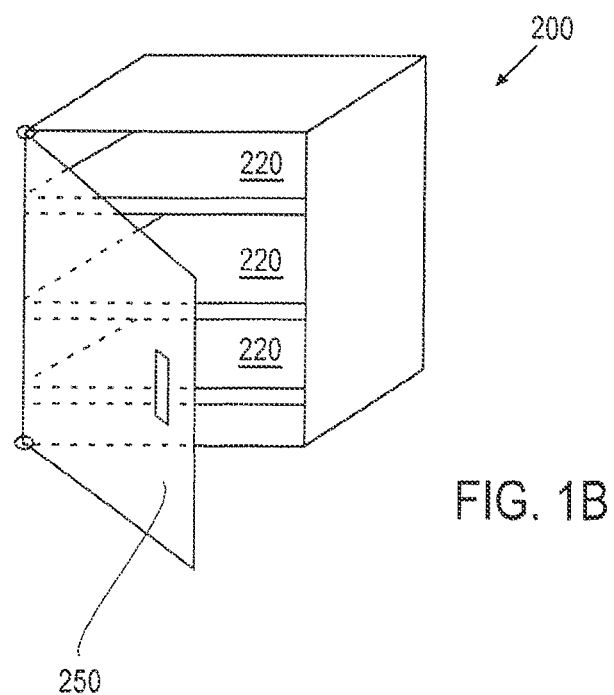

FIGS. 1A and 1B show exemplary storage units in which inventory control systems according to this disclosure may be implemented. FIG. 1A is an exemplary tool storage system 100 including multiple storage drawers 120. Each storage drawer 120 includes multiple storage locations for storing various types of tools. As used throughout this disclosure, a storage location is a location in a storage system for storing or securing objects. In one implementation, each tool has a specific pre-designated storage location in the tool storage system.

Each storage drawer operates between a close mode, which allows no access to the contents of the drawer, and an open mode, which allows partial or complete access to the contents of the drawer. When a storage drawer moves from a close mode to an open mode, the storage drawer allows increasing access to its contents. On the other hand, if a storage moves from an open mode to a close mode, the storage drawer allows decreasing access to its contents. As shown in FIG. 1A, all storage drawers 120 are in close mode.

A locking device may be used to control access to the contents of the drawers 120. Each individual drawer 120 may have its own lock or multiple storage drawers 120 may share a common locking device. Only authenticated or authorized users are able to access to the contents of the drawers.

The storage drawers may have different sizes, shapes, layouts and arrangements. FIG. 1b shows another type of tool storage system 200 which includes multiple storage shelves or compartments 220 and a single door 250 securing access to the storage shelves 250. The storage shelves or compartments may come in different sizes, shapes, layouts and arrangements.

Figure 2:
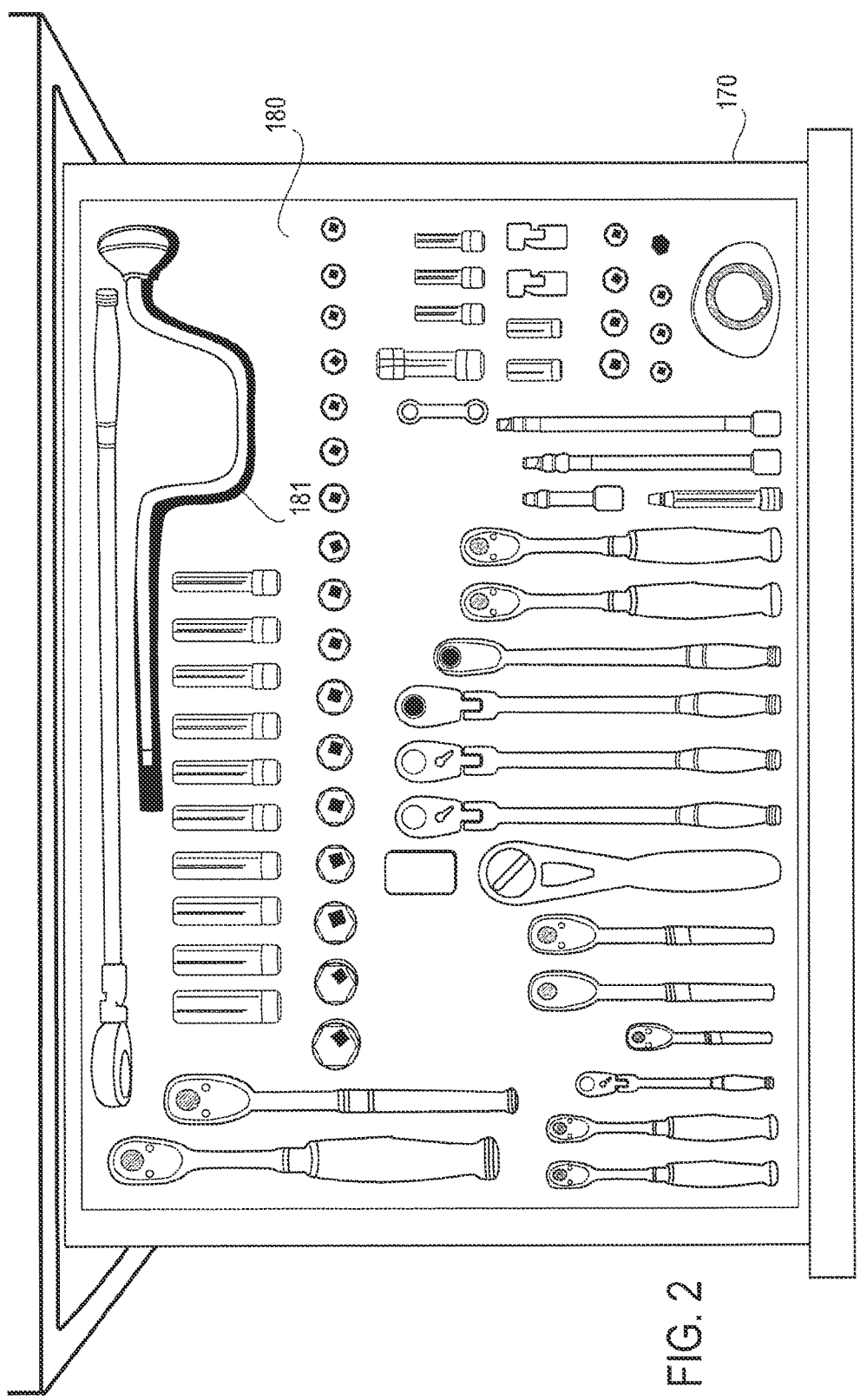
FIG. 2 shows details inside an exemplary storage drawer operated in the open mode.

FIG. 2 shows details inside an exemplary storage drawer 120 in the open mode. Each storage drawer 120 includes a foam base 180 having at least one storage location, such as cutouts 181, for storing tools. Each cutout is specifically contoured and shaped for fittingly receiving a tool with corresponding shapes. Tools may be secured in each storage location by using hooks, Velcro, latches, pressures from the foam, etc.

Figure 3:
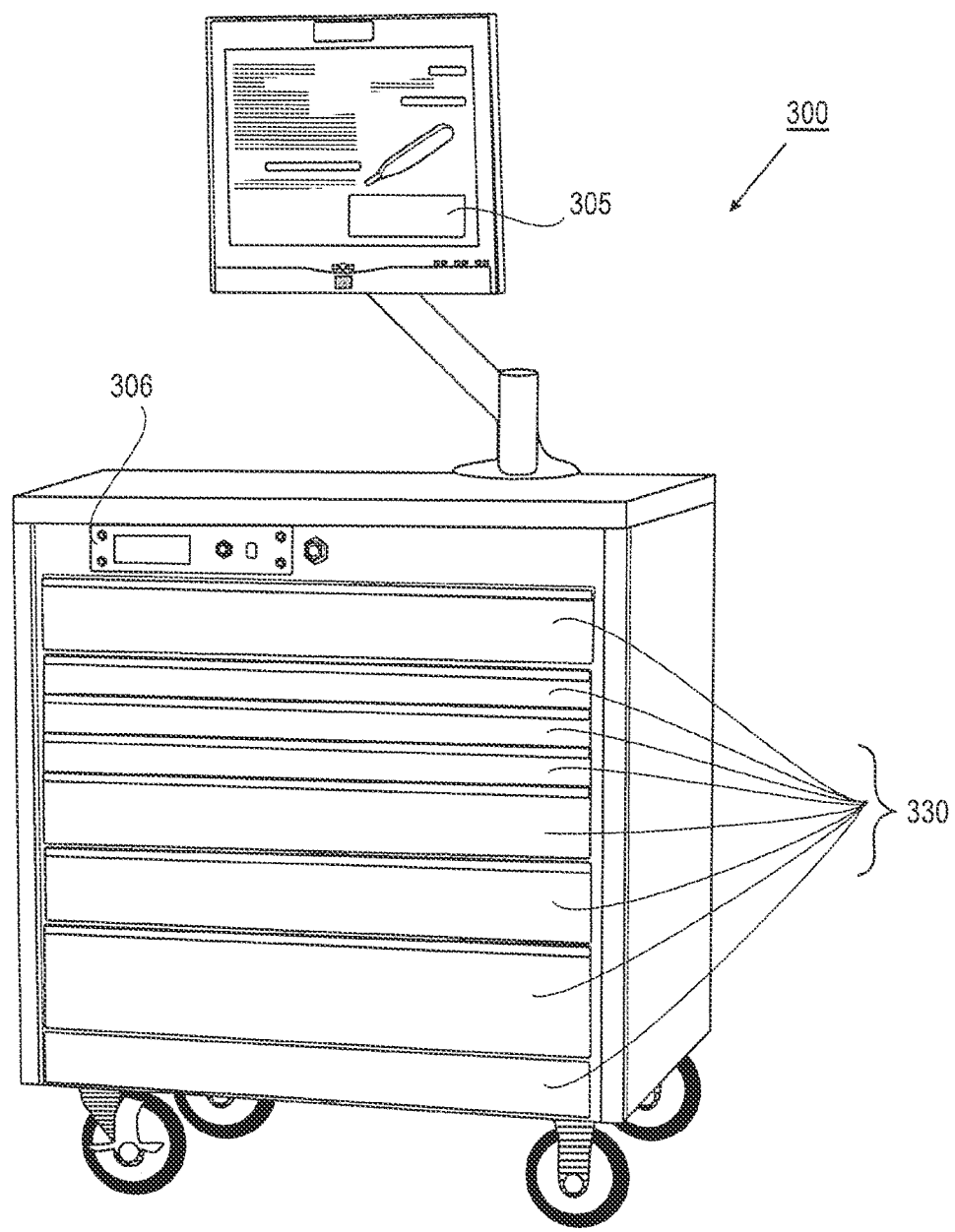
FIG. 3 shows an exemplary tool storage system according to this disclosure.

FIG. 3 shows an exemplary inventory control system implemented as a tool storage system 300 according to this disclosure for storing tools. Storage system 300 includes a display 305, an access control device 306, such as a card reader, for verifying identity and authorization levels of a user intending to access storage system 300, multiple tool storage drawers 330 for storing tools. Tool storage system 300 includes an image sensing device configured to capture images of contents or storage locations of the system. The image sensing device may be lens-based cameras, CCD cameras, CMOS cameras, video cameras, or any type of device that captures images. System 300 includes a data processing system, such as a computer, for processing images captured by the image sensing device. Images captured or formed by the image sensing device are processed by the data processing system for determining an inventory condition of the system or each storage drawer. The term inventory condition as used throughout this disclosure means information relating to an existence or non-existence condition of objects.

The data processing system may be part of tool storage system 300. In one implementation, the data processing system is a remote computer having a data link, such as a wired or wireless link, coupled to tool storage system 300; or a combination of a computer integrated in storage system 300 and a computer remote to storage system 300. Detailed operations for forming images and determining inventory conditions will be discussed shortly.

Drawers 330 are similar to those drawers 120 shown in FIG. 1A. Display 305 is an input and/or output device of storage system 330, configured to output information. Information entry via display 305 is possible such as by using a touch screen display. Access control device 306 is used to limit access to tool storage drawers 330 to authorized users only. Access control device 306, through the use of one or more locking devices, keeps all storage drawers 330 locked in a closed position until access control device 306 authenticates a user's authorization for accessing storage system 300. Access control device 306 may use one or more access authentication means to verify a user's authorization levels, such as by using a key pad to enter an access code, a keycard reader to read from a key card or fobs authorization level of a user holding the card or fob, biometric methods such as fingerprint readers or retinal scans, or other methods. If access control device 306 determines that a user is authorized to access storage system 300, it unlocks some or all storage drawers 330, depending on the user's authorization level, allowing the user to remove or replace tools. In one implementation, access to each storage drawer 300 is controlled and granted independently. Based on an assigned authorization or access level, a user may be granted access to one or more drawers of system 300, but not to other drawers. In one implementation, access control device 306 relocks a storage drawer 330 when or after a user closes the drawer.

The location of access control device 306 is not limited to the front of storage system 300. It could be disposed on the top of the system or on a side surface of the system. In one implementation, access control device 306 is integrated with display 305. User information for authentication purpose may be input through display device with touch screen functions, face detection cameras, fingerprint readers, retinal scanners or any other types of devices used for verifying a user's authorization to access storage system 300.

Figure 4A:
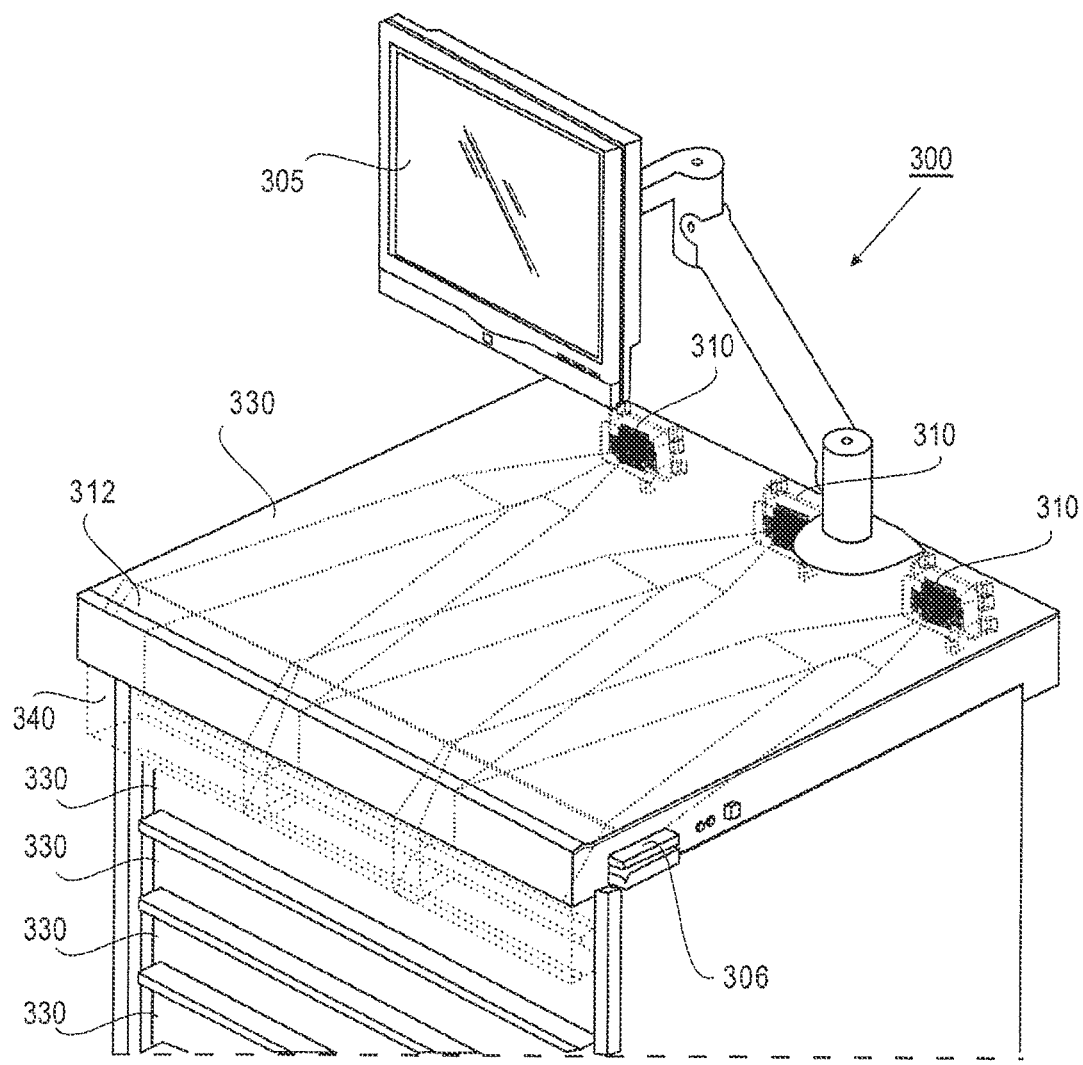
FIGS. 4A-4C and 4E are different views of the tool storage system shown in FIG. 3.
Figure 4B:
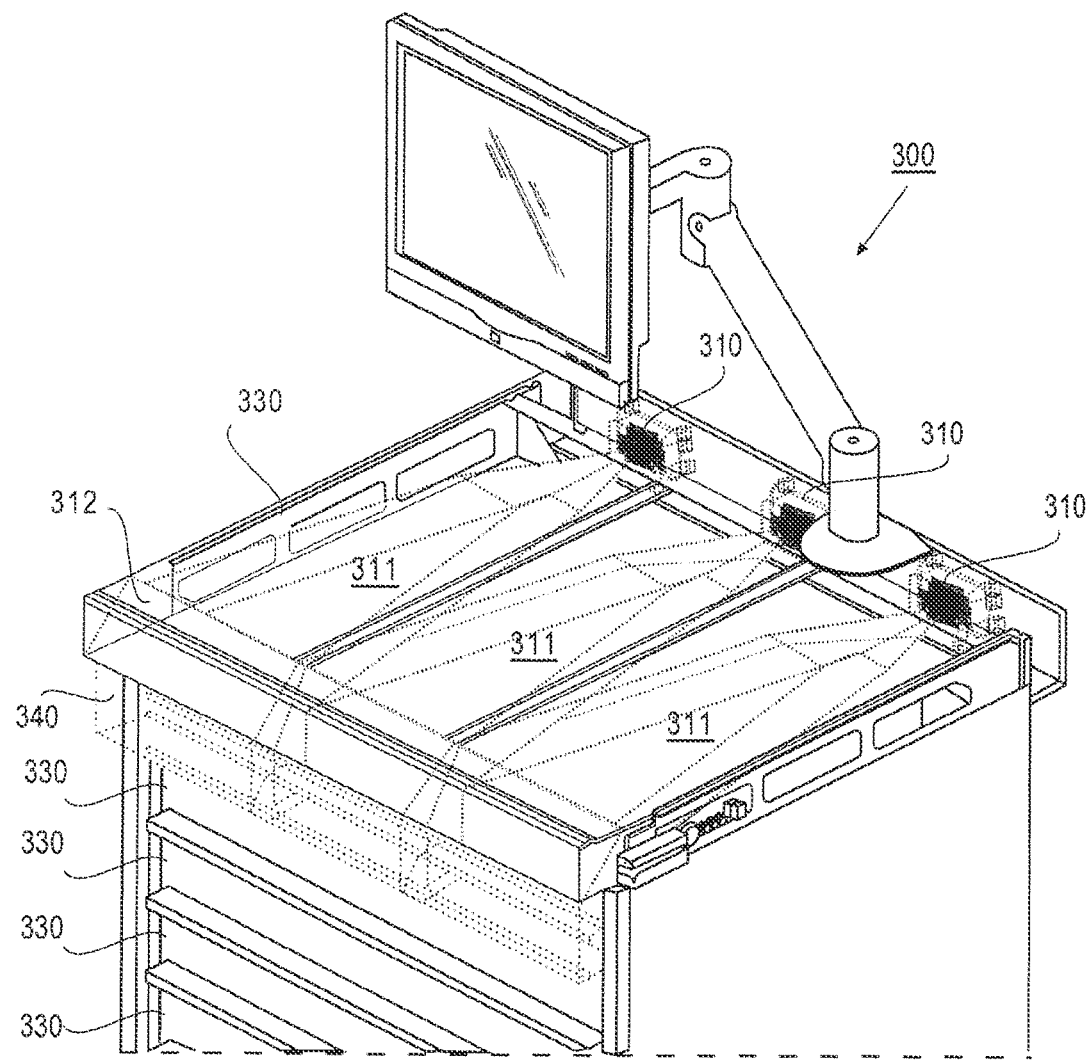

FIGS. 4A and 4B show a partial perspective view of tool storage system 300. As illustrated in FIG. 4A, an access control device 306 in the form of a card reader is disposed on a side surface of the system. Storage system 300 includes an imaging compartment 330 which houses an image sensing device comprising three cameras 310 and a light directing device, such as a mirror 312 having a reflection surface disposed at about 45 degrees downwardly relative to a vertical surface, for directing light reflected from drawers 330 to cameras 310. The directed light, after arriving to cameras 310, allow cameras 310 to form images of drawers 330. The shaded area 340 below mirror 312 represents a viewing field of the imaging sensing device of tool storage system 300. Mirror 312 has a width equal to or larger than that of each storage drawer, and redirects the camera view downwards toward the drawers. FIG. 4E is an illustrative side view of system 300 showing the relative position between cameras 310, mirror 312 and drawers 330. Light L reflected from any of drawers 330 to mirror 312 is directed to cameras 310.

FIG. 4B is a perspective view identical to FIG. 4A except that a cover of imaging compartment 330 is removed to reveal details of the design. Each camera 310 is associated with a viewing field 311. As shown in FIG. 4B, the combined viewing fields of cameras 310 form the viewing field 340 of the image sensing device. Viewing field 340 has a depth of x. For instance, the depth of viewing field 340 may be approximately 2 inches.

Figure 4C:
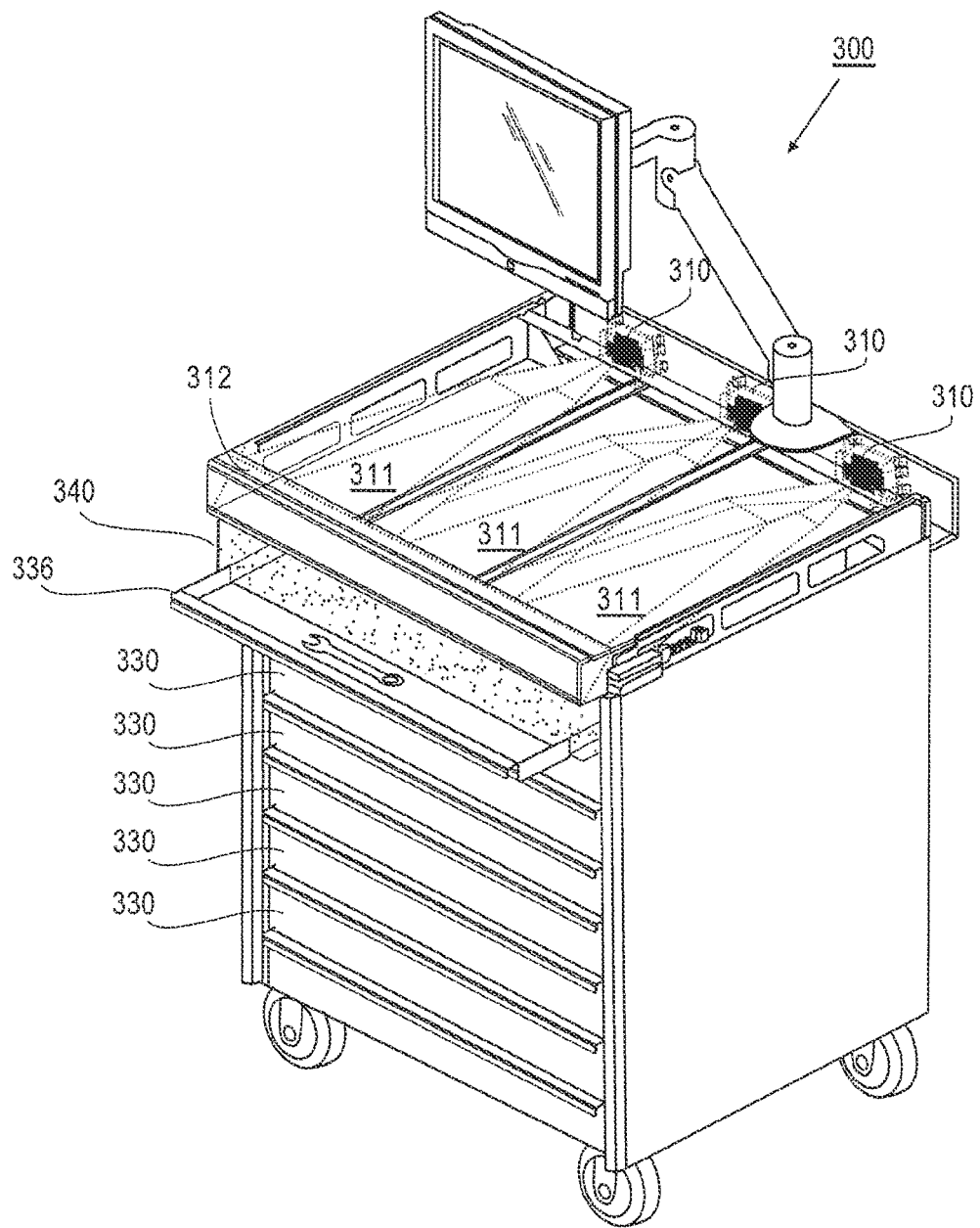

FIG. 4C is an alternative perspective view of tool storage system 300 shown in FIG. 4A, except that a storage drawer 336 now operates in an open mode allowing partial access to its contents or storage locations in storage drawer 336.

This arrangement of cameras 310 and mirror 312 in FIGS. 4A-4C allows cameras 310 the capability of capturing images from the top drawer to the bottom drawer, without the need to substantially change its focal length.

Figure 4D:
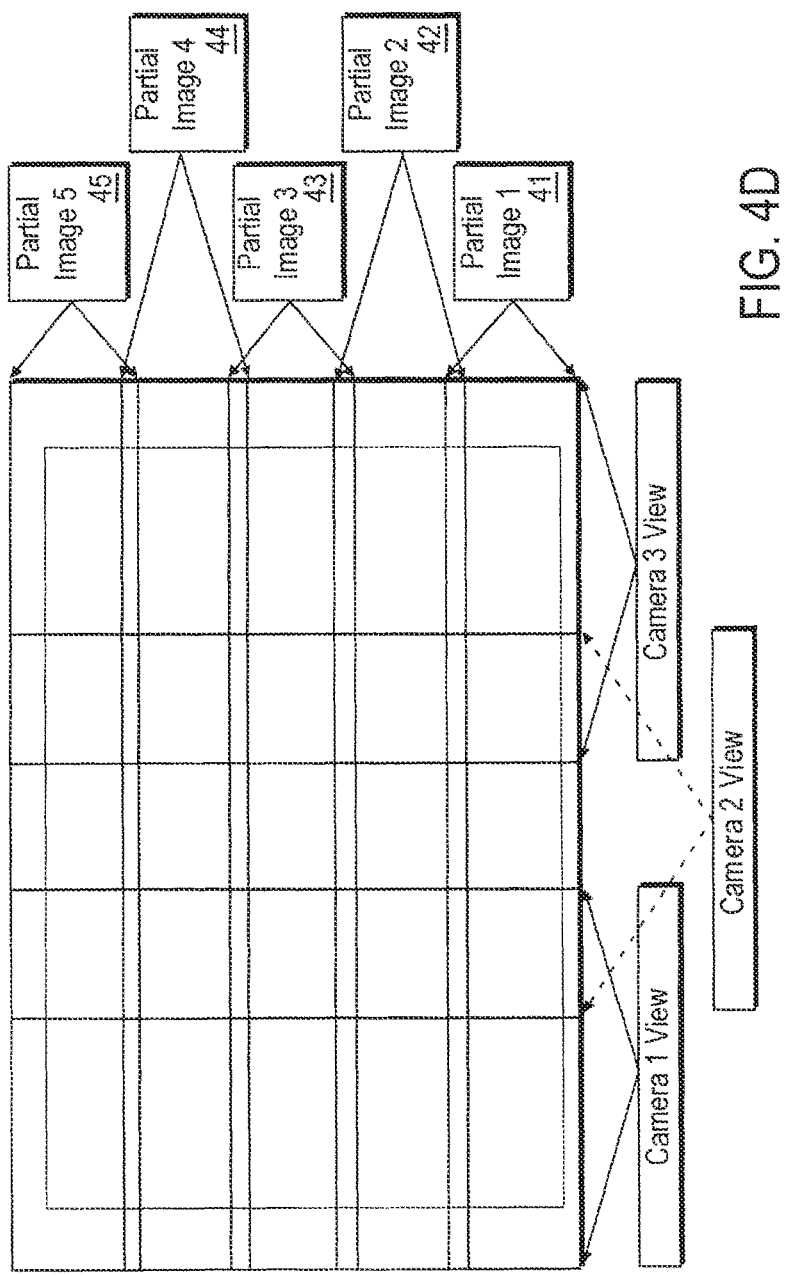
FIG. 4D illustrates how an exemplary image is stitched together.
Figure 4E:
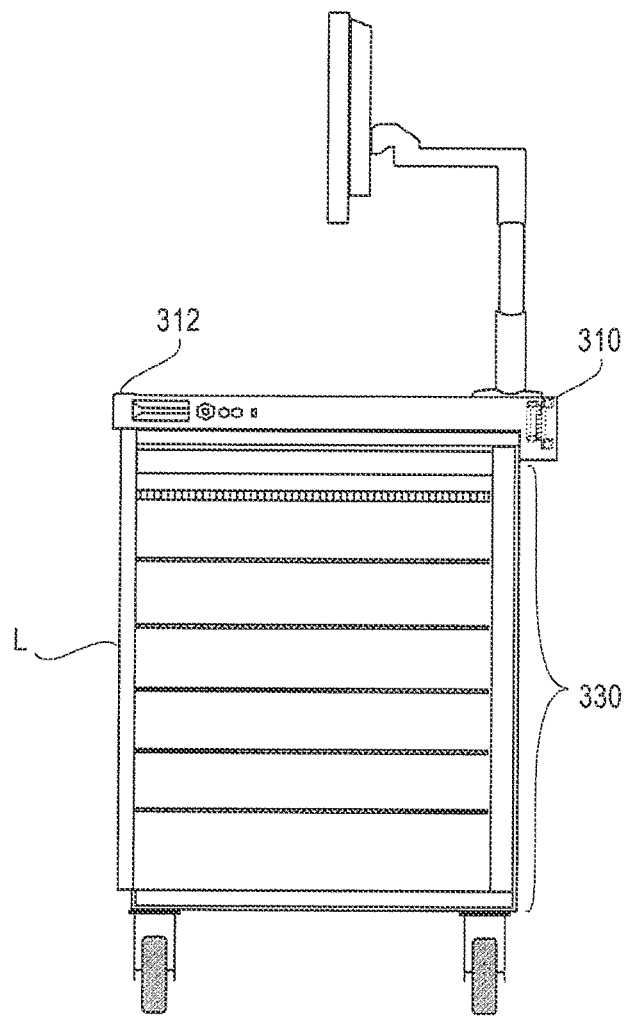

In one implementation, cameras 310 capture multiple partial images of each storage drawer as it is opened or closed. Each image captured by cameras 310 may be associated with a unique ID or a time stamp indicating the time when the image was captured. Acquisition of the images is controlled by a data processor in tool storage system 300. In one implementation, the captured images are the full width of the drawer but only approximately 2 inches in depth. The captured images overlap somewhat in depth and/or in width. As shown in FIG. 4D, the partial images 41-45 taken by different cameras 310 at different points in time may be stitched together to form a single image of partial or entire drawer and its contents and/or storage locations. This stitching may be performed by the data processor or by an attached or remote computer using off-the-shelf software programs. Since images are captured in approximately two inch slices multiple image slices are captured by each camera. One or more visible scales may be included in each drawer. The processor may monitor the portion of the image that contains the scale in a fast imaging mode similar to video monitoring. When the scale reaches a specified or calculated position, the data processing system controls the image sensing device to capture and record an image slice. The scale may also assist in photo stitching. Additionally a pattern such as a grid may be applied to the surface the drawer. The pattern could be used to assist the stitching or image capture process.

In another implementation, the image sensing device includes larger mirrors and cameras with wide angle lens, in order to create a deeper view field x, such that the need for image stitching can be reduced or entirely eliminated.

In one implementation, one or more line scan cameras are used to implement the image sensing device. A line scan camera captures an image in essentially one dimension. The image will have a significant width depending on the sensor, but the depth is only one pixel. A line scan camera captures an image stripe the width of the tool drawer but only one pixel deep. Every time drawer 330 moves by a predetermined partial amount the camera will capture another image stripe. In this case the image stripes must be stitched together to create a usable full drawer image. This is the same process used in many copy machines to capture an image of the document. The document moves across a line scan camera and the multiple image stripes are stitched together to create an image of the entire document.

In addition to a mirror, it is understood that other devices, such as prisms, a combination of different types of lens including flat, concave, and/or convex, fiber optics, or any devices may direct light from one point to another may be used to implement the light directing device for directing light coming from an object to a remote camera. Another option could be the use of fiber optics. The use of light directing device may introduce distortions into the captured images. Calibrations or image processing may be performed to eliminate the distortions. For instance, cameras 310 may first view a known simple grid pattern reflected by the light directing device and create a distortion map for use by the data process processor to adjust the captured image to compensate for mirror distortion.

For better image capture and processing, it may be desirable to calibrate the cameras. The cameras may include certain build variations with respect to image distortion or focal length. The cameras can be calibrated to reduce distortion in a manner similar to how the mirror distortion can be reduced. In fact, the mirror calibration could compensate for both camera and mirror distortion, and it may be the only distortion correction used. Further, each individual cameras may be calibrated using a special fixture to determine the actual focal length of their lenses, and software can be used to compensate for the differences from camera to camera in a single system.

In one implementation, the image sensing device does not include any mirror. Rather, one or more cameras are disposed at the location where mirror 312 was disposed. In this case, the cameras point directly down at storage drawers 330 when then move. In another implementation, each storage drawer 330 has one or more associated cameras for capturing images for that storage drawer.

Determination of Inventory Conditions

System 300 determines the presence or absence of tools in drawers 330 based on captured images using a variety of possible strategies. Suitable software may be executed by the embedded processor or an attached computer (PC) for performing inventory determinations based on captured images.

In one example, system 300 determines an inventory condition of a storage drawer based on empty locations in the drawer. Each storage location in the drawer is configured to store a pre-designated object, such as a pre-designated tool. A non-volatile memory device of system 300 stores information identifying a relationship between each known storage location in the drawer and its corresponding pre-designated object. The memory device also stores information of two baseline images of the drawer: one baseline image having each of its storage locations occupied by the corresponding pre-designated object, and another baseline image having its storage locations unoccupied. In determining an inventory condition of the drawer, the data processor compares an image of the drawer and each of the baseline images. Based on a difference of the images, the data processor determines which storage location in the drawer is not occupied by its corresponding pre-designated object. The identity of the missing object is determined based on the stored relationship identifying each storage locations and their corresponding pre-designated objects.

Another implementation according to this disclosure utilizes specially designed identifier for determining an inventory condition of objects. Depending on whether a storage location is being occupied by an object, an associated identifier appears in one of two different manners in an image captured by the image sensing device. For instance, an identifier may appear in a first color when the associated storage location is occupied by a tool and a second color when the associated storage location is unoccupied. The identifiers may be texts, one-dimensional or two-dimensional bard code, patterns, dots, code, symbols, figures, numbers, LEDs, lights, flags, etc., or any combinations thereof. The different manners that an identifier may appear in an image captured by the image sensing device include images with different patterns, intensities, forms, shapes, colors, etc. Based on how each identifier appears in a captured image, the data processor determines an inventory condition of the object.

FIG. 5 shows an implementation of identifier designs. As shown in FIG. 5, storage location 51 is designated to store tool 510, and storage location 52 is currently occupied by its designated tool 520. Storage location 53 is not occupied by its designated tool. Each storage location 51, 52, 53 has an associated identifier. Depending on whether each storage location 51-53 is being occupied by a corresponding tool, each identifier appears in an image captured by cameras 310 in one of two different manners. For example, each identifier may not be viewable by cameras 310 when a corresponding tool is stored in the respective storage location, and becomes viewable by cameras 310 when an object is not stored in the respective storage location. Similarly, a different implementation may have an identifier viewable by the image sensing device when an object is stored in the respective storage location, and is not viewable by the image sensing device when an object is not stored in the respective storage location.

For instance, the bottom of storage locations 51-53 includes an identifier made of retro-reflective material. Since storage locations 51 and 53 are not occupied by their respective designated tools, their associated identifiers 511 and 513 are viewable to the image sensing device. On the other hand, storage location 52 is currently occupied by its designated tool, its identifier is blocked from the view of the image sensing device. When the particular tool is stored in the storage location, the identifier is blocked from the view of the image sensing device and not viewable by the image sensing device. On the other hand, if the storage location is not occupied by the particular tool, the identifier is viewable by the image sensing device and shows up as a high intensity area on an image of the drawer. Accordingly, a high intensity area represents a missing tool. The system 300 detects locations with missing tools and correlates the empty locations with stored relationship identifying each storage locations and their corresponding tools. The system 300 determines which tools are not in their specified locations in a drawer. It is understood that the identifiers may be implemented in many different manners. For instance, the identifiers may be designed to create a high intensity image when a storage location is occupied and an image with less intensity when the storage location is occupied.

In one implementation, each identifier is implemented with a contact sensor and an LED. As shown in FIG. 5B, storage location 61 is associated with a contact sensor 62 and an LED 63. When contact sensor 61 senses a tool is in storage location 61, a signal is generated by contact sensor 61 and controls to turn off power supply to LED 63. On the other hand, if contact sensor 62 detects that a tool is not in storage location 61, control sensor 62 generates a control signal which controls to turn on LED 63, which creates a high intensity area in an image captured by the image sensing device. Each high intensity area in an image indicates a storage location without an associated tool. The system 300 identifies removed or missing tools by determining which storage locations are not occupied by tools and pre-stored information identifying corresponding tools of the locations. In still another implementation, the identifier is unique to the pre-designated tool stored in each respective storage location. The data processor is configured to determine an inventory condition by evaluating whether at least one viewable identifier exists in an image of the storage locations captured by the image sensing device, and pre-stored relationship between each pre-designated object and a respective identifier unique to each pre-designated object.

In still another implementation, an identifier associated with a storage location creates a high intensity image when the storage location is occupied, and a lower intensity image when the storage location is unoccupied. The system 300 determines which tools exist based on detected identifiers and pre-stored information identifying a relationship between each storage location and the corresponding pre-designated object. In another implementation, the identifier is unique to a pre-designated object stored in each respective storage location. The system 300 determines an inventory condition of existing objects by evaluating identifiers that exist in an image of the storage locations captured by the image sensing device, and pre-stored relationship between each pre-designated object and a respective identifier unique to each pre-designated object.

In still another implementation, each object stored in the system 300 includes an attached identifier unique to each object. The data processor has access to prestored information identifying each tool stored in the system and known information identifying a relationship between each object and a respective identifier unique to each pre-designated object. The data processor determines an inventory condition of objects by evaluating identifiers that exist in an image of the storage locations captured by the image sensing device, and the relationship between each pre-designated object and a respective identifier unique to each pre-designated object. For instance, system 300 stores a list of tools stored in the system and their corresponding unique identifiers. After cameras 310 captures an image of a storage drawer, the data processor determines which identifier or identifiers are in the image. By comparing the identifiers appearing in the image with list of tools and their corresponding unique identifiers, the data processor determines which tools are in the system and which ones are not.

As discussed earlier, identifiers associated with the storage locations may be used to determine which locations have missing objects. According to one implementation, system 300 does not need to know the relationship between each storage location and the corresponding object. Rather, each identifier is unique to a corresponding object stored in the storage location. The data processor of system 300 has access to pre-stored information identifying a relationship between each identifier and the corresponding object, and information identifying each object. In other words, system 300 has access to an inventory list of every object stored in system 300 and its respective unique identifier. When an empty tool storage location is detected by system 300, the corresponding identifier is extracted from the image and decoded by system software. As each identifier is unique to a corresponding object, system 300 is able to determine which object is missing by checking the relationship between each identifier and the corresponding object, and the inventory list of objects. Each identifier unique to an object stored in a storage location may be disposed next to the storage location or in the storage location. In one implementation, the identifier is disposed next to the storage location and is always viewable to the image sensing device no matter whether the location is occupied by an object or not. In another implementation, when an identifier is disposed in the corresponding location, the identifier is not viewable to the image sensing device when the location is occupied by an object, and is viewable to the image sensing device when the location is not occupied by an object.

An implementation of this disclosure utilizes combinations of baseline images and identifiers unique to objects to determine an inventory status. For example, a baseline image may include information of a storage drawer with all storage locations occupied with their respective corresponding objects, wherein each storage location is associated with an identifier unique to an object stored in the storage location. An inventory condition is determined by comparing an image of the storage locations and the baseline image, to determine which locations are occupied by objects and/or which locations have missing objects. Identifications of the missing objects are determined by identifying the identifier associated with each storage location with missing object.

Another implementation of this disclosure utilizes unique combinations of identifiers to determine an inventory status. For instance, each storage location may have a first type of identifier disposed in the location and a second type of identifier unique to an object stored in the storage location and disposed next to the storage location. The first type of identifier is viewable to an image sensing device when the location is not occupied by an object and not viewable by an image sensing device when the location is occupied by an object. The first type of identifier may be made of retro-reflective material. If a storage location is not occupied by an object corresponding to the storage location, the identifier of the first type is viewable by the image sensing device and shows up as a high intensity area. Accordingly, each high intensity area represents a missing object, which allows system 300 to determine which locations having missing objects. Based on identifiers of the second type associated with those locations with missing objects, system 300 identifies which objects are missing from system 300. Consequently, an inventory condition of system 300 is determined.

According to still another implementation, system 300 uses image recognition methods to identify an object missing from system 300. System 300 has access to an inventory list indicating which tools are stored in each drawer or system 300. However, system 300 does not have to know where the tools are stored. The tools are placed in foam cutout locations specific for each tool. Using characteristics such as size, shape, color, and other parameters image recognition software identifies each tool in the drawer. Missing tools are simply the tools on the inventory list that are not identified as being in the drawer.

System 300 records access information related to each access. The access information includes time, user information related to the access, duration, user images, images of storage locations, identities of storage units or contents of the storage system, objects in the storage system, etc., or any combinations thereof. In one implementation, system 300 includes a user camera that captures and stores image of the person accessing storage system 300 each time access is authorized. For each access by a user, system 300 determines an inventory condition and generates a report including associating the determined inventory condition with access information.

Timed Image Capturing

Implementations of this disclosure utilize uniquely timed machine imaging to capture images of system 300 and determine an inventory condition of system 300 according to the captured images. In one implementation, system 300 activates or times imaging of a storage drawer based on drawer locations and/or movements, in order to create efficient and effective images. For instance, a data processor of the system 300 uses drawer positions to determine when to take overlapping partial images as discussed relative to FIGS. 4A-4E, to assure full coverage of a drawer being accessed by a user. In another example, drawer position information may be useful to the stitching software in the construction of a full drawer image. Drawer position information may be used to help locate the positions of the cutouts in the drawer.

In one implementation, the data processor of system 300 controls the image sensing device to form images of a drawer based on a pre-specified manner of movement by the drawer. For instance, for each access, system 300 only takes images of the drawer when it is moving in a specified manner or in a predetermined direction. According to one implementation, the image sensing device takes images when a drawer is moving in a direction that allows decreasing access to its contents or after the drawer stops moving in the direction allowing decreasing access to its contents. For example, cameras may be controlled to take pictures of drawers when a user is closing a drawer, when or after a drawer stops moving in a closing direction or when the drawer is completely closed. In one implementation, no images are taken when the drawer is moving in a direction allowing increasing access to its contents, such as when a drawer moves from a close position to an open position.

Figure 6C:
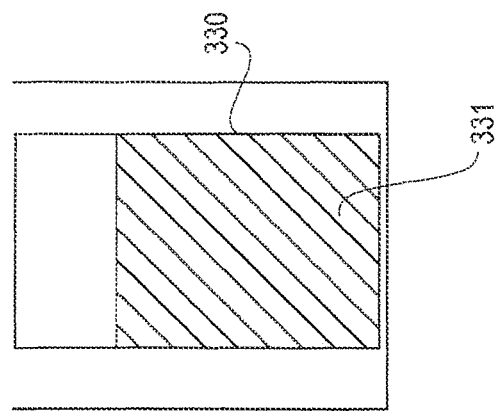
FIG. 6A-6C illustrates an example of timed image capturing.
Figure 6B:
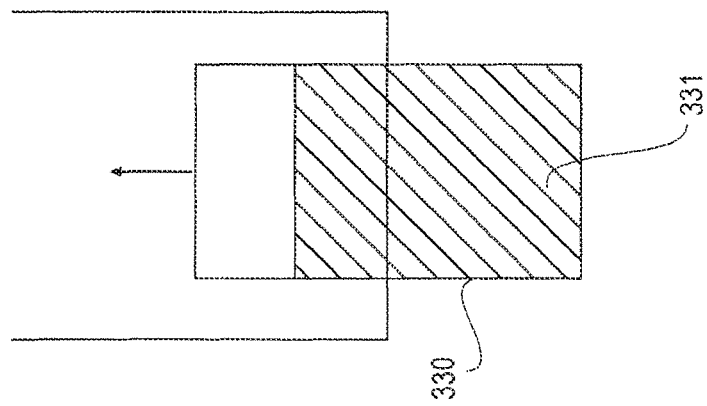
Figure 6A:
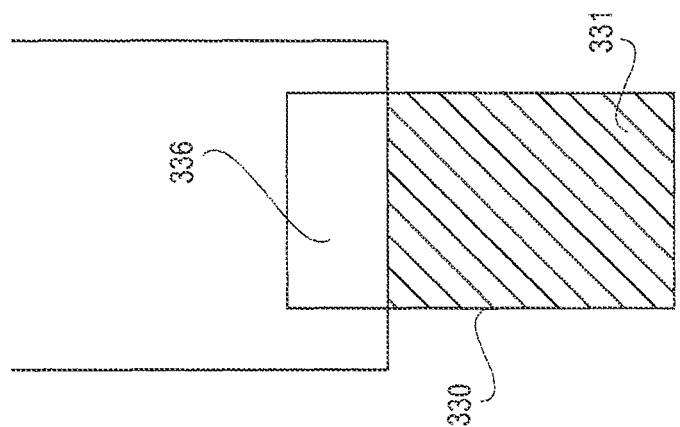

FIG. 6A-6C shows an operation of this implementation in the setting of an exemplary system described in FIGS. 4A-4D. As shown in FIG. 6A, a user partially opens drawer 330 to expose storage locations in shaded area 331. Since the user only opens drawer 330 half way, the user has no access to storage locations in area 336. After the user finds the tool he needs from area 331, the user starts to close drawer 330 (FIG. 6B). When sensors in system 300 detect the closing movement of drawer 330, which allows decreasing access to contents, the data processor activates the image sensing device, such as cameras 310, to capture partial images of shaded area 331 until drawer 330 is fully closed (FIG. 6C). Since the user never has any access to area 336, it is safe to assume that an inventory condition relative to area 336 remains unchanged from the previous access. However, for area 331, since the user had access to that area, an inventory associated with that area needs to be updated. Any changes in access or replacement of tools would occur only in area 331. Therefore, system 300 determines an inventory condition of drawer 330 associated with the access by the user based on the captured image covering area 331 and inventory information related to area 336 of a previous access, the information of which may be retrieved from a non-volatile memory device of system 300 that stores inventory information associated with each access to system 300. The determined inventory condition for drawer 330 is then stored in the non-volatile memory device. In one implementation, the non-volatile memory device stores an initial inventory condition of drawer 300 which represents a baseline inventory condition with which later inventory conditions may compare. For instance, after each auditing of tool inventory condition, system 300 stores the inventory condition after the audit as the baseline inventory condition.

Locations, movements and moving directions of each storage drawer may be determined by using sensors to measure location or movement sensors relative to time. For instance, location information relative to two points in time may be used to derive a vector indicating a moving direction.

Examples of sensors for detecting a position, movement or moving direction of storage drawers include a sensor or encoder attached to a drawer to detect its position relative to the frame of system 300; a non-contact distance measuring sensor for determining drawer movement relative to some position on the frame of the system 300, such as the back of the system 300; etc. Non-contact sensors may include optical or ultrasonic sensors. A visible scale or indicator viewable by cameras 310 may be included in each drawer, such that camera 210 could read the scale to determine drawer position.

A change in an inventory condition, such as removal of tools, occurring in the current access may be determined by comparing inventory conditions of the current access and the access immediately before the current access. If one or more objects are missing, system 300 may generate a warning signal, such as audible or visual, to the user, generate a notice to a remote server coupled to system 300, etc.

In another implementation, the image sensing device is configured to form images of the storage locations both when storage drawer 330 moves in a direction allowing increasing access to its contents, and when storage drawer 330 subsequently moves in a direction allowing decreasing access to its contents. For example, when a user opens drawer 330 to retrieve tools, the moving direction of drawer 330 triggers cameras 310 to capture images of drawer contents when it moves. The captured image may be designated as a "before access" image representing a status before a user has accessed the contents of each storage drawer. An inventory condition is determined based on the captured images. This inventory condition is considered as a "before access" inventory condition. Cameras 310 stops capturing images when drawer 330 stops moving. When the user closes drawer 330, the moving direction of drawer 330 triggers cameras 310 to capture images of drawers 330 again until it stops or reaches a close position. An inventory condition of the drawer is determined based on images captured when the user closes drawer 330. This determined inventory condition is designated as an "after access" inventory condition. A difference between the before access inventory condition and the after access inventory condition indicates a removal or replacement of tools. Other implementations of this disclosure control cameras to take the "before access" image before a storage drawer is opened or after the storage drawer is fully opened or when its contents are accessible to a user. According to another implementation, the image sensing device is timed to take an image of each drawer 330 when it was detected that access by a user is terminated. As used herein in this disclosure, terminated access is defined as a user no longer having access to any storage locations, such as when drawer 330 is closed or locked, when door 250 is closed or locked, etc., or an indication by the user or the system that access to the storage system is no longer desired, such as when a user signs off, when a predetermined period of time has elapsed after inactivity, when a locking device is locked by a user or by system 300, etc. For each access, a position detector or contact sensor is used to determine whether drawer 330 is closed. After the drawer is closed, the image sensing device captures an image of drawer 330. The data processing system then determines an inventory condition based on the captured image or images. A difference in the inventory condition may be determined by comparing the determined inventory condition of the current access to that of the previous access.

Figure 7A:
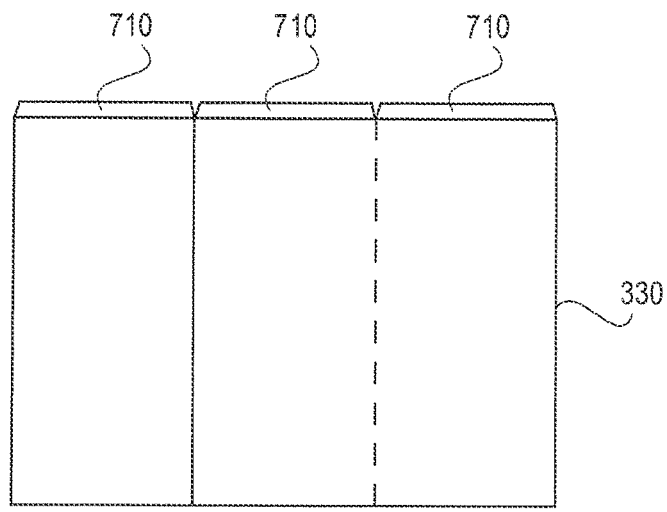
FIGS. 7A and 7B are different views of another implementation of camera designs.
Figure 7B:
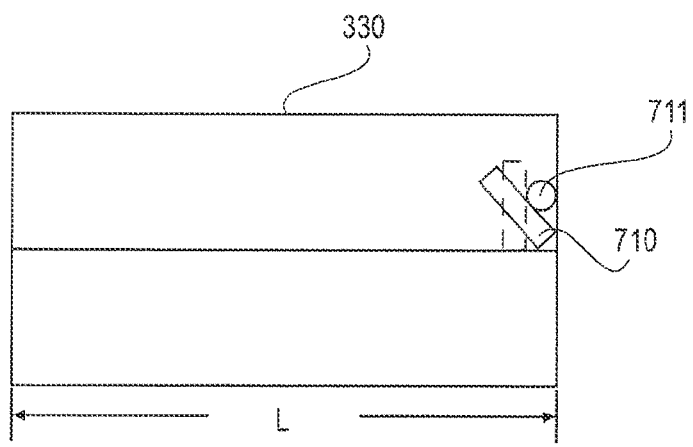

FIGS. 7A and 7B show an exemplary drawer having cameras configured to capture images of the drawer when it is closed. FIG. 7A is a top view of a drawer 330 having three cameras 770. Cameras 770 have sufficient widths of viewing fields to cover the entire width of drawer 330. FIG. 7B is a side view of drawer 330 shown in FIG. 7A. Camera 710 tilts down a specific angle and has a sufficiently large viewing field to cover the entire length L of drawer 330. In one implementation, cameras 710 does not have to cover the entire length L with one image. Rather, camera 710 may be rotatably attached to a hinge 711, which allows camera to tilt up and down vertically, to cover different sections of drawer 330. Images captured by cameras 710 are stitched or combined to form an image of the entire drawer.

It is understood that other camera configurations or designs may be utilized to capture images of drawer 330 when it is closed. In one implementation, one or more moving cameras are used to capture images of a drawer after it is closed. In this implementation, the cameras are configured to move over the drawer and capture image slices that can be stitched together to create a full drawer images. The cameras may be moved by a motor along a rail. Either 2D or line scan cameras can be used in this model. A sensor may be used to determine the location of the cameras to assist in stitching or other functions such as camera position control. A variation of this model uses a stationary camera for each drawer viewing across the top of the drawer and a 45 degree moving mirror that moves over the draw and redirects the camera view towards the drawer. Another variation is to provide a camera moving from one drawer to another. Still another variation is to provide a moving mirror for each drawer and one or more cameras moving between drawers. The movements of the cameras and mirrors are synchronized to form images of each storage drawer. The cameras and drawers may be driven by motors or any means that provide power.

If the image sensing device requires illumination to obtain acceptable image quality, illumination devices may be provided. For example, LEDs may be used to illuminate the image area. It is understood that other illumination sources may be used. In one implementation, LEDs are disposed surrounding the lens or image sensors of the camera and light is transmitted along the same path as the camera view. In an implementation including the use of a light directing device, such as a mirror, the emitted light would be directed by the mirror towards the drawers. The timing and intensity of the illumination is controlled by the same processor that controls the camera and its exposure. In some possible configurations of cameras it may be desirable to implement background subtraction to enhance the image. Background subtraction is a well known image processing technique use to remove undesirable static elements from an image. First an image is captured with illumination off. Then a second image is captured with illumination on. The final image is created by subtracting the illumination off image from the illumination on image. Image elements that are not significantly enhanced by the illumination are thereby removed from the resulting image.

According to another implementation, for each access, the image sensing system 300 is timed to capture at least two images of drawer 300: at least one image (initial image) captured before a user has access to storage locations in drawer 300 and at least one image captured after the access is terminated, as discussed earlier. The initial image may be taken at any time before the user has access to the contents or storage locations in the drawer. In one implementation, the initial image is captured when or after a user requests access to system 300, such as by sliding a keycard, punching in password, inserting a key into a lock, providing authentication information, etc. In another implementation, the initial image is captured before or in response to a detection of drawer movement from a close position or the unlock of a locking device of system 300.

The data processing system of system 300 determines an inventory condition based on the initial image, and assigns the determined inventory condition as "before access" inventory condition; and determine an inventory condition based on the image captured after the access is terminated and designated the determined inventory condition as "after access" inventory condition. A change in the inventory condition of objects in system 300 may be determined based on a comparison of the "before access" and "after access" inventory conditions or a comparison of the initial image and the image captured after the access is terminated.

Concepts and designs described above may be applicable to other types of storage systems, such as a type shown in FIG. 1B, where a single door controls the access to multiple shelves or drawers. In one implementation, the image sensing device may be timed to capture images of the storage locations when or after a detected termination of access, such as closing door 250, locking door 250, signing out, etc. It is understood that various types of sensors, such as contact sensors, infrared sensors, may be used to determine when a door is closed. Similar to the discussions earlier, the image sensing device captures images of the storage locations, and determine an "after access" inventory condition based on the captured image. A change in the inventory condition related to the access by comparing an inventory condition of the current access and that of the last access. According to another implementation, the image sensing device is timed to take "before access" images of the storage locations before a user has access to the storage system. For instance, the cameras may be timed to capture images of the storage locations when or after a user requests access to the system, after detecting an opening of door 250, after receiving authentication information from a user, etc. The storage system determines a "before access" inventory condition based on the "before access" image. A change in the inventory condition may be determined according to a difference between the "before access" and "after access" inventory conditions, or a difference between the "before access" and "after access" images.

Networked Storage Systems

Figure 8:
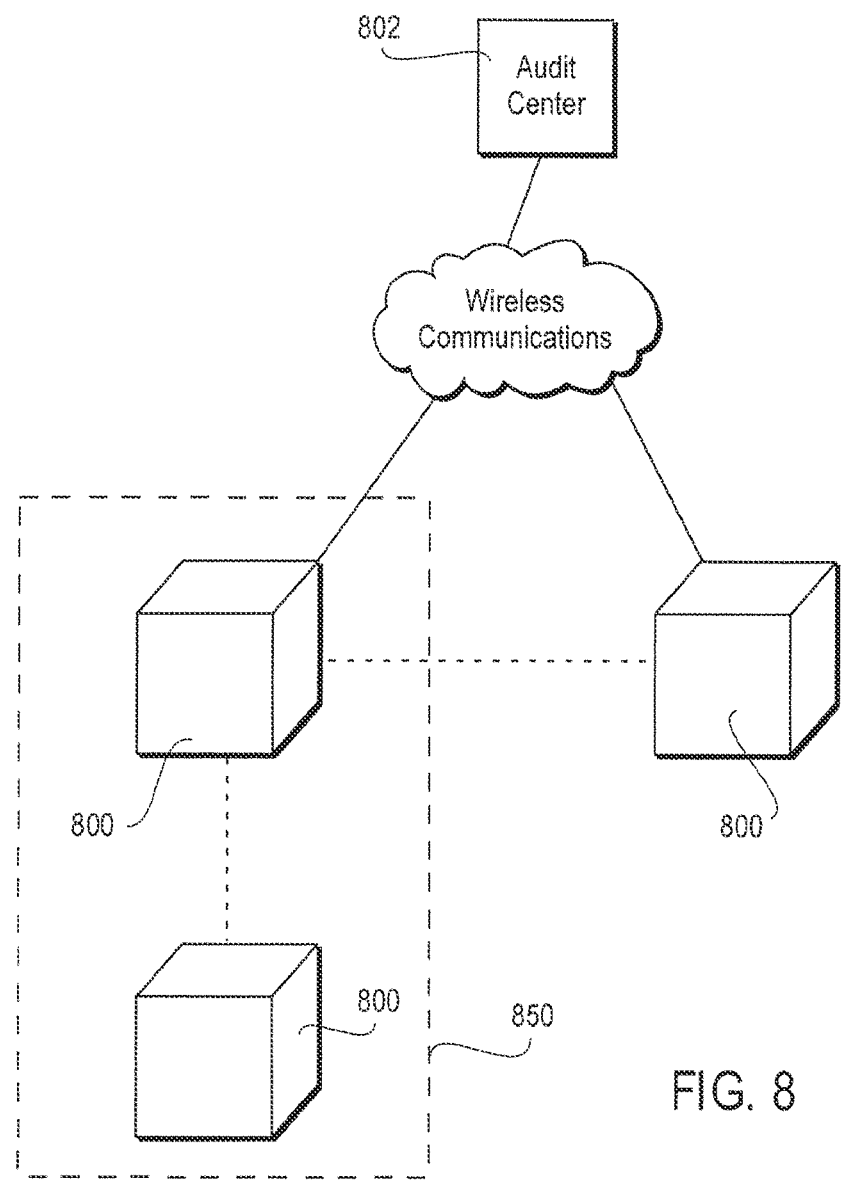
FIG. 8 is a block diagram of an exemplary networked inventory control system.

Storage systems described in this disclosure may be linked to a remote server in an audit center, such that inventory conditions in each storage system is timely updated and reported to the server. As shown in FIG. 8, a server 802 is coupled to multiple storage systems 800 via a wireless network. Server 802 may include a database server, such as a Microsoft SQL server. Information related to authentication, authorized users, inventory conditions, audit trails, etc., is stored in the database.

In one implementation, each storage system 800 is provided with a data transceiver, such as an 802.11g or Ethernet module. The Ethernet module connects directly to the network, while a 802.11g module may connect through a 802.11g router connected to the network. Each of these network modules will be assigned a static or dynamic IP address. In one implementation, storage systems 800 check in to the server through the data transceivers on a periodic basis, to download information about authorized users, authorization levels of different users or different keycards, related storage systems, etc. Storage systems 800 also upload information related to the systems such as inventory conditions, drawer images, tool usage, access records, information of user accessing storage systems 800, etc., to server 802. Each storage system 800 may be powered by an AC source or by a battery pack. An uninterruptible power supply (UPS) system may be provided to supply power during a power failure.

Server 802 allows a manager or auditor to review access information related to each storage system 800, such as inventory conditions and information related to each access to storage system 800 like user information, usage duration, inventory conditions, changes in inventory conditions, images of drawers or contents of the storage system, etc. In one implementation, server 802 may form a real time connection with a storage system 800 and download information from that storage system. The manager or auditor may also program the access control device on each storage system through server 802, such as changing password, authorized personnel, adding or deleting authorized users for each storage system, etc. Authorization data needed for granting access to each storage system 800 may be programmed and updated by server 802 and downloaded to each storage system 800. Authorization data may include passwords, authorized personnel, adding or deleting authorized users for each storage system, user validation or authentication algorithm, public key for encryptions and/or decryptions, black list of users, white list of users, etc. Other data updates may be transmitted to each storage system from server 802, such as software updates, etc. Similarly, any changes performed on storage system 800, such as changing password, adding or deleting authorized users, etc., will be updated to server 802.

For each access request submitted by a user, a storage system authenticates or validates the user by determining a user authorization according to user information input by the user via the data input device and the authorization data. According to a result of the authentication, the data processor selectively grants access to the storage system by controlling an access control device, such as a lock, to grant access to the storage system 800 or one or more storage drawers of one or more storage systems 800.

Server 802 also allows a manager to program multiple storage systems 800 within a designated group 850 at the same time. The manager may select which specific storage systems should be in group 850. Once a user is authorized access to group 850, the user has access to all storage systems within group 850. For instance, a group of storage systems storing tools for performing automotive service may be designated as an automotive tool group, while another group of storage systems storing tools for performing electrical work may be designated as an electrical tool group. Any settings, adjustments or programming made by Server 802 in connection with a group automatically apply to all tool storage systems in that group. For instance, server 802 may program the tool storage systems by allowing an automotive technician to access all tool storage systems in the automotive tool group, but not those in the electrical tool group. In one implementation, each system 800 only includes minimal intelligence sufficient for operation. All other data processing, user authentication, image processing, etc., are performed by server 802.

Similarly, server 802 also allows a manager to program multiple storage drawers 330 within a designated group at the same time. The manager may select which specific storage drawers, of the same system or different storage systems, should be in the group. Once a user is authorized access to the group, the user has access to all storage drawers within the group. For instance, a group of storage systems storing tools for performing automotive tools may be designated as an automotive tool group, while another group of storage systems storing tools for performing electrical work may be designated as an electrical tool group.

In another implementation, an exemplary networked storage system as shown in FIG. 8 utilizes hierarchical authorization architecture to manage access to storage systems. One or more storage systems 800 are given the status of master storage system. Each master storage system has one or more associated slave storage systems. If a user is authorized to access to a master storage system, the same user is automatically authorized to access any slave storage system associated with that master system. On the other hand, if a user is authorized to access a slave storage system, the authorization to the slave system does not automatically grant the user access to its associated master storage system or other slave storage systems associated with the same master storage system.

According to still another implementation, an exemplary networked storage system as shown in FIG. 8 grants user access by utilizing multiple hierarchical authorization levels. Each authorization level is associated with pre-specified storage systems, which can be programmed by a manager via server 802. When a user is assigned a specific authorization level, this user is authorized to access all storage systems associated with the assigned authorization level and all storage systems associated with all authorization levels lower than the assigned authorization level in the authorization hierarchy, but not to those associated with authorization levels higher than the assigned authorization level in the authorization hierarchy.

Audit

An exemplary inventory control system according to this disclosure tracks various types of information related to each access. For example, system 800 records date, time and/or duration for each access, and corresponding user information submitted by a user to obtain access to system 800. As discussed earlier, system 800 captures one or more images of the storage unit during each access for determining an inventory condition. The images are linked to each access and accessing user and stored in system 800. System 800 may store the information locally or upload the obtained information to server 802 via the wireless communication network, as shown in FIG. 8.

Server 802 may process and compile the information received from each system 800, to create an audit trail for each server 802. The audit trail is accessible by managers or users with suitable authorization levels. Different types of audit trails may be generated and retrieved based on preference of authorized users. For instance, an audit trail may be generated for one or more specific dates, one or more specific users, one or more specific tools, one or more IDs, etc. Additional information and analysis may be generated and provided by server 802. For example, system 802 may track usages of a specific tool over time, and generate a report summarizing a usage frequency for each tool for evaluation. Such report may be used to determine what tools are used more frequently and which tools probably are not needed because they are used less often than others.

FIG. 9A shows an exemplary screen of an audit trail with respect to a specific storage system 800. Each access to system 800 is identified by Date/Time 920 and user information 910 of users associated with each access. User information may include any information submitted by a user when requesting access to system 800, such as finger prints, facial recognition images, user images taken by user cameras, passwords, information stored in keycards, any information for authentication, etc. In one implementation, data of user facial characteristics of each user is stored in system 800 or server 802. For each access, an image of a user accessing system 800 is captured by a user camera. User information submitted by the user for gaining access to system 800, such as information stored in a keycard and/or password, is collected. The captured image is compared against user facial characteristics of a user identified by the user information. System 800 or server 802 determines whether the facial characteristics of the user accessing system 800 matches facial characteristics of the user identified by the user information.

Figure 9B:
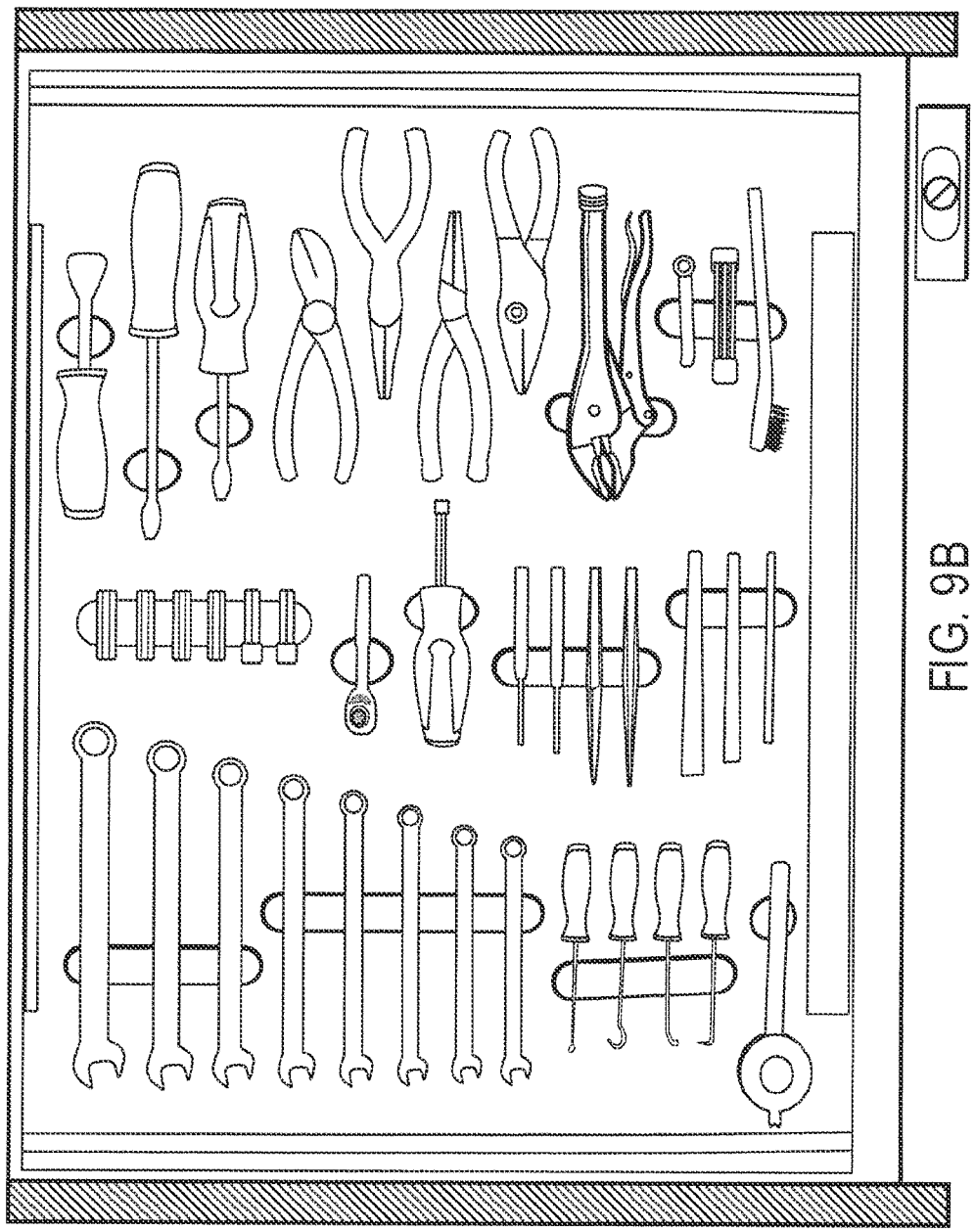
Figure 9C:
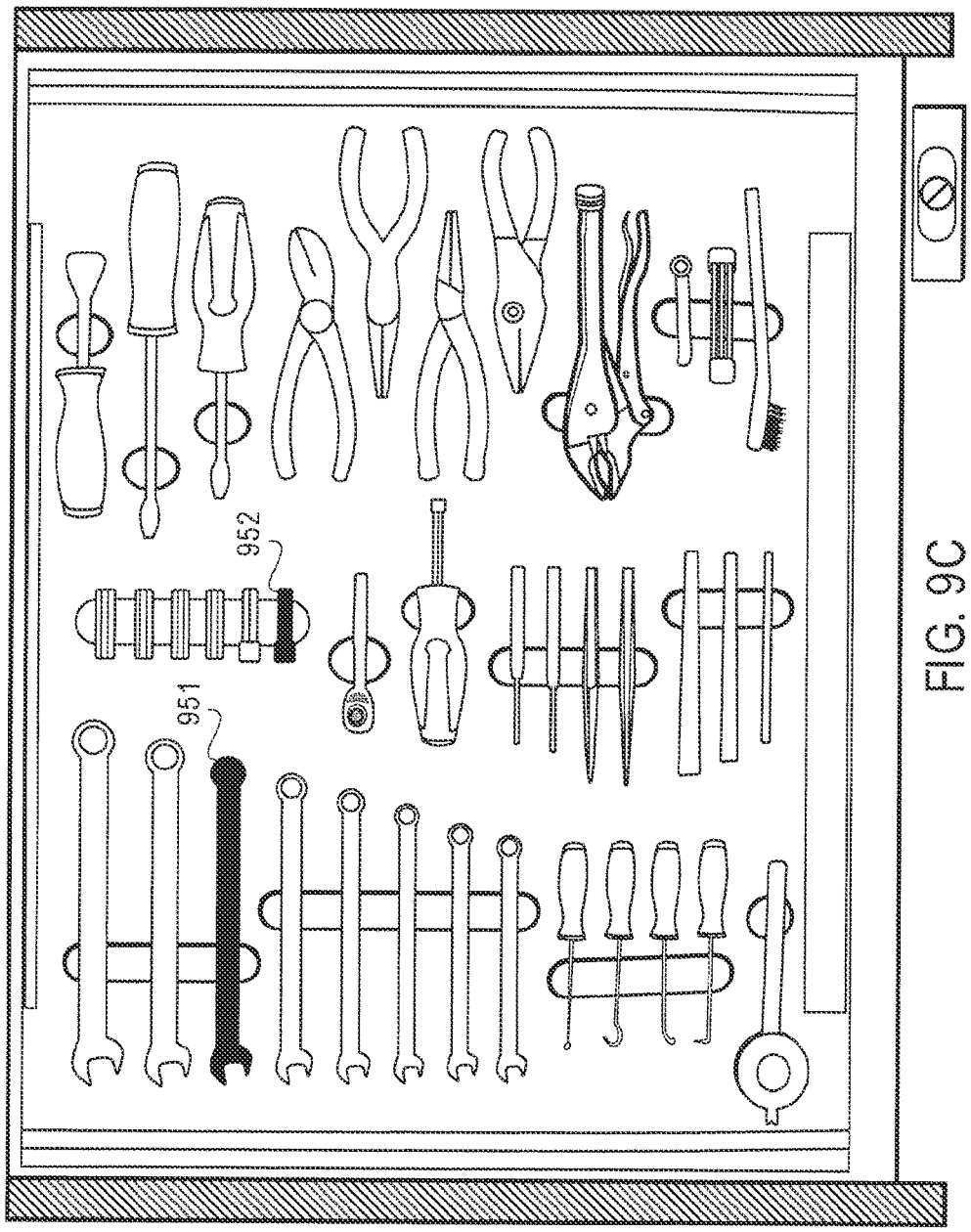
Figure 9D:
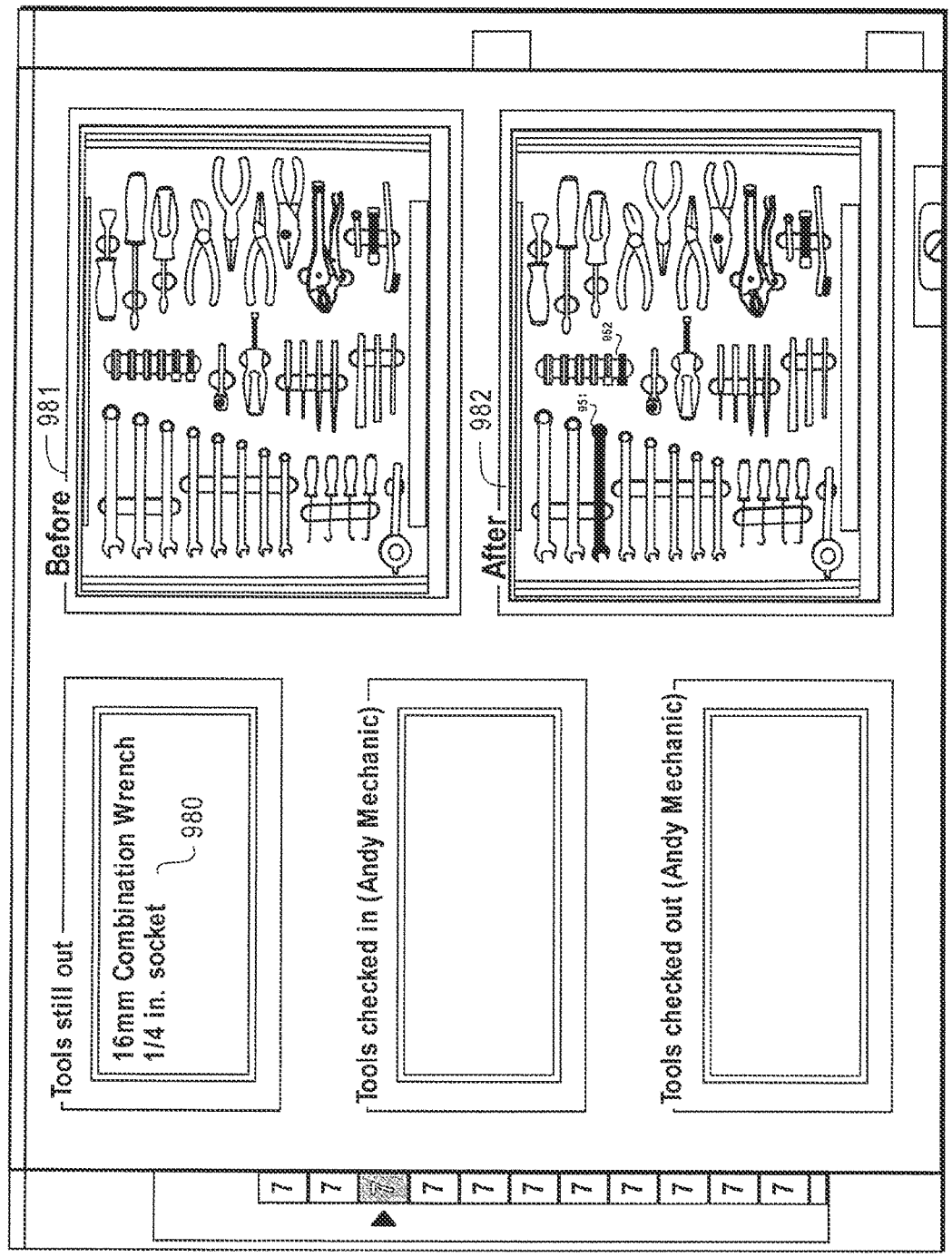

One or more images are taken during each access to storage system 800. FIG. 9B shows an exemplary "before access" image taken by cameras of system 800 before a user has access to the storage locations or when the drawer is moving in the first direction, as discussed earlier in this disclosure. As shown in FIG. 9B, each tool is properly stored in its corresponding storage location. FIG. 9C shows an exemplary "after access" image taken by cameras of system 800 after the access is terminated or when a storage drawer moves in the second direction as discussed earlier. As shown in FIG. 9C, tools corresponding to storage locations 951 and 952 are missing. Based on the image shown in FIG. 9C, system 800 determines that tools in storage locations 951 and 952 are missing. An audit trail is generated regarding the missing tools and the user associated with the access. FIG. 9D shows an exemplary record stored in system 800 and/or server 802, in which both "before access" and "after access" images 981 and 982 are stored. Missing tools are identified according to "after access" image 982 and listed in area 980.

Tool Highlighting Capability

In one implementation, the instant application describes an effective inventory control system that improves efficiencies and reduces time spent in identifying tool storage locations for issued tools to be returned, tools incorrectly issued to the user, tools due for calibration and inspection, tools out for calibrations and inspection, broken tools, lost tools, and to identify tool storage locations in simple tool searches.

Figure 10:
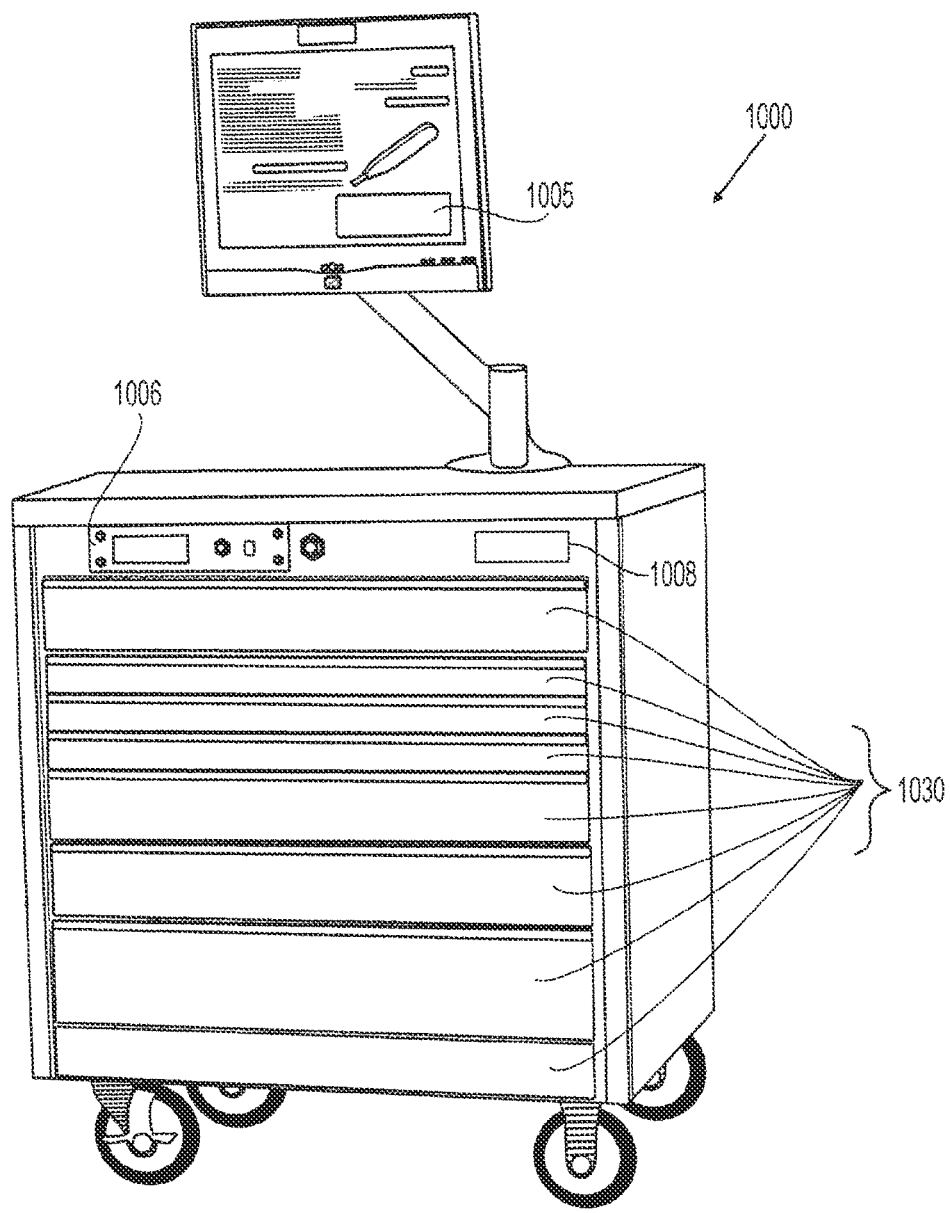
FIG. 10 illustrates an exemplary inventory control system that is configured to improve efficiencies and reduce time spent in identifying tool storage locations for issues tool to be returned to a tool storage device.

FIG. 10 illustrates an exemplary inventory control system 1000 that is configured to improve efficiencies and reduce time spent in identifying tool storage locations for issues tool to be returned to a tool storage device. The inventory control system 1000 includes a display 1005, an access control device 1006, and a tool storage device 1030. The display 1005, the access control device 1006, and the tool storage device 1030 are similar to the display 305, the access control device 306, and the tool storage device 330 described with respect to FIG. 3 of the instant application. Therefore, for the sake of brevity and clarity of description, their redundant aspect are not further described here. Similar to the inventory control system 300, the inventory control system 1000 also includes a data processor. The data processor of the inventory control system 1000, however, includes improved functionality.

The data processor may be in the display 1005 and/or the tool storage device 1030. Alternatively, the data processor may be remote from the inventor control system 1000. Alternatively, the data processor may be a distributed data processor with a portion thereof within the inventory control system 1000 and a portion thereof across the network within a server such as, for example, server 802 shown in FIG. 8.

The data processor may be configured to receive a request for identifying a target object. The target object may include a tool or may include a storage location housing the tool. In response, the data processor may identify the target location image associated with the target object. The target location image may include an image of a drawer or a tray housing the target object. The target location image may be obtained by the image sensing device of the inventory control system 1000. Although not shown, the image sensing device may be similar to the image sensing device 330 described with respect to the inventory control system 300 shown in FIG. 3.

The target location image may take several forms. In one implementation, the target location image may include an actual image of the location (e.g., the drawer or the tray) housing the target object. Specifically, the target location image may show an image of the objects within the drawer or the tray and the storage locations associated with the objects that have been taken out of the drawer or the tray. Alternatively or additionally, the target location image may include generated 2-D or 3-D models, sketches, maps, grids, etc of the location housing the target object. Some locations may utilize multiple views to convey the necessary information, such as a front view 2-D model of the drawers or trays in a tool storage device to locate the target drawer or tray and a top down digital image of the drawer or tray contents to locate the target object.

The data processor may also identify the coordinates associated with the target object within the target location image. The coordinates may be taken from a specific reference point on the target location image. In one specific example, the coordinates may be in X-Y coordinate format with zero X-Y coordinates corresponding to the bottom left corner of the target location image. The target object may include four coordinates, one for each corner of a rectangular box surrounding the target object. To this end, the target object includes two X coordinates, representing the horizontal distance of each corner of the box from the bottom left corner of the target location image. The target object also includes two Y coordinates, representing the vertical distance of each corner of the box from the bottom left corner of target location image. The coordinates of the target object may be measured by the processor at the time the tool object is issued to the user.

Upon identifying the coordinates of the target object, the processor may apply a visual contrast element to the target location image at the identified coordinates associated with the target object to draw the user's attention to the target object. The visual contrast element may include graphics configured to draw a user's attention to the target object.

The visual contrast element may be varied to indicate various states or input modes for the target object. The inventory control system 1000 may identify the target object through alternating colors, animated cursors, contrasting focus, movement, zoom effects, background effects, border effects, or some other graphics method designed to draw the users' attention to the target object.

The data processor may also be configured to display a visual representation of the inventory control system 1000 and apply a visual contrast element to the visual representation of the inventory control system 1000. To this end, the visual contrast element may be applied to the drawer or tray to distinguish the drawer or tray housing the target object from other drawers or tray. As noted above, the tool storage device 1030 contains a plurality storage drawers or trays. To draw user's attention to a target object, the inventory control system 1000 may identify to the user both the drawer or tray containing the target object and the location of the target object within the drawer or tray. For example, first, an outline drawing of the inventory control system 1000 that depicts the relative size, shape, and location of the storage drawers or trays in the system 1000 may be displayed on the display 1005. The target drawer or tray may be indicated on the outline drawing by a visual contrast element. The visual contrast element, in one specific example, may include a flashing alternating colors. When the user opens the indicated target drawer or tray on the display 1005, the inventory control system 1000 may then display on the display 1005 a target location image. The target location image may include a top down digital image of the drawer or tray foam contents. The target object may include a tool within the drawer or may include a space for storing the tool within the drawer. In either case, the target object within the target location image may be identified using a visual contrast element.

Figure 11:
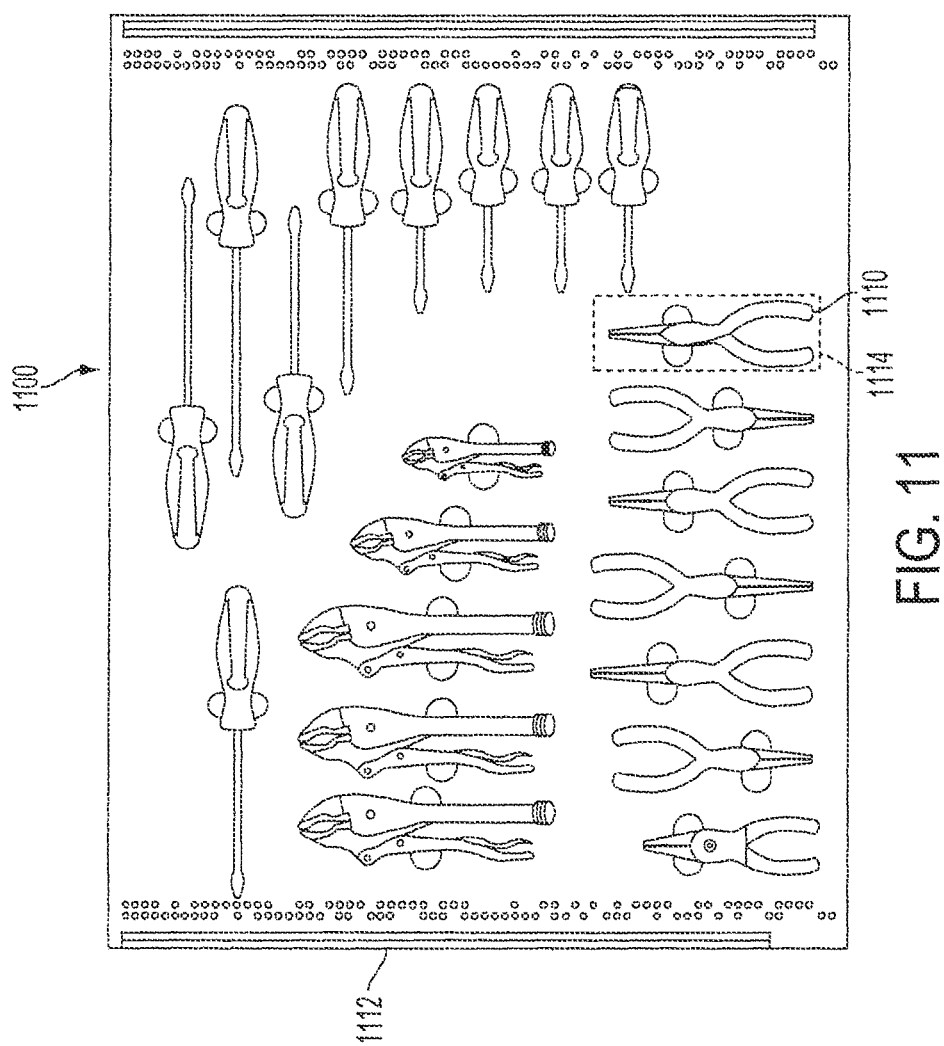
FIG. 11 illustrates an exemplary digital image of a drawer or tray of the inventory control system shown in FIG. 10 with a visual contrast element being applied to a target location image to identify a target object.

FIG. 11 illustrates an exemplary digital image 1100 of a drawer or tray with a visual contrast element 1110 being applied to a target location image 1112 to identify the target object 1114. The target object 1114 is shown to be a clamp, however, it can include other objects. The visual contrast element 1110 is shown as a white box surrounding the target object 1114, however, it can be in other shapes or form. In a slightly different implementation, the target object 1114 may correspond to the storage location housing the clamp and the visual contrast element 1112 may be applied to the storage location within the target location image 1112.

Although the tool storage device 1030 of the inventory control system 1000 is shown to be composed of drawers or trays, it can be composed of other storage mechanism. For example, instead of the drawers or trays, the inventory may be stored on shelving housed in open racks or within cabinets.

The inventory control system 1000 may also include a bar code scanner 1008 for scanning returning items. The inventory control system 1000 may be configured as a central location for return of inventory. The inventory may be issued and returned at a central location using the bar code scanner 1008. The bar code scanner 1008 is configured to read the bar code appearing on the inventory that is being returned to the inventory control system 1000 and communicates the bar code to the processor of the inventory control system 1000. The processor identifies the target location image with the target coordinates within the target location image associated with the bar code. The inventory control system 1000 then applies a visual contrast element to the coordinates within the target location image and displays the target location image with the visual contrast element to the user on the display 1005. This way the user may be able to easily identify the storage location for the inventory item that is being returned to the inventory control system 1000.

In one implementation, the inventory control system 1000 is configured to store information about the inventory item that has been issued to the user. The information may include the target location image information along with the coordinates of the inventory item within the target location image. The information may be associated with a user and/or with the inventory item. For example, the information may be associated with an identifier of the user to whom the inventory item is being issued or checked out. Alternatively or additionally, the information may be associated with the ID of the inventory item that is being issued or checked out to the user. The ID of the inventory item may include an RFID, a bar code, or other sequence of digits or patters appearing on the inventory item.

The ID may be used to scan the inventory item against the scanner 1008. In this manner, the inventory control system 1000 may identify the previously stored target location image and the coordinates associated with the ID and may apply a visual contrast element to the target location image at the target object coordinates. The processor may then display on the display 1005 the target location image along with the visual contrast element.

In one implementation, the inventory control system 1000 is a standalone system in the storage room. In this scenario, the inventory control system 1000 may display relative size, shape, and location of drawers or trays in the tool storage device 1030 and may distinguish, from among all the drawer or trays within the tool storage device 1030, the drawer or the tray to which the target object should be returned. The drawer or the tray may be distinguished by the application of a visual contrast element to the drawer or the tray. This way the user can easily identity which drawer or tray should be opened for returning the target object. Upon selecting the distinguished drawer or tray, the inventory control system 1000 displays a 2-D top-down model view of inside of the drawer or tray showing the storage location of the inventory item that is being returned highlighted using the visual contrast element. The selection of the distinguished drawer or tray can be accomplished by manually opening the distinguished drawer. The inventory control system 1000 can detect this event and can change the display accordingly to show the 2-D top-down model view of the drawer or tray with the storage location of the inventory item highlighted using the visual contrast element. Alternatively, the selection of the distinguished drawer or tray can be accomplished via the display 1005. The display 1005 may be touch sensitive and the user may select the distinguished drawer or tray by touching the distinguished drawer or tray on the display 1005. Alternatively or additionally, the selection may be performed by clicking on the distinguished drawer or tray using a mouse. The inventory control system 1000 can detect this event and can change the display accordingly to show the 2-D top-down model view of the drawer or tray with the storage location of the inventory item highlighted using the visual contrast element.

In another implementation, the inventory control system 1000 may not be a standalone system and may be in communications with other inventory control systems using the network structure shown and described with respect to FIG. 8 or shown and described later in the application with respect to FIG. 15. In this scenario, the inventory control system 1000 may act as a central inventory control system identifying the locations of a target object among the inventory systems in communications with each other. In keeping with the previous example, assuming the user wishes to return an inventory item to one of the inventory control systems in communication with each other, the user may scan the item against the scanner of the inventory control system 1000. Similar to before, the inventory control system 1000 is configured to store information about the inventory item that has been issued to the user. The information may include the location image information along with the coordinates of the inventory item within the location image information. The location image information in this scenario, however, may correspond to a drawer or tray in one of the inventory control systems in communication with the inventory control system 1000. Therefore, the inventory control system 1000 identifies the corresponding inventory control system to the user. To this end, the inventory control system 1000 displays a 2-D overhead model view of the storage room with an animated arrow pointing to the location of the inventory control system and the associative cabinet, drawer, or tray within the inventory control system storing the target object. The inventory control system 1000 may display a 2-D front facing model view of the cabinet with an animated arrow indicated the shelf to return the scanned inventory. Once the user selects the cabinet, drawer, or tray housing the target object, the inventory control system 1000 identifies the storage location for the inventory item that is being returned on the top-down model view of the drawer or tray or front facing model view of the cabinet.

In addition to being used to identify the storage location of the inventory item that is being returned, the inventory control system 1000 may be used for other purposes. For example, the inventory control system 1000 may be used to identify working location of each issued inventory item. Tools may be issued to a metrology lab for calibration, for example. The inventory control system 1000 is aware of the working storage location for each tool issued to the metrology lab. After calibration, the inventory control system 1000 may be configured to display a 2-D overhead map of the entire facility, with working storage locations identified for each tool that needs to be returned to stock.

In one implementation, the user may request the inventory control system 1000 to identify the working locations of all issued inventory items that need to be returned to stock. The inventory control system 1000 may authenticate the user and upon successful authentication may display working locations of all issued inventory items on the display 1005. The working locations of the issued inventory items may be identified textually on the display 1005. For example, tools issued for repairing the wing of the airplane may be identified as being on the wing of the airplane. Alternatively or additionally, the working locations of the issued inventory items may be identified graphically. The inventory control system 1000 may be configured to display a 2-D overhead map of the entire facility showing the working location of each inventory item.

In another implementation, the inventory control system 1000 may be configured to provide a visual feedback interface. The visual feedback interface may be used for many purposes within the inventory control system 1000. The visual feedback elements may be, for example, customized to present information based on the type of user accessing the system. Alternatively or additionally, the visual feedback element may be used for purposes of entering information associated with an inventory item that is being checked out or an inventory item that is being returned to the inventory control system 1000. Information associated with the inventory item that is being checked out may include, for example, the working location of the item for later reference. Information associated with the inventory item that is being returned may include, for example, information about condition of the inventory item that is being returned. The condition may indicate the inventory item should be calibrated or is damaged and should not be further used. The inventory control system may later use this information to respond to the user's query regarding the working location of an inventory item or the identification of tools requiring maintenance or removal.

In one implementation, it is desired to assist users who are responsible for maintenance of the inventory in the inventory control system 1000 to locate items requiring maintenance or removal, the type of maintenance required, and their assigned storage locations in the inventory control system 1000. A user identified having a maintenance role might be shown a location visualization image with a flashing wrench over items needing maintenance when the system 1000 is accessed. The inventory control system 1000 may have visual feedback restricted to identify only items that have imminent calibration or maintenance operations that need to be performed.

The inventory control system 1000 may identify the type of user accessing the system 1000 using the authentication information provided by the user. The inventory control system 1000 may then reference its memory to determine which tools are associated with the maintenance technician. The tools may correspond to the tools requiring immediate calibration or maintenance operations. The system 1000 may receive the identification of such tools during the normal course of operation. For example, upon returning a tool to the inventory control system 1000, the user may mark the tool as requiring a calibration or maintenance. Marking the tool may be performed via a menu display to the user allowing the desired interaction operation. The desired interaction operation being specifying information about calibration or maintenance that needs to be performed. Upon receiving this information, the system 1000 stores this information in the memory. The information may be stored in a folder for example designated for tools requiring maintenance or calibrations. The information may include the target location image and the target coordinates associated with each of the tools requiring maintenance or calibration. The system 1000 accesses the information and applies a visual contrast image to each identified target location image at the target coordinates and displays the result on the display 1005. In this manner, the system 1000 displays only items that have imminent calibration or maintenance operations that need to be performed.

In another implementation, it is desired to alert users who access the inventory control system 1000 of items that are in an unusable state so that the items are not issued for normal operations. When a user accesses a storage location that contains unusable items, those items may be marked with a flashing red 'X' on the storage location visual representation. The system may receive the identification of such tools during the normal course of operation. For example, upon returning a tool to the inventory control system, the user may mark the tool as being in an unusable state. Upon receiving this information, the system 1000 stores this information in the memory. The information may be stored in a folder for example designated as unusable state tools. The information may include the target location image and the target coordinates associated with each of the tools in an unusable state. The system 1000 accesses the information and applies a visual contrast image to each identified target location image at the target coordinates and displays the result on the display 1005. For example, the system 1000 may display a flashing red 'X' on a storage location visual representation for a storage that contains an unusable tool.

In another implementation, a user identified as a floor supervisor could have visual feedback to identify items that have not been returned within the current shift. Similar to the previous example, the inventory control system 1000 may identify the type of user accessing the system 1000 using the authentication information provided by the user. The inventory control system 1000 may then reference its memory to determine which tools are associated with the floor supervisor. The memory may include information indication that the tools associated with the floor supervisor include tools that have not been returned within the current shift. The system 1000 may receive the identification of such tools during the normal course of operation. For example, within the current shift, the system 1000 may store in the memory information about each tool that is being checked out by the users. This information may be stored in a checked out item folders and may include the target location image and target coordinates associated with each checked out item. The system 1000 accesses the information and applies a visual contrast image to each identified target location image at the target coordinates and displays the result on the display 1005. In this manner, the system 1000 displays only items that have not been returned to the inventory control system 1000 to the floor supervisor.

In another implementation, a user identified as an inventory auditor could have visual feedback to identify tools that have been removed from the system and issued to other locations. In another implementation, it is desired to assist users who are returning inventory issued from the inventory control system 1000 to find the appropriate storage location to return the inventory within the system 1000. When a user accesses the system 1000, a visualization image may be shown highlighting the storage locations for the inventory items issued to that user.

In addition to reporting data to the user, the visual feedback system can be used to efficiently target an inventory item for data entry or a process for the system 1000. A user accesses the system 1000 and is shown a visual representation of the accessed location. Using a mouse, stylus, touch screen, or similar input device, the user interacts with the displayed image to 'select' the item of interest. The image is then changed to reflect the currently selected item. A menu is displayed allowing the user to select the desired interaction operation.

In certain implementations, the automated inventory control system 1000 may have various operations required to enable or update inventory tracking functions. For example, a machine vision based system may require recalibration or retraining if inventory appearance or layout changes. A system that uses embedded chips for inventory identification must be reconfigured if chips are replaced. When these operations must be performed on a particular inventory item, the user can quickly select the item through the visual feedback interface as previously stated.

In another implementation, a calibration technician may need to update the required calibration date for a torque wrench before returning it to the system 1000. The technician may access the inventory control system 1000 and may be guided to the storage location for the wrench as previously stated. The torque wrench is visually selected using one of the previously mentioned methods. The calibration technician may then select "update calibration date" from a context menu and can then enter the updated information for the torque wrench.

In another implementation, employee and/or work location names and pictures can be displayed above items of interest that have been checked out to another user. This may allow a user to quickly determine the owner or location of a needed item that has been issued from the inventory control system 1000. In another implementation, an auditor visually inspecting the system inventory identifies a silhouette pocket that contains a broken tool. The auditor selects the broken tool location from a visual feedback image, and can then open a context menu to bring up a screen showing details about work orders the tool was issued against.

In one implementation, as described above, one of the system features is the ability to generate and save an audit image of the drawer or tray contents for all drawers or trays in the tool storage device 1030. A 'baseline' audit image is saved for use as the location reference image for each drawer or tray. Because the machine vision tool detection algorithm already requires knowledge of the storage device drawer or tray configuration and location of the individual items within the drawer or tray, no human intervention may be necessary to generate the visual feedback display of the instant application.

In another implementation, the inventory control system 1000 stores inventory items in silhouette pockets that are machine cut into tool control foam. A separate software package may be used to generate the foam layout for each foam sheet. The data files exported by these programs for use by a foam cutting machine can be used to generate a 2-D overhead view of the pockets cut into the foam. These data files may be used to identify coordinates of the target object In another implementation, a digital picture is manually taken of a tool control foam sheet. Image segmentation algorithms based on the contrasting background and foreground of the foam can be used to determine item of interest locations.

In another implementation, the user imports a location visual reference image that is created by some other means and a reference file that lists the coordinates to associate with each item of interest in the location. This could be a CAD generated 2-D or 3-D model of the location, a digitally scanned sketch of the location, or a digital photograph of the area. The reference file may associate a coordinate location, size, icon, animation, or some other visual information with each item of interest that is stored in the location.

Figure 12:
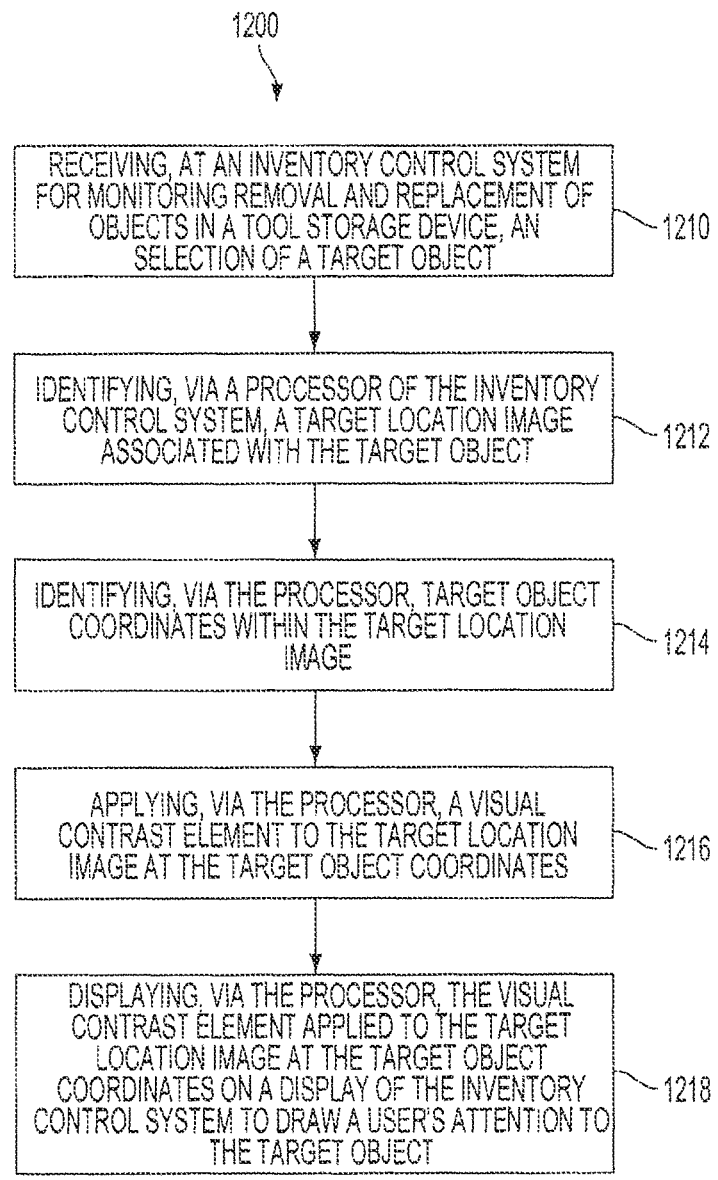
FIG. 12 illustrates an exemplary process for applying a visual contrast element to the target location image at target coordinates to highlight a target object.

FIG. 12 illustrates an exemplary process 1200 for applying a visual contrast element to the target location image at target coordinates to highlight a target object. The process 1200 begins with receiving, at an inventory control system 1000, a selection of a target object (Step 1210). The selection of the target object may include receiving a selection of the target object from a user operating the inventory control system 1000. Alternatively or additionally, the selection of the target object may include receiving a selection of the target object from the processor of the inventory control system responsive to the user returning a tool to the tool storage device. The target object may include a tool for storage in the tool storage device. Alternatively or additionally, the target object may include a storage location for housing a tool in the tool storage device.

Upon receiving the selection of the target object, the inventory control system 1000 identifies a target location image associated with the target object (Step 1212) and target object coordinates within the target location image (Step 1214). The target location image may include an image of a drawer or a tray within the tool storage device 1030 housing the target object. The target object coordinates may include coordinates of the target object within the target location image. The inventory control system 1000 then applies a visual contrast element to the target location image at the target object coordinates (Step 1216). The visual contrast element may identify the target object using graphics configured to draw the user's attention to the target object. Using graphic may include using a color, an animated cursor, contrasting focus, a movement, zoom effect, and/or background effect.

The inventory control system 1000 then displays the visual contrast element applied to the target location image at the target object coordinates on the display 1005 of the inventory control system 1000 to draw a user's attention to the target object (Step 1218). The inventory control system 10000 may also display relative size, shape, and location of drawers or trays of the tool storage device. The inventory control system 1000 may distinguish, from among the drawers or trays, a drawer or tray housing the target object. Upon receiving a selection of a user selection of the distinguished drawer or tray housing the target object, the inventory control system 1000 displays the visual contrast element applied to a digital image of the distinguished drawer or tray at the target object coordinates on the display of the inventory control system 1000 to draw the user's attention to the target object.

In another implementations, the inventory control system 1000 displays relative size, shape, and location of shelvings housed within cabinet of the tool storage device. Then, the inventory control system 1000 distinguishes, from among the shelvings, a shelf housing the target object. Upon receiving a selection of a user selection of the distinguished shelf housing the target object, the inventory control system 1000 displays the visual contrast element applied to a digital image of the distinguished shelf at the target object coordinates on the display of the inventory control system to draw the user's attention to the target object.

In one implementation, receiving the selection of the target object may include receiving via a scanner an identifier of the target object being returned to the inventory control system 1000. The inventory control system 1000 identifies a housing location image of a housing configured to house the returned target object and also identifies coordinates of the returned target object on the housing location image. The housing location image may include the location image of the drawer, tray, or shelf. The inventory control system 100 applies the visual contrast element to the housing location image at the returned target object coordinates and displays the visual contrast element on the display 1005. Displaying the visual contrast element may include displaying the visual contrast element applied to the housing location image at the returned target object coordinates on the display of the inventory control system to remind the user of a storage location of the target object.

In another implementation, the inventory control system 1000 identifies a type of user accessing the inventory control system. In this scenario, receiving the selection of the target object may include receiving a selection of the tool associated with the identified type of user. The inventory control system 1000 then identifies a housing location image of a housing configured to house the tool associated with the identified type of user and further identifies coordinates of the tool on the housing location image. The inventory control system 1000 may then apply the visual contrast element to the housing location image at the coordinates of the tool associated with the identified type of user. The inventory control system 1000 may also display the visual contrast element on the display 1005.

In another implementation, the inventory control system 1000 identifies a user accessing the inventory control system and identifies an inventory item checked out to the user. The inventory control system 1000 may then identify a housing location image of a housing configured to house the checked out inventory item to the user and coordinates of the checked out inventory item on the housing location image. The inventory control system 1000 may then apply the visual contrast element to the housing location image at the coordinates of the checked out inventory item, and may display the visual contrast element to the housing location image at the coordinates of the checked out inventory item on the display 1005.

In one implementation, responsive to a user logging in and opening a drawer having previously issued a tool to the user, the inventory control system 1000 activates the selection of the target object to be highlighted.

Issue and Return Tools in Removable Pallets

If an industry desires to group tools together for specific job requirements or as a kit of similar or identical tools, there may be a need to subdivide the foam layouts with cutouts for specific tools into pallets. The pallets can be issued from the tool storage unit as a whole with all the kitted tools included therein, or individual tools can be issued and returned while the pallet remains in the tool storage device.

Referring again to FIG. 10, in another implementation, the data processor of the inventory control system 1000 is further configured to receive information representing the image of the storage locations, and is further configured to receive information representing a removable section of the layered material which contains storage locations for storing the objects and the silhouette shape and location as well as the tool data. In addition to being able to track issue and return of individual objects from the tool storage device 1030, the data processor may also be able to track issue and return of tool pallets containing storage locations for a specific array of tools.

The primary conventional solution may be to issue individual tools and carry them to the work location. In some cases, a foreign object damage (FOD) bag is contained in the tool storage device 1030. The FOD bag may be a small to medium sized canvas tool bag with a heavy zipper. The FOD bag may be removed from the tool storage device 1030 and issued to the user. The user may then collect the tools needed from the tool storage device and packs them in the FOD bag to carry to the workplace.

The pallet feature of the instant application may allow groupings of tools contained in removable sections (or pallets) of the drawer or tray foam of the tool storage device 1330. The status of the pallets and tools may be tracked based on the following conditions: When the pallet is in the drawer or tray, the tools contained within the pallet may be examined by the inventory control system 1000 (e.g., the data processor) to determine their absence/presence/correctness. Each tool may be tracked independent from its pallet. When the pallet is taken from the box, the inventory control system 1000 may issue the pallet as well as all tools in the pallet which were present at the time of removal. When the pallet is replaced that pallet will be "turned in" after being examined for absence/presence/correctness. All tools in the pallet will be reexamined for absence/presence/correctness once the pallet is determined to be present. In one specific example, a pallet is a container housed within the drawer or the tray and is configured to hold pre-designated tools. The container includes a specific storage section within the drawer or the tray.

The display 1005 of the inventory control system 1000 may accurately display the pallet/parent to tool/child relationship as well as each element's absent/present/correct state. Alternatively or additionally, this information may be displayed on a remote server 802 by using, for example, an inventory control system admin client. The relationship between the pallet and its corresponding tools may be displayed through a variety of methods including: (a) a table with the pallet as the header and the pallet's tools as indented entries, (b) an image of the pallet showing all of its tools, (c) a "parent" or "pallet" column in a list of tools that would associate each tool with its parent pallet, (d) a "parent" or "pallet" field on a tool option screen that would associate the tool with its parent pallet, (e) a "pop-up" window containing a list of child tools that appears when an image of a pallet is touched, and/or (d) a "pop-up" window containing a list of child tools that appears when a pallet entry in a table is touched.

Figure 13:
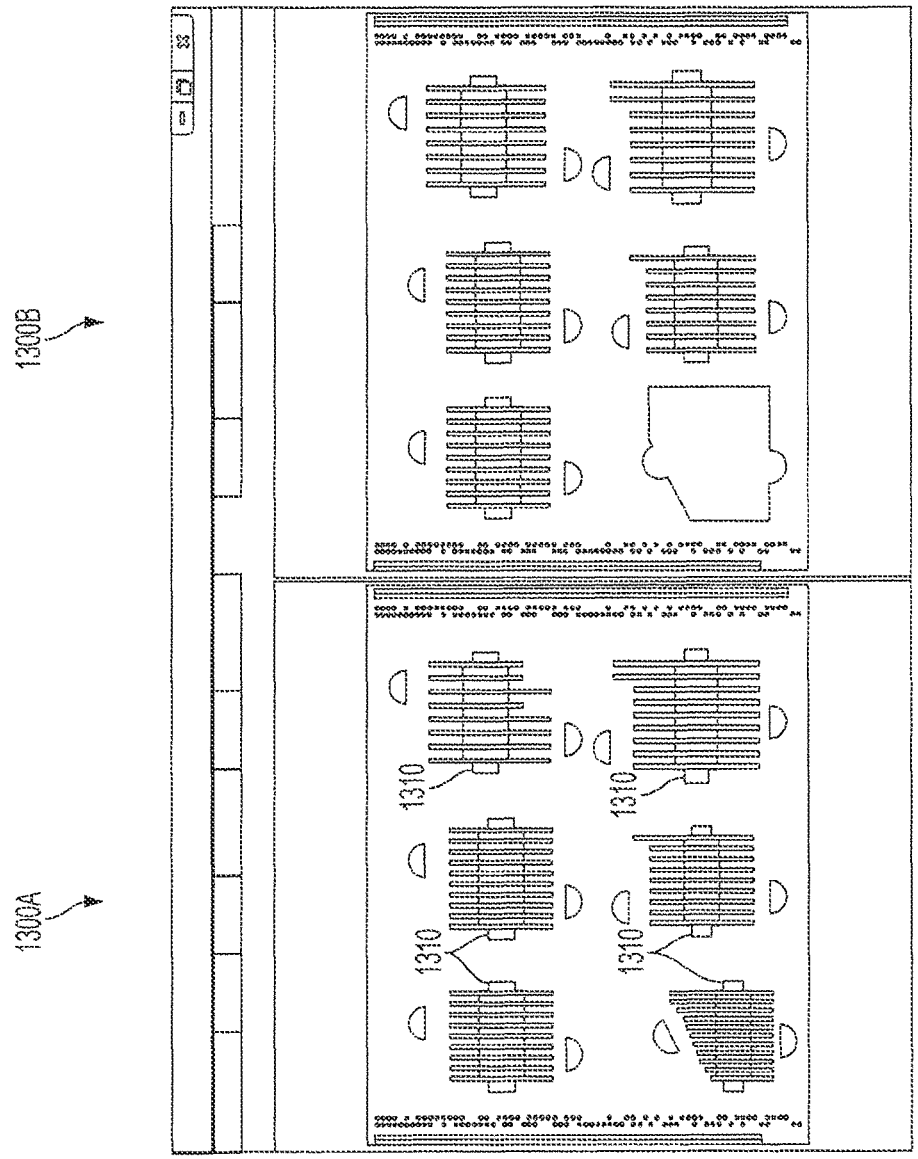
FIG. 13 illustrates exemplary user interfaces that may be displayed on the display of the inventory control system shown in FIG. 10 to show the status of each pallet and its corresponding tools.

FIG. 13 illustrates exemplary user interfaces 1300A and 1300B that may be displayed on the display 1005 of the inventory control system 1000 shown in FIG. 10 to show the status of each pallet and its corresponding tools. The exemplary user interface 1300A illustrates an image of the drawer or tray within the tool storage device 1030. As shown, the drawer or the tray includes a plurality of pallets 1310 located within their respective storage locations. The exemplary user interface 1300B illustrates another image of the same drawer or tray within the tool storage device 1030 with one of the pallets 1310 being removed from its storage location.

The inventory control system 1000 determines the presence or absence of pallets 1310 in drawers 1030 based on captured images using a variety of possible strategies. Suitable software may be executed by the embedded processor or an attached computer (PC) for determining presence or absence of pallets and their corresponding tools based on captured images.

In one example, system 1000 determines an inventory condition of a storage drawer based on empty pallet storage locations in the drawer. Each pallet storage location in the drawer is configured to store a pre-designated pallet 1310 and each pallet 1310 is configured to store pre-designated objects, such as pre-designated tools. A non-volatile memory device of system 1000 stores information identifying a relationship between each known pallet storage location in the drawer and its corresponding pre-designated pallet 1310. The non-volatile memory device of system 1000 also stores information identifying a relationship between each pallet 1310 and its pre-designated storage tools. The memory device also stores information of two baseline images of the drawer: one baseline image having each of its pallet storage locations occupied by the corresponding pre-designated pallet 1310, and another baseline image having its pallet storage locations unoccupied. In determining an inventory condition of the drawer, the data processor compares an image of the drawer and each of the baseline images. Based on a difference of the images, the data processor determines which pallet storage location in the drawer is not occupied by its corresponding pre-designated pallet 1310. The identity of the missing pallet 1310 is determined based on the stored relationship identifying each pallet storage locations and their corresponding pre-designated pallets. The identity of missing tools within the applet is determined based on stored relationship between the identified missing pallet 1310 and its pre-designated tools. Alternatively, the identity of missing tools within the applet 1310 may be determined based on stored relationship between the pallet storage location identified as missing a pallet 1310 and the pre-designated tools for the pallet storage location. Upon identifying the missing pallet 1310, the processor issues the pallet 1310 along with its corresponding tool to the user as being checked out.

When the pallet 1310 is placed back in its storage location that pallet 1310 will be "turned in" after being examined for absence/presence/correctness. The processor may examine the tools in the pallet 1310 to identify which tools are present/absent in the pallet 1310. The memory stores a baseline image of the drawer having each of its pallet storage locations occupied by the corresponding pre-designated pallet 1310 and each of the pre-designated pallet 1310 also occupied by its pre-designated tools. In this scenario, the data processor compares an image of the drawer and the baseline image and based on a difference of the images, the data processor determines which storage locations within the pallet 1310 are empty. The identity of the missing tool within the pallet 1310 is determined based on the stored relationship identifying each storage location in the pallet 1310 and their corresponding pre-designated tool.

In another implementation, the baseline image includes an image with all pallet storage locations in a drawer unoccupied by their corresponding pre-designated pallets 1310. Based on a comparison of the captured image and the baseline image, the system 1000 determines which pallet storage location have corresponding pre-designated pallet 1310 and which locations do not. Missing pallets 1310 may be determined based on the stored relationship identifying each pallet storage location and their corresponding pallets 1310. The identity of missing tools within the applet 1310 is determined based on stored relationship between the identified missing pallet 1310 and its pre-designated tools. Alternatively, the identity of missing tools within the applet 1310 may be determined based on stored relationship between the pallet storage location identified as missing a pallet 1310 and the pre-designated tools for the missing pallet 1310 or the storage location identified as missing the pallet 1310. In a similar fashion, instead of storing a baseline image of the drawer having each of the storage locations within the pallet 1310 occupied by the corresponding tool, the memory may store a baseline image of the drawer having each of the storage locations within the pallet not occupied by its pre-designated tools. In this scenario, the data processor compares an image of the drawer and the baseline image and based on a difference of the images, the data processor determines which storage locations within the pallet 1310 are occupied or empty. The identity of the missing tool within the pallet 1310 is determined based on the stored relationship identifying each storage location in the pallet 1310 and its corresponding pre-designated tool.

In still another implementation, the baseline image has some pallet storage locations occupied by their respective pre-designated pallets 1310, while other pallet storage locations are not occupied by their respective pre-designated pallets 1310. The memory device of system 1000 stores information identifying a relationship between each known pallet storage location in the drawer and its corresponding pre-designated pallet 1310, and information on which locations are or are not occupied by their corresponding pre-designated pallets 1310. The memory device of system 1000 also stores information identifying a relationship between each known pallet 1310 in the drawer and its corresponding tools within, and information on which storage locations within the pallet 1310 are or are not occupied by their corresponding pre-designated tools. The system 1000 compares a captured image of a drawer with the baseline image, and determines a difference. Based on the determined difference and the information on which pallet storage locations are or are not occupied by their corresponding pre-designated pallets 1310, system 1000 determines which pallet storage locations have corresponding pre-designated pallets and which locations do not. Missing pallets 1310 may be determined based on the stored relationship identifying each pallet storage locations and their corresponding pre-designated pallets 1310. The system 1000 also determines which storage locations within pallets 1310p present in the drawer or the tray are or are not occupied by their corresponding pre-designated tools. Missing tools may be determined based on the stored relationship identifying each storage location and its corresponding tool.

Another implementation according to this disclosure utilizes specially designed identifier for determining presence or absence of pallets 1310 and their corresponding tools. Depending on whether a pallet storage location is being occupied by a pallet 1310, an associated identifier appears in one of two different manners in an image captured by the image sensing device. For instance, an identifier may appear in a first color when the associated pallet storage location is occupied by a pallet 1310 and a second color when the associated pallet storage location is unoccupied. The identifiers may be texts, one-dimensional or two-dimensional bard code, patterns, dots, code, symbols, figures, numbers, LEDs, lights, flags, etc., or any combinations thereof. The different manners that an identifier may appear in an image captured by the image sensing device include images with different patterns, intensities, forms, shapes, colors, etc. Based on how each identifier appears in a captured image, the data processor determines an inventory condition of the object.

Figure 14A:
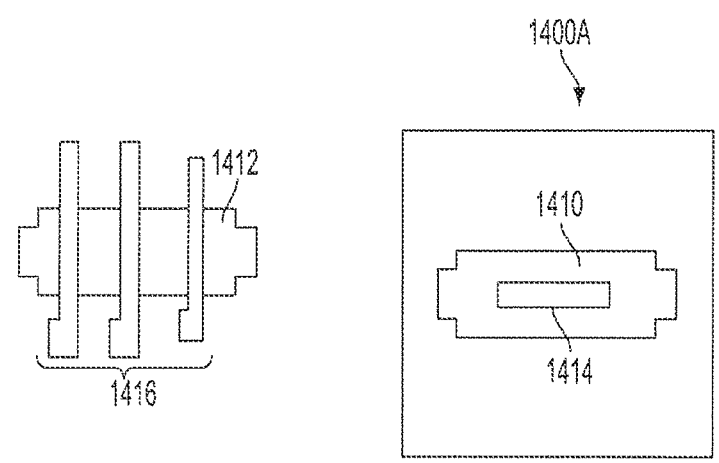
FIGS. 14A-14C illustrate an exemplary implementation of identifier designs for identifying missing pallets and missing tools within present pallets.
Figure 14B:
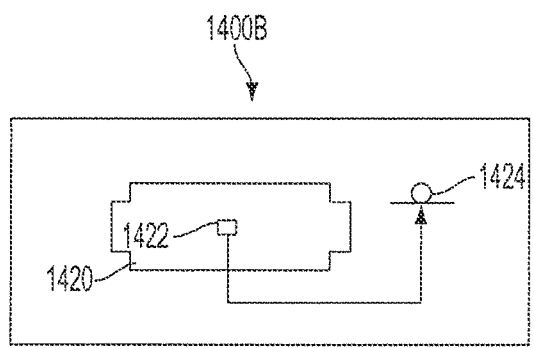
Figure 14C:
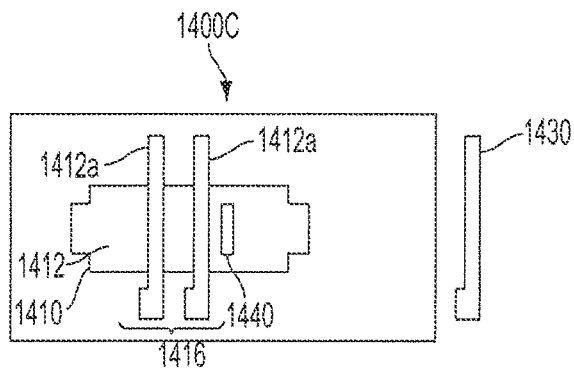

FIGS. 14A-14C illustrate an exemplary implementation of identifier designs for identifying missing pallets and missing tools within present pallets. As shown in FIG. 14A, pallet storage location 1410 is designated to store pallet 1412. The pallet 1412 is configured to store tools 1416 within its storage location. Each tool 1416 may be associated within a specific location within the pallet 1412. The pallet storage location 1410 has an associated identifier. Depending on whether the pallet storage location 1410 is being occupied by a corresponding pallet 1412, the identifier appears in an image captured by cameras of the inventory control system 1000 in one of two different manners. For example, the identifier may not be viewable by cameras of the inventory control system 1000 when a corresponding pallet is stored in the respective storage location, and becomes viewable by cameras of the inventory control system 1000 when a pallet 1412 is not stored in the respective pallet storage location. Similarly, a different implementation may have an identifier viewable by the image sensing device when a pallet 1410 is stored in the respective pallet storage location 1410, and is not viewable by the image sensing device when the pallet 1412 is not stored in the respective pallet storage location 1410.

For instance, the bottom of pallet storage locations 1410 includes an identifier 1414 made of retro-reflective material. Since the pallet storage locations 1410 is not occupied by its respective designated pallet 1412, the identifier 1414 is viewable to the image sensing device. On the other hand, if the pallet storage location 1410 is occupied by its designated pallet 1412, the identifier 1414 is blocked from the view of the image sensing device as shown, for example FIG. 14C. In FIG. 14C, however, another identifier is viewable to the image sensing device. This identifier indicates the absence of one of the tools 1416 from the pallet 1412 which has been returned to the pallet storage location 1410.

The inventory control system 1000 detects locations with missing pallets 1412 and correlates the empty locations with stored relationship identifying each pallet storage locations and their corresponding pallets 1412. The system 1000 also determines which pallets are not in their specified locations in a drawer. It is understood that the identifiers may be implemented in many different manners. For instance, the identifiers may be designed to create a high intensity image when a storage location is occupied and an image with less intensity when the storage location is occupied.

In one implementation, each identifier is implemented with a contact sensor and an LED. As shown in FIG. 14B, the pallet storage location 1420 is associated with a contact sensor 1422 and an LED 1424. When contact sensor 1424 senses a pallet 1412 is in storage location 1420, a signal is generated by contact sensor 1422 and controls to turn off power supply to LED 1424. On the other hand, if contact sensor 1422 detects that a pallet 1412 is not in storage location 1420, the contact sensor 1422 generates a control signal which controls to turn on LED 1444, which creates a high intensity area in an image captured by the image sensing device. Each high intensity area in an image indicates a pallet storage location without an associated pallet 1412. The system 1000 identifies removed or missing pallets 1412 by determining which pallets storage locations 1422 are not occupied by pallets 1412 and pre-stored information identifying corresponding pallets of the locations. In still another implementation, the identifier is unique to the pre-designated pallet 1412 stored in each respective pallet storage location 1422. The data processor is configured to determine an inventory condition by evaluating whether at least one viewable identifier exists in an image of the pallet storage locations 1422 captured by the image sensing device, and pre-stored relationship between each pre-designated pallet 1412 and a respective identifier unique to each pre-designated pallet.

In still another implementation, an identifier associated with a pallet storage location 1422 creates a high intensity image when the pallet storage location 1422 is occupied, and a lower intensity image when the pallet storage location 142 is unoccupied. The system 1000 determines which pallets exist based on detected identifiers and pre-stored information identifying a relationship between each pallet storage location 1422 and the corresponding pre-designated pallet 1412. In another implementation, the identifier is unique to a pre-designated pallet 1412 stored in each respective pallet storage location 1422. The system 1000 determines an inventory condition of existing pallets 1412 by evaluating identifiers that exist in an image of the pallet storage locations 1422 captured by the image sensing device, and pre-stored relationship between each pre-designated pallet 1412 and a respective identifier unique to each pre-designated pallet 1412.

In still another implementation, each object stored in the system 1000 includes an attached identifier unique to each pallet 1412. The data processor has access to prestored information identifying each pallet 1412 stored in the system and known information identifying a relationship between each pallet 1412 and a respective identifier unique to each pre-designated pallet. The data processor determines an inventory condition of pallets 1412 by evaluating identifiers that exist in an image of the pallet storage locations 1422 captured by the image sensing device, and the relationship between each pre-designated pallet 1412 and a respective identifier unique to each pre-designated pallet 1412. For instance, the system 1000 stores a list of pallets 1412 stored in the system 1000 and their corresponding unique identifiers. After cameras of the system 1000 captures an image of a storage drawer, the data processor determines which identifier or identifiers are in the image. By comparing the identifiers appearing in the image with list of pallets 1412 and their corresponding unique identifiers, the data processor determines which pallets 1412 are in the system and which ones are not.

As discussed earlier, identifiers associated with the pallet storage locations may be used to determine which locations have missing pallets 1412. According to one implementation, the system 1000 does not need to know the relationship between each pallet storage location 1422 and the corresponding pallet 1412. Rather, each identifier is unique to a corresponding pallet 1412 stored in the pallet storage location 1422. The data processor of system 1000 has access to pre-stored information identifying a relationship between each identifier and the corresponding pallet 1412, and information identifying each object. In other words, the system 1000 has access to an inventory list of every pallet stored in system 1000 and its respective unique identifier. When an empty pallet storage location is detected by system 1000, the corresponding identifier is extracted from the image and decoded by system software. As each identifier is unique to a corresponding pallet 1412, the system 1000 is able to determine which pallet 1412 is missing by checking the relationship between each identifier and the corresponding pallet, and the inventory list of pallets. Each identifier unique to a pallet 1412 stored in a pallet storage location 1422 may be disposed next to the pallet storage location 1422 or in the pallet storage location 1422. In one implementation, the identifier is disposed next to the pallet storage location 1422 and is viewable to the image sensing device no matter whether the location is occupied by a pallet 1412 or not. In another implementation, when an identifier is disposed in the corresponding location 1422, the identifier is not viewable to the image sensing device when the location is occupied by a pallet 1412, and is viewable to the image sensing device when the location is not occupied by a pallet 1412.

An implementation of this disclosure utilizes combinations of baseline images and identifiers unique to objects to determine an inventory status of pallets 1412 (1310). For example, a baseline image may include information of a storage drawer with all pallet storage locations occupied with their respective corresponding pallets, wherein each pallet storage location is associated with an identifier unique to an object stored in the pallet storage location. An inventory condition is determined by comparing an image of the pallet storage locations and the baseline image, to determine which pallet storage locations are occupied by pallets and/or which locations have missing pallets. Identifications of the missing pallets are determined by identifying the identifier associated with each storage location with missing pallet.

Another implementation of this disclosure utilizes unique combinations of identifiers to determine an inventory status of pallets 1412 (1310). For instance, each pallet storage location may have a first type of identifier disposed in the pallet storage location and a second type of identifier unique to a pallet stored in the pallet storage location and disposed next to the pallet storage location. The first type of identifier is viewable to an image sensing device when the pallet storage location is not occupied by a pallet and not viewable by an image sensing device when the pallet storage location is occupied by a pallet. The first type of identifier may be made of retro-reflective material. If a pallet storage location is not occupied by a pallet corresponding to the pallet storage location, the identifier of the first type is viewable by the image sensing device and shows up as a high intensity area. Accordingly, each high intensity area represents a missing pallet, which allows the system 1000 to determine which pallet storage locations having missing pallets. Based on identifiers of the second type associated with those locations with missing pallets, the system 1000 identifies which pallets are missing from system 1000. Consequently, an inventory condition of system 1000 is determined.

According to still another implementation, the system 1000 uses image recognition methods to identify a pallet missing from system 1000. The system 1000 has access to an inventory list indicating which pallets are stored in each drawer or the system 1000. However, the system 1000 does not have to know where the pallets are stored. The pallets are placed in foam cutout locations specific for each pallet. Using characteristics such as size, shape, color, and other parameters image recognition software identifies each pallet in the drawer. Missing pallets are simply the pallets on the inventory list that are not identified as being in the drawer. Similarly, this disclosure utilizes specially designed identifier for determining an inventory condition of tools within the pallet.

FIG. 14C illustrates an exemplary user interface for showing a missing tool within a pallet 1412. The pallet 1412 is housed within its pallet storage location 1410 in FIG. 14C, however, one of the tools within the pallet 1412 has not been returned. As shown in FIG. 14C, the tool storage location 1412a is designated to store tool 1430. The tool storage location 1412a has an associated identifier 1440. Depending on whether each storage location 1412a is being occupied by a corresponding tool 1416, each identifier (e.g., identifier 1440) appears in an image captured by cameras of the inventory control system 1000 in one of two different manners. For example, each identifier may not be viewable by cameras of the inventory control system 1000 when a corresponding tool is stored in the respective tool storage location in the pallet 1412, and becomes viewable by cameras of the inventory control system 1000 when a tool is not stored in the respective tool storage location in the pallet 1412. Similarly, a different implementation may have an identifier viewable by the image sensing device when a tool is stored in the respective a tool storage location, and is not viewable by the image sensing device when a tool is not stored in the respective storage location. This mechanism may be similar to the mechanism described above with respect to FIG. 5, for example, for identifying tools within the drawer not including a pallet. Therefore, for the sake of brevity of description and clarity, this mechanism not describe here in more detail.

Use of Tap, Flick, Pinch/Spread, Drag Functions on the Display of the Inventory Control System The current method to scan or zoom the touch screen on the inventory control systems is through the use of scroll bars. The scroll bars are small and it is sometimes difficult to scroll the screen up, down and sideways. This disclosure describes a method in which touch screen flick and pinch functions can be employed to manipulate the touch screen display.

Referring again to FIG. 10, in one implementation, the inventory control system 1000 is further configured to provide tap, flick, pinch/spread, and drag functions on the touchscreen 1005 for use by the user or operator. This implementation also incorporates flick and pinch, tap, drag, drag downward, and four or five finger swipes and pinches to invoke functions into the display 1005 of the automated inventory control system 1000 equipped with a touch screen.

The tapping function may serve multiple purposes. For example, tapping an icon may open an automated tool control system application from a home screen of the inventory control system 1000. For another example, taping an icon may start an application within the inventory control system 1000. Double-taping (e.g., tapping twice in rapid succession) may be used to zoom in (or zoom out) of screens displayed on display 1005 of the automated inventory control system 1000.

The flick function may be invoked to quickly scroll through lists of automated inventory control applications. The user may tap the screen to stop scrolling or merely wait for the scrolling list to stop. The automated inventory control system 1000 may utilize the pinch and spread functions of a touch screen to enlarge the screen image or make it smaller. The automated inventory control system 1000 may be equipped with the drag function to move an image around the screen.

Use of Multi-Factor Authentication for User Access in the Inventory Control System In one implementation, the instant application an inventory control system for monitoring the removal and replacement of objects. The inventory control system may include at least one drawer or tray including storage locations for storing objects and at least one sensing device configured to detect the presence or absence of object in the storage locations. The inventory control system may also include a data processor configured to receive information representing user access rights and to allow or deny access by the user to the tool storage device based on the user's access rights. The data processor is further configured to require more than one means of user authentication in order for the user to gain access to the tool storage device.

Referring again to FIG. 10, the inventory control system 1000 records in its memory access information related to each access. The access information may include time, user information related to the access, duration, user images, images of storage locations, coordinates of the objects removed from the storage location, identities of storage units or contents of the storage system, objects in the storage system, etc., or any combinations thereof. The system 1000 includes a user camera that captures and stores image of the person accessing tool storage device 1030 each time access is authorized. For each access by a user, system 1000 determines an inventory condition and generates a report including associating the determined inventory condition with access information. The report may, for example, indicate the objects that have been issued to the user and their respective locations within the image of their respective drawers or trays.

For each access request submitted by a user, the system 1000 authenticates or validates the user by determining a user authorization according to user information input by the user via the data input device and the authorization data. The authentication may be preformed at the system 1000 or may be performed remote from the system 1000 at, for example, server 802 shown in FIG. 8. To perform the authentication locally, the system 1000 may compare the user input information with authorization data. The authorization data may have been previously downloaded to the system 1000 through the network and from the remote server 802. Alternatively, the authorization data may be requested from the server 802 by the system 1000 in response to the receipt of the authorization data. In yet another implementation, the use input information may be forwarded to the server 802 over the network and the server 802 may be requested to perform the authentication.

According to a result of the authentication, the data processor selectively grants access to the tool storage device 1030 by controlling an access control device, such as a lock, to grant access to the tool storage device 1030 or one or more storage drawers of one or more tool storage device 1030. The selective grant of access is based on the authenticated user's access rights. For example, if the user is an administrator the user may have access to all the drawers or trays within the tool storage device 1030. Alternatively, if the user is a technician, the user may have access rights to specific drawers or trays based on for example, the technician's training, the work order for which the technician is authorized, the work location in which the work is to be performed. In this scenario, the inventory control system 1000 locks access to the restricted drawers or trays and grant access to the other drawers or trays.

In one implementation, the inventory control system 1000 may use a single method for user authentication before granting access to tools stored in the tool storage device 1030. In another implementation, the inventory control system 1000 may use multiple methods for user authentication before granting access to tools stored in the tool storage device 1030. The multiple methods of authentication may be necessary in high security areas or for tool storage devices containing high value contents.

The authentication methods include electronic ID cards, typing a password or identification code, and biometric scans. The authentication methods may be generalized into three categories: something a user has, something a user knows, and something a user is. Examples of "user has" authentication include an electronic ID badge or an encrypted USB flash drive. Examples of "user knows" authentication include typing in a password or numeric code, selecting a known image from a set of displayed images, answering a personal question, or swiping a predefined pattern on a touch screen. Examples of "user is" authentication typically involves biometrics, including fingerprint scans, retinal scans, or facial recognition.

In multiple authentication methods, the authentication process may be obtained by combining more than one category of authentication (multi-factor authentication). This may increase the security level of the authentication process. The failure or compromise of one level does not compromise the inventory control system. An example of multi-factor authentication is requiring an electronic badge scan (user has) and entering a numeric code (user knows). Loss, theft, or duplication of the badge would not be enough to compromise system security.

Use of Web Services as Defined by the WWW Consortium (W3C) For Data Interface Between an Automated Inventory Control System and Customer Database In one implementation, the instant application describes automated inventory control systems, and more particularly to imaging based automated tool control systems configured with software applications to exchange information with, and utilize software components stored on, remote computers in communication with the automated inventory control systems via a computer network. It is desirable that a computer associated with an automated inventory control system such as, for example, a Snap-on Level 5 ATC include an operating system which is fully compatible with local and global computer networks, such as the Internet, to exchange information with remote computers and databases. Examples of such currently available 32-bit operating systems include the Linux family of products and Microsoft Windows™ OS family of products. Such operating system are capable of running Internet browser software such as Microsoft's Internet Explorer or Netscape's Communicator, and may include the Windows™ OS family of products (such as Windows XP, Windows 7). Future operating systems utilizing a 64-bit, 128-bit, or 2n-bit may be used as suitable logical extensions of current operating systems as computer hardware technology improves. Additional computing products on which automated inventory control systems having Internet access may be implemented may include tablet type computers, wearable computers, and pocket-type computers, all of which would be form factors highly suited for use in an environment where tool control is required.

Microsoft ".NET" technology shifts the focus from individual web sites and specific remote computers storing information to new constellations of computers, devices, and services which work together. Using Microsoft ".NET" technology, hereinafter collectively referred to as "dot"-NET or NET, computers, devices, and services are able to collaborate directly with each other, enabling access to a user's data and compatible applications anywhere and from a wide variety of compatible devices.

A Web Service is a software application that exposes its features programmatically over the Internet or other computer network using a standard Internet communications protocol such as Hypertext Transfer Protocol (HTTP) or Extensible Markup Language (XML). Web Services Software Components may be utilized in software applications by calling Web application program interfaces (API's) just as they would call local services, with the difference being that the call is now routed across the Internet or other network to a service residing on a remote system.

Web Services Software Components employing "dot"-NET technology are loosely coupled. This means that changes to the software applications at either end of a connection may not affect the operation of the system. Web Services Software Components achieve this loose coupling by employing message based asynchronous technology and Web protocols such as HTTP, Simple Mail Transfer Protocol (SMTP), and XML.

Messaging systems wrap the fundamental units of communication into self-describing packages for transmission over the Internet or network. The only assumption a message sender may make about a message receiver in a message-based system is that the recipient will be able to understand the message being sent. The sender may make no assumptions about what will happen once the message is received, nor about what goes on between the sender and the receiver.

The advantages of the Web Services Software Component message-based communication scheme are readily apparent. It enables a recipient to change a software application at any time without affecting a sender so long as the software application can continue to understand the communicated messages. The receiver is free to upgrade and improve without affecting current applications. Furthermore, the sender may not require any special software to be able to communicate with a receiver.

The "dot"-NET framework within which Web Services Software Components are implemented includes three main parts: the common language runtime, a hierarchical set of unified class libraries, and an advanced version of Active Server Pages called ASP+. The common language runtime is responsible for notifications, managing memory allocation, starting up and destroying threads and processes, enforcing security policy, and satisfying any dependencies that a software component may have on other software components. The "dot"-NET runtime provides a unified environment across a wide variety of programming languages and hardware types.

Similarly, the unified class libraries (API's) found in the "dot"-NET framework unify the disparate frameworks found in the various object oriented programming languages in use today. Developers of C# can use the Microsoft Foundation Classes, developers of Java use the Windows Foundation Classes, and developers of Visual Basic use Visual Basic APIs. By creating a common set of APIs across all programming languages, the "dot"-NET framework enables cross-language inheritance, error-handling, and debugging. Finally, ASP+ builds on the programming classes of the "dot"-NET framework to provide a Web application model in the form of a set of controls and infrastructure, such as interface components, session state management, and process recycling.

Therefore, it is desirable to develop an automated inventory control system which integrates a loosely coupled software application infrastructure with large scale local or global computer networks such as the Internet to provide a more efficient and accurate system than is currently available. Specifically, it is desirable to develop automated inventory control systems utilizing the "dot"-NET framework and software applications having functionality which may be reused without concern for how the service is implemented, by providing well-defined user interfaces. In this manner, automated inventory control software applications can be assembled from a variety of components as needed, consisting of remote services accessed via the Internet, local services, and custom software written in an intermediate computer language. These remote and local services and custom software applications may further utilize a standard "dot"-NET framework or information exchange protocol, such as Microsoft's Simple Object Access Protocol (SOAP) to exchange information over the Internet.

In one implementation, the instant application describes an improved automated inventory control system including at least one sensing device for acquiring tool usage data, an interface circuitry in communication with the sensing device for generating data representative of tool usage data acquired by the sensing device, and a computer in communication with the interface circuitry. The computer is configured to provide integrated network access and to use "dot"-NET technology to utilize a variety of software applications or components, and collections of stored information, to perform a sequence of operations on the data generated by the interface circuitry to provide automated inventory control system information. The computer is configured to transmit and receive information representing the data associated with the inventory control system across a network using Web Services as defined by the W3C.

The W3C defines a Web Service as "... a software system designed to support interoperable machine-to-machine interaction over a network. It has an interface described in a machine-processable format (specifically WSDL). Other systems interact with the Web service in a manner prescribed by its description using SOAP messages, typically conveyed using HTTP with an XML serialization in conjunction with other Web-related standards." Web service, http://en.wikipedia.org/w/index.php?title=Web_service&oldid= 557004218 (last visited Jun. 8, 2013). The foregoing and other objects, features, and advantages of the disclosure, as well as further embodiments thereof, will become apparent from the following drawing and description.

Figure 15:
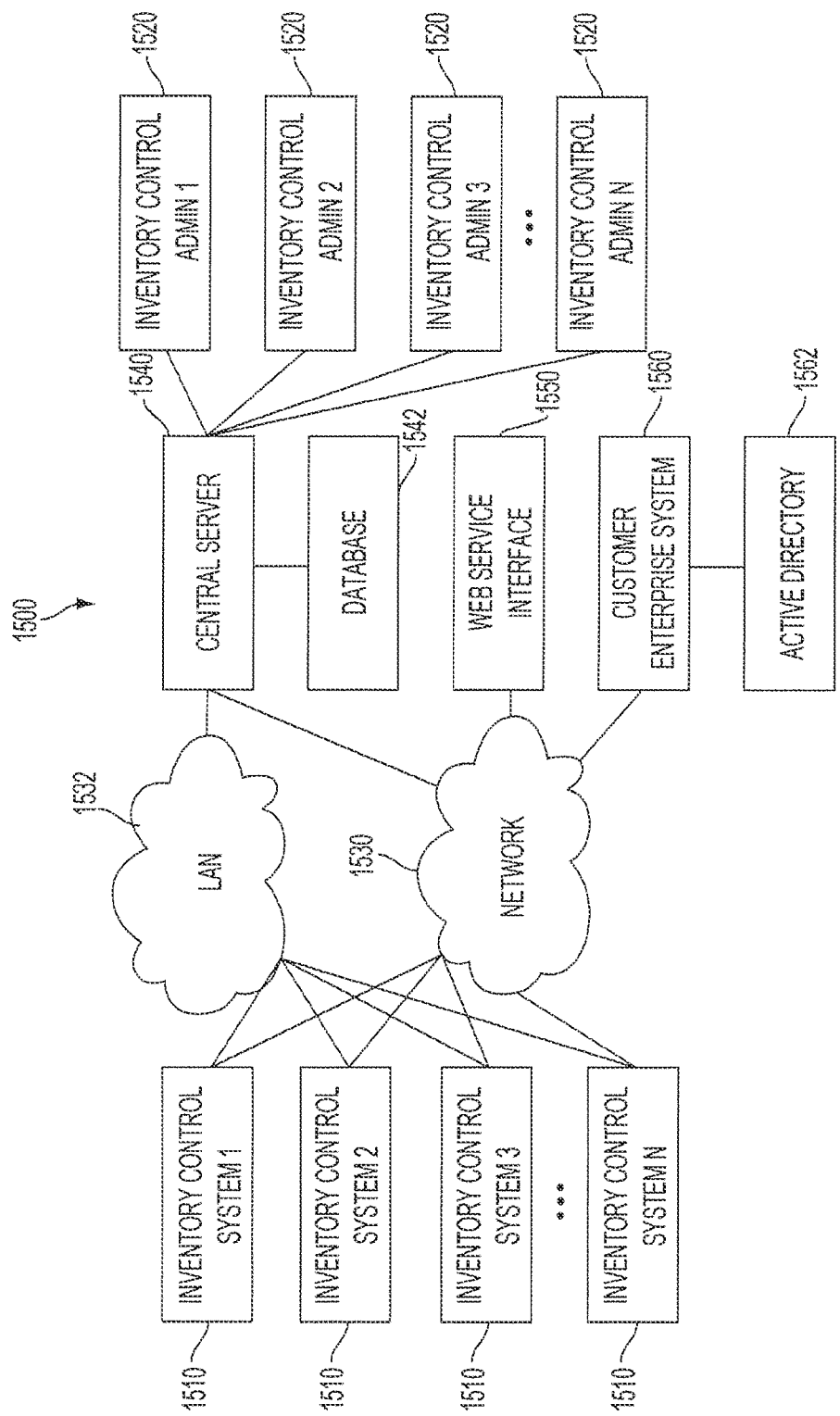
FIG. 15 illustrates an exemplary system configured to allow inventory control systems to communicate with a central server, a database, and a customer enterprise system utilizing a Web Service.

FIG. 15 illustrates an exemplary system 1500 configured to allow the inventory control systems 1510 to communicate with a central server 1540, a database 1542, and a customer enterprise system 1560 utilizing a Web Service. In one example, the inventory control system 1510 includes the same components as the inventory control system 1000 shown in FIG. 10. To this end, the inventory control systems 1510 includes a tool storage device, a sensing device, an interface circuitry, a computer, and a data transceiver. The tool storage device includes a drawer or a tray for housing tools. The sensing device is configured to acquire an image including information about the tools stored in the tool storage device. The interface circuitry is in communication with the sensing device and is configured to generate tool usage data based on the image acquired by the sensing device. The computer is configured to provide an integrated network access and transmit the tool usage data across a network 15130 using the Web Service and the data transceiver.

The data transceiver includes an 802.11g or Ethernet module. The Ethernet module connects directly to the network 1530, while a 802.11g module may connect through a 802.11g router connected to the network 1530. Each of these network modules will be assigned a static or dynamic IP address. In one implementation, inventory control systems 1510 checks into the central server 1540 through the data transceivers on a periodic basis, to download information about authorized users, authorization levels of different users or different keycards, related storage systems, etc. The inventory control systems 1510 also upload information related to the systems such as inventory conditions, drawer images, tool usage, access records, information of user accessing inventory control systems 110, etc., to server 1530. Each inventory control system 1510 may be powered by an AC source or by a battery pack. An uninterruptible power supply (UPS) system may be provided to supply power during a power failure.

In another implementation, the inventory control systems 1510 and the central server 1540 are part of the same network and connected to each other through the local area network 1532. The inventory control systems 1510 may use the network 1532 to check into the central server 1540 and download information about authorized users, authorization levels of different users or different keycards, related storage systems, etc. Similarly, the inventory control systems 1510 may use the network 1532 to upload information related to the systems such as inventory conditions, drawer images, tool usage, access records, information of user accessing inventory control systems 110, etc., to server 1530. The inventory control systems 1510 may communicate with the central server 1540 using a Windows Communication Foundation (WCF) Service. The WCF Service may be a program attached to each one of the inventory control systems 1510. When there is an event (e.g., an issuance or return of a specific tool) in the inventory control systems 1510, the WCF service detects the event and makes the event available to the central server 1540. Similarly, when there is an event on the central server 1540, the WCF service detects the event and makes it available to the inventory control system 1510. To this end, the WCF Service may constantly look for changing of status in the inventory control systems 1510, the central server 1540, and the database 1542 to determine what is the change of status and who should be notified. In this implementation, there may be no need for a Web Service to translate messages from the inventory control systems 1510 to the server 1530 or vice versa.

The computer of the inventory control system 1510 may be a general purpose computer or may be a specialized logic circuit configured with automated tool control software applications designed to utilize a variety of local and remote "dot"-NET Web Services software applications to run on top of a "dot"-NET runtime system and utilize the features of a "dot"-NET framework to provide services associated with an automated inventory control system operation. Such services may include, but are not limited to, determination of tool presence and absence, employee, employee access rights, work location, system log events, audit images of the tool control system drawers or trays, etc. Web Services are software components that can be spontaneously discovered, combined, and recombined to provide a solution to a user's problem or request. Each Web Service software application or software component may be written in a variety of different computer languages, but conform to the required "dot"-NET Web Services Software Component protocols for standardized interfaces, and may be accessed over the communications network, such as the Internet, using SOAP or other suitable protocol such as HTTP, XML, or FTP.

In this manner, the inventory control systems 1510 can communicate with each other through the network 1530 and can communicate with the central server 1540 and the customer enterprise system 1560 even if each of the systems 1510, 1530, and 1560 are written in a different programming language. The Web Service may be on each of the inventory control systems 1510, the central server 1540, the customer enterprise system 1560 to enable communications between various systems written in different communication protocols. Alternatively or additionally, the Web Service may be a hosted service. To this end, the Web Service may be accessed at the Web Service Interface 1550, for example. The Web Service Interface 1550 may be called by a Web Service software application on the inventory control system 1510, the central server 1530, or the customer enterprise system 1560 to translate the message in a format that can be understood by the receiving system. The translated message is then sent to the receiving system.

For example, a Web Service software application on the inventory control system 1510 that wants to upload certain tool usage data to the customer enterprise system 1560 may call the Web Service Interface 1550 through the network 1530 to translate the message. The Web Service Interface 1550 translates the tool usage data in a format that can be understood by the customer enterprise system 1560. The data is then sent to the customer enterprise system 1560. Alternatively, instead of using the hosted Web Service, the inventory control system 1510 may include such capability itself and before sending the message toward its destination may package the message in a format that can be understood by the destination.

In another example, the customer enterprise system 1560 may want to transmit data to the inventory control system 1510. The customer enterprise system 1560 may have a SAP application. The SAP application may be configured to determine calibration for torque wrenches. The customer may want to apply this clarification directly from its SPA application to one or more of the inventory control systems 1510 through the network 1530. To this end, the customer may transmit this instructions through the network to the Web Service Interface 1550. The Web Service Interface 1550 translates the instructions into a format that can be understood by the inventory control system 1510 and sends the translated instructions to the inventory control system 1510.

The Web Service Interface 1550 is an interface having access to data field structure of the inventory control database and data field structure of the customer enterprise system 1560. To this end, upon receiving a message from the customer enterprise system 1560, the Web Service Interface 1550 repackages the message so that proper fields within the inventory control system 1510 are populated based on the message. The inventory control system 1510 receives the message, performs the requested calibration and sends the result back to the customer enterprise system 1560. The Web Service Interface 1550 receives the response and repackages the response to populate the proper fields within the data structure of the customer enterprise system 1560 and sends the response to the customer enterprise system 1560.

The inventory control system 1510, the central server 1530, and the customer enterprise system 1560 each may include a plurality of software applications. These software components may be written in a wide variety of computer languages, including XML, C#, Visual Basic, C++, Cobol, Perl, Java™, JScript and VBScript, or may be partially implemented using Active Server Pages (ASP or ASP+) which are web pages with embedded code written in a scripting language.

The actual operation of the automated inventory control system software may take place either in an operating system itself, such as a Microsoft Windows™ interface, or may be partially implemented from within another program such as an Internet browser application. For performing its function of monitoring removal and replacement of tools within the tool storage device, the inventory control system 1510 may take advantage of both local "dot"-Net Web Service software applications and remote "do"-Net Web Service software applications.

The local "dot"-NET Web Services Software Components are implemented and stored on the automated inventory control system 1510 computer, while the remote "dot"-NET Web Services Software Components are located on the remote systems such as, for example, the central server 1540 and the customer enterprise system 1560. The remote "dot"-Net Web Services Software Components may include an automated inventory control system services software application, configured to provide services such as data acquisition, data storage, logging, software updates, and repair procedures to the automated tool control system computer.

Each of the service components may be written in a variety of different computer languages, but conform to the required "dot"-NET Web Services software application protocols for standardized interfaces, and may be accessed over the communications network, such as the Internet, using SOAP or other suitable protocol such as HTTP, XML, or FTP. Emerging protocols suitable for use by Web Services Software Components include UDDI (Universal Description Discovery and Interoperability), WSDL (Web Services Description Language), and ebXML (electronic business XML).

The local "dot"-NET Web Services Software Components associated with the automated inventory control system 1510 may be accessed from the remote system 1560 or from other computer systems linked to the automated inventory control system 1510 via the communications network 1530, such as the Internet connection. These local "dot"-NET Web Services Software Components are configured to provide pathways to access tool status information, configuration information, employee information, or other information relating to the automated inventory control system 1510 with which they are associated. Additionally, local "dot"-NET Web Services Software Components may be configured to provide the remote system 1560 with access to diagnostic and repair procedures associated with the automated inventory control system computer 1510.

The remote "dot"-NET Web Services Software Components associated with the remote system 1560 are accessible by the automated inventory control system computer 1510 via their respective communications network connections, such as Internet connections, and are configured to permit the automated inventory control system computer 1510 to exchange information to the remote system 1560, to access and run specific software components, and to acquire software updates which are stored on the remote system 1560. A remote system may include, but is not limited to, a mobile computer associated with an inventory control system dashboard application service, an inventory control system administration application service or a remotely located computer system.

Each of the remote "dot"-NET Web Services Software Components includes a complete "self-description" available in a standard format, such as XML, which includes details about the methods, properties, interfaces, and events supported by the service, as well as descriptive documentation in one or more languages. By utilizing remote "dot"-NET Web Services Software Components, those of ordinary skill in the art will readily recognize that the remote services required by the automated inventory control system computer 1510 may be stored on multiple remote systems. For example, one remote system may be configured with remote services responsible for updating software components, while a second remote system may be configured with remote services for acquiring and accumulating statistical information from the automated tool control system computer, or to provide security by controlling access to the automated tool control system 1510 and remote systems.

Using the "dot"-NET protocols, multiple versions of automated inventory control system software or components may be installed on the automated inventory control system computer 1510 without conflict, to provide varying degrees of functionality and maintain compatibility with older and out-dated hardware components.

Utilizing the "dot"-NET framework and protocols, an automated inventory control system computer 1510 may be configured to permit an inventory control system user or administrator to select only those "dot"-NET software components and modules needed to perform a desired automated tool control system task. To this end, the central server 1540 may include inventory control admin client 1520 for administrating and/or contorting the inventory control systems 1510. The central server 1540 also includes a database 1542, such as a Microsoft SQL. Information related to authentication, authorized users, inventory conditions, audit trails, etc., is stored in the database 1542. The central server 1540 may include a specific inventory control admin application for each of the inventory control systems 1510. Using the inventory control admin client 1520 an administrator may select desired local software objects and components and/or desired remote software objects and components to customize automated inventory control system software applications on the automated inventory control system computer 1510. For example, an aerospace Maintenance, Repair and Operation (MRO) center with multiple work locations in multiple hangers may desire to only have access to automated inventory control systems 1510 within specific work locations in specific hangers.

Additionally, local "dot"-NET software components and objects on the automated inventory control system computer 1510 could be configured to provide remote "dot"-NET software components and objects with access to automated tool control system data, thereby permitting the remote user to request tool control data from the automated inventory control system local "dot"-NET software components. For example, as noted above, a remote administrator using the inventory control admin application 1520 could request calibration data on a torque wrench located in drawer or tray 5 of an automated tool control system toolbox in hanger 3 at their facility and be provided with the data across the web services integration layer.

Conversely, local "dot"-NET software components and objects on the automated inventory control system computer 1510 could be configured to provide remote "dot"-NET software components and objects with capability to request changes in status of automated inventory control system database fields, thereby permitting the authorized remote user to request tool control database changes. For example, a remote administrator could request a change to the calibration date for a torque wrench located in drawer or tray 5 of an automated tool control system toolbox in hanger 3 at their facility across the web services integration layer.

Accordingly, the "dot"-NET framework may be on an automated tool control system computer which may be a general purpose computer, or may be a specialized logic circuit associated with an aerospace hanger or tool crib, may locate and utilize a combination of local and remote software objects and components which provide a required degree of functionality and services associated with automated tool control systems. The combination of local and remote software objects and components may be stored as a "dot"-NET preference in association with a collection of preferred settings and recalled for future use. This facilitates the rapid setup of multiple automated tool control systems computers with the same configuration in a single facility, or in multiple related facilities such as hangers, tool cribs or aerospace assembly areas.

Those of ordinary skill in the art will readily recognize that these individual software objects and components allow for improved capabilities in controlling automated tool controls systems, and in the exchange of data between local automated tool control systems and other computer based systems, especially enterprise based systems such as SAP, Oracle and other like systems. Furthermore, the remote software objects and components utilized by the automated tool controls system may be updated with new software or firmware at any time by a remote computer without interfering with the operations workplace.

The ability to customize the software objects and components utilized by an automated tool control system computer can be further associated with the authorization levels of individual technicians operating the automated tool control system. For example, by storing the authorization levels of individual technician's as "dot"-NET preferences on a remote computer, any automated tool control system may be rapidly configured to the preferred settings for that technician by recalling the stored preferences using the "dot"-NET framework. This permits individual technicians and service personnel to have the freedom to move between automated tool control systems in a single work area, or even between multiple work areas, while retaining their preferred settings and/or software object and component usage.

The "dot"-NET framework installed on an automated inventory control system may be utilized within the system itself to provide for data transfer between services on the administration computer, the individual or groups of tool storage devices, and the database, serving as the repository of all data within the tool control network and system. The "dot"-NET framework installed on an automated inventory control system may be utilized to provide for data transfer between services on a local tool control system and customers' systems external to the local tool control system.

Capability to Scan Work Order or Controlling Document and Produce Tool List

In one implementation, the instant application describes an inventory control system for monitoring the removal and replacement of objects has at least one drawer or tray including storage locations for storing objects, and at least one image sensing device configured to form an image of the storage locations. The inventory control system also includes a data processor configured to receive information representing a 2D, 3D or other type barcode associated with data related to work orders, tool lists, instructions or special instructions, drawings, photographs, specifications, and other documents.

Current solutions allow a work order to be typed or scanned with a barcode (TCMAX) or graphically selected from a predefined list (ATC). These systems associate a work order number with a tool issue transaction for reporting purposes. In this disclosed implementation, the automated inventory control system is equipped with a bar code reader. The bar code reader may be similar to the bar code scanner 1008 described with respect to the inventory control system 1000 shown in FIG. 10. The bar code reader may be configured to provide data to the system in the form of a keyboard wedge. This information is interpreted to coincide with a work order, tool list, special instructions, and other data. The work orders can be entered at the inventory control system point of access.

Referring again to FIG. 15, a user may have a printed work order containing a bar code or other encoded information that could be electronically read at the inventory control system 1510. Alternatively, the work order may also be sent from a networked device such as a manager's computer or a central server 1540 to the inventory control system 1510. In yet another alterative, a work order may be manually entered by keyboard or touch screen at the tool control system. A user may also select a work task graphically. For example, a user could enter an aircraft tail number and then be presented with a top down view of the aircraft. The user may then touch the location of the aircraft where work will be performed and be presented with work order associated with the selected location of the aircraft where work will be performed. A work order or associated information could also be fetched by interfacing the inventory control system 1510 to an existing information system, such as a customer's MRO database 1560.

In one implementation, the inventory control system 1510 may associate the user, work order, and any issued inventory together for audit purposes. A user may mark an open work order as closed after return of all inventory items, allowing for measurement of work order time to complete metrics. A user may enter information about deviations from work instructions or a reason the work order could not be completed. This information may be electronically forwarded to a supervisor for problem resolution. For example, the information may be forwarded through the network 1530 or LAN 1532 from the inventory control system 1510 to the inventory control admin application 1520 on the central server 1540.

In another implementation, work orders can be automatically dispensed by the inventory control system 1510. If the inventory control system 1510 is programmed with a list of pending work orders and the users who are qualified to complete them, it can present a new work order to a user after a previous work order is marked complete.

In other implementation, a specific work location may be associated with a given work order. The inventory control system 1510 may inform the user of this location by displaying a map or instructions on the display of the inventory control system to the required location, identifying an aircraft tail number or other navigation aid.

In another implementation, work instructions, inspection forms, and/or other required documentation is associated with a given work order. These documents can be displayed on a display of the inventory control system 1510, sent to a printer, or transferred to a user display device such as a laptop, tablet, or smart phone. The inventory control system 1510 may contain user manuals with work instructions in its inventory, and direct the user to check out the appropriate manual for a given work order. Documents requiring user feedback can be filled out and saved at the inventory control system 1510 for audit purposes.

In other embodiments, a required tool list is associated with a given work order. When a work order is entered, the inventory control system displays an associated required tool list. The system 1510 may confirm that its inventory contains the required tools. If a required tool is not in the current system inventory, the system 1510 may display a list of authorized alternative tool locations that contain the required tool. The system 1510 may also identify users and locations of required tools that have been issued from the system. The system 1510 may also guide the user to specific locations of each tool. For example, an automatic tool control tool box displays the drawer or tray that contains each required tool. When that drawer or tray is opened, the system displays an image of the drawer or tray layout with the required tool(s) flashing or highlighted. It could also display an image of the tool and any individualized tool information for a selected tool.

Tool Control Systems for Utilizing Group Concept for Managing Work Location, Employee Access Rights and Individual or Groups of Boxes The automated inventory control system may need to identify and control individual tool storage devices, user, and work locations. Referring again to FIG. 15, these items may be individually identified and controlled in the inventory control system 1510. For example, each individual tool storage device, user, and work location may be individually identified and loaded into the system. The individual tool storage device may be assigned to specific areas or purposes which separate its usage from other tool storage devices. The individual users may be assigned specific access rights to tool storage devices or may have limited or no access to other tool storage devices due to training restrictions, work area restrictions or some other restriction which limits their access to individual tool storage devices. These restrictions may actually be carried down a level further to access rights to individual drawers or trays within a specific tool storage device. By providing means of locking and unlocking individual drawers or trays within an automated inventory control system, users may have unrestricted or limited access to individual drawers or trays within the tool storage device depending upon their access credentials.

The automated inventory control system 1510 may be capable of requiring work locations be selected by the user prior to unlocking the tool storage device. The work locations may be typically used to identify the area in which work is performed and to provide information on where to search for a tool in case it is not returned to the tool storage device. The work locations may be loaded into the system 1510 and displayed on a grid for the user to select when attempting to gain access to the tool storage device. In one implementation, the work locations may be loaded into the system by the user manually. In another implementation, the work locations may be entered into the system with a bar code such as bar code 1008 or some other machine readable media when the user is attempting to access the tool storage device. In yet another alternatively, the work locations may be communicated from the central server 1540 to the inventory control system 1510 through the network 1530 or LAN 1532. Currently no restrictions are placed on work locations related to user access or individual tool storage devices.

The system 1500 may be configured to provide a comprehensive solution to grouping of the inventory control systems 1510, the various levels of user access, and possible access restrictions based on work locations. In one implementation, the remote server 1540 may include a data processor configured to receive information representing groups of inventory control systems, groups of users, and groups of work locations. The data processor is further configured to assign users various access rights to the inventory control systems 1510 based on the access rights assigned to the group to which they belong. The server 1540 may itself be an inventory control system for monitoring the removal and replacement of objects. To this end, the server 1540 may include at least one drawer or tray including storage locations for storing objects, and at least one sensing device configured to determine presence or absence of objects stored in the storage drawer or tray. The server 1540 may act as a central inventory control system for other inventory control systems 1510 and may be configured to place the inventory control systems 1510 in various groups.

Alternatively, the server 1540 may simply be a computer without a tool storage device or a sensing device. The computer may include the inventory control admin clients 1520 for administrating and/or controlling the inventory control systems 1510. Each inventory control system 1510 may have its own inventory control admin client 1520.

In another implementation, in addition to or instead of the server 1540, one or more of the inventory control systems 1510 may include a data processor configured to receive information representing groups of inventory control systems, groups of users, and groups of work locations. The data processor is further configured to assign users various access rights to the inventory control systems based on the access rights assigned to the group to which they belong. The inventory control system 1510 may be assigned as a master for the other inventory control systems 1510 and may be able to place them in different groups and provide different user access rights based on the associative group.

In another implementation, the inventory control system 1510 includes a plurality of tool storage devices. To this end, the data processor of the inventory control system 1510 is configured to receive information representing groups of tool storage devices, groups of users, and groups of work locations. The data processor is further configured to assign users various access rights to the tool storage devices based on the access rights assigned to the group to which they belong.

Figure 16:
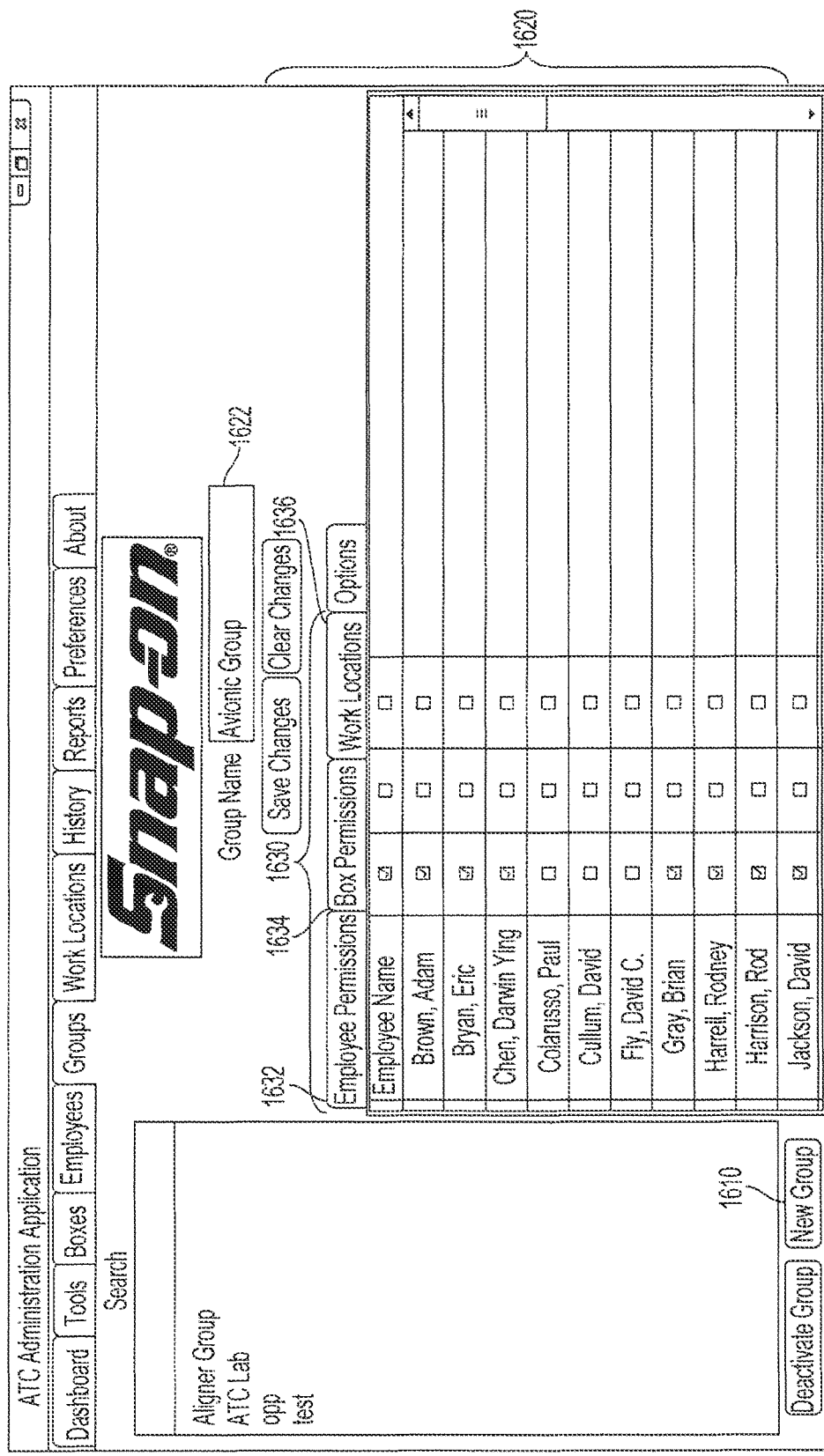
FIG. 16 illustrates an exemplary user interface for creating groups in the system shown in FIG. 15.

FIG. 16 illustrates an exemplary user interface 1600 for creating groups in the system 1500 shown in FIG. 15. The user interface 1600 may be presented on the inventory control system 1510 and/or the central server 1540. The user interface 1600 includes an option 1610 for creating a new group. The section of the option 1610 may result in presenting fields 1620 to the user for specifying parameters of the new group. The fields 1620 may include a group name field 1622 may include three subsets field 1630. The group name field 1622 identifies the name of the group. In this specific example, the name of the group includes "Avionic Group."

The three subsets field 1620 may include the system user subset option 1632, the inventory control system subset option 1634, and system work location subset option 1636. The system user subset option 1632 may allow the user/administrator to specify the subset of users belonging to the Avionic Group. The users may include employees associated with the specific company having various inventory control systems. The user/administrator may select the system user subset option 1632 and may be presented with a list including names of all employees of the company. The user/administrator may then select the users for inclusion in the Avionic Group from among all the users identified in the list. The selection may be performed by checking the box associated with the employee. For example, the employee Adam Brown is selected to be included in the Avionic Group; whereas, the employee Paul Colarusso is not selected to be included in the Avionic Group. Each individual system user may be assigned to at least one, but possibly more system user subset based on training levels, work area access, daily shift assignment, and other criteria defined by the primary administrator of the system.

The inventory control system option 1634 may allow the user/administrator to specify the subset of inventory control systems that should be assigned to the Avionic Group. The inventory control systems may include all inventory control systems associated with the specific company having various inventory control systems. The user/administrator may select the inventory control system subset option 1634 and may be presented with a list including names associated with all of the inventory control systems of the company. The user/administrator may then select the inventory control systems for inclusion in the Avionic Group from among all the inventory control systems identified in the list. The selection may be performed by checking the box associated with the inventory control system. Each individual inventory control system may be assigned to at least one, but possibly more inventory control system subset based on type of tools, work area to be used, training levels required, and other criteria defined by the primary administrator of the system.

The work location subset option 1636 may allow the user/administrator to specify the subset of work locations that should be assigned to the Avionic Group. The work locations may include all work locations associated with the specific company having various work locations for inventory control systems. The user/administrator may select the work location subset option 1636 and may be presented with a list including work locations associated with all of the work locations of the company. The user/administrator may then select the work locations for inclusion in the Avionic Group from among all the work locations identified in the list. The selection may be performed by checking the box associated with the work location. Each individual work location may be assigned to at least one, but possibly more system work location groups as defined by the primary administrator of the system.

In this implementation, all users assigned to a specific subset may gain access to tool storage devices in groups which contain their subset. For example, a group may be set up as "$3^{rd}$ shift tail section mechanical." It includes the subsets "tail section tool storage devices", "$3^{rd}$ shift tail section mechanical technicians", and "tail section work location." Another group may be set up as "$3^{rd}$ shift tail section avionics." It includes the subsets "tail section tool storage devices", "$3^{rd}$ shift tail section avionics technicians," and "tail section work location." The subset "tail section tool storage devices" may include tool storage devices for "tail section mechanical" and "tail section avionics" assigned. The subset "$3^{rd}$ shift tail section avionics technicians" includes all avionics technicians on third shift and only allows user access to avionics tool storage devices between the hours of 10:30 pm to 7:30 am Monday through Friday. The subset "$3^{rd}$ shift tail section mechanical technicians" includes all mechanical technicians on third shift and only allows user access to mechanical tool storage devices between the hours of 10:30 pm to 7:30 am Monday through Friday.

Figure 17:
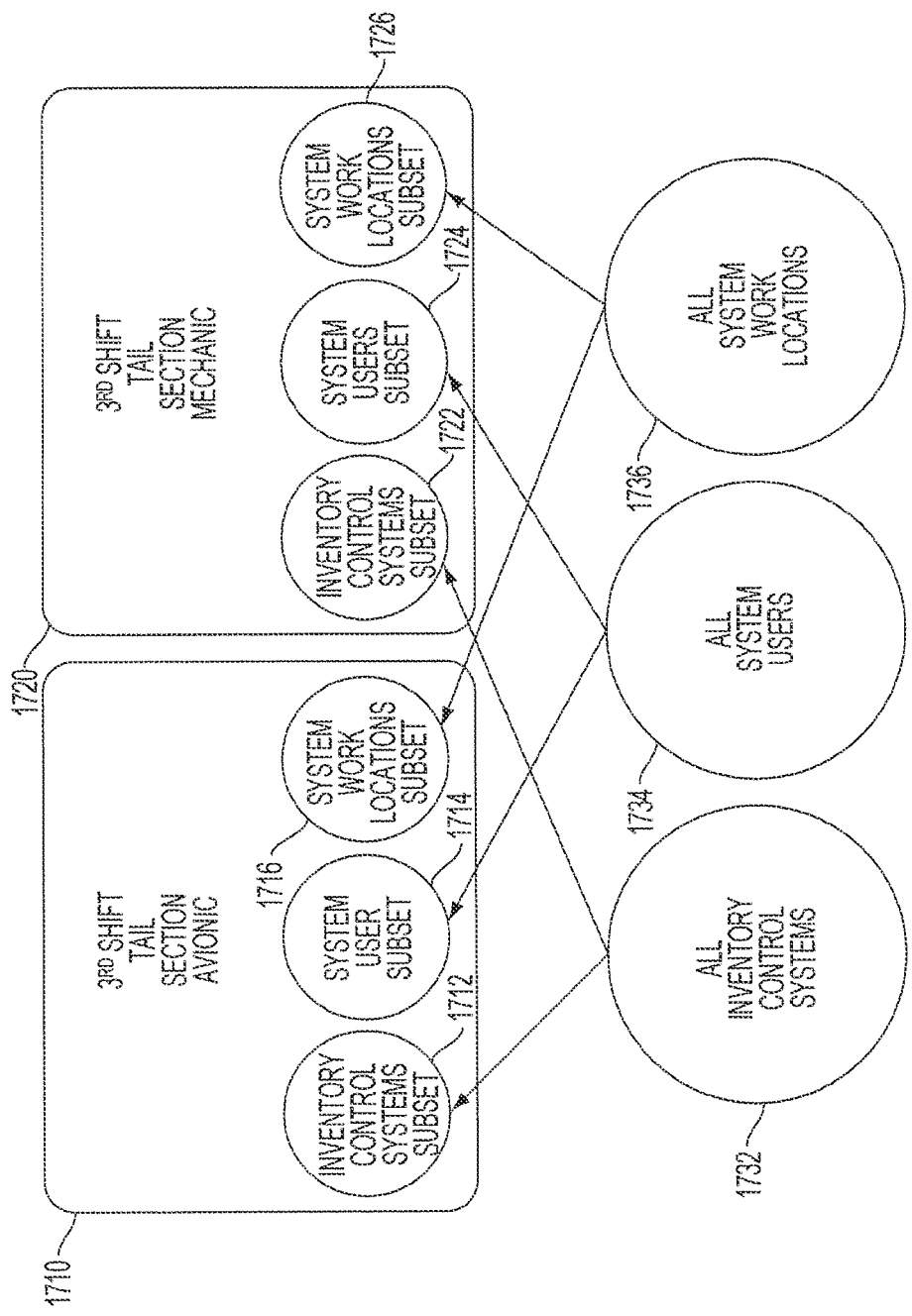
FIG. 17 illustrates two groups that may be created using the user interface shown in FIG. 16.

FIG. 17 illustrates two groups that may be created using the user interface 1600 shown in FIG. 16. The two groups include "third shift tail section avionics" 1710 and "third shift tail section mechanics" 1720. The "third shift tail section avionics" 1710 includes inventory control systems subset 1712, the system users subset 1714, and the system work locations subset 1716. The inventory control systems subset 1712 may be selected from among all inventory control systems 1732. The system users subset 1714 may be selected from among all system users 1734. The system work locations subset 1716 may be selected from among all system work locations 1736.

The "third shift tail section mechanics" 1720 includes inventory control systems subset 1722, the system users subset 1724, and the system work locations subset 1726. The inventory control systems subset 1722 may be selected from among all inventory control systems 1732. The system users subset 1724 may be selected from among all system users

1734. The system work locations subset 1726 may be selected from among all system work locations 1736.

To illustrate one specific example, the "third shift tail section avionics" group 1710 may include "avionic tool storage devices" in the inventory control systems subset 1712, and "third shift tail section avionics technicians" in the system users subset 1714, and the "tail section work location" in the inventory work locations 1716. The technician included among the third shift tail section avionics technicians and assigned to the group 1710 may have access to the tail section avionics tool storage devices between the hours of 10:30 pm to 7:30 am Monday through Friday.

To illustrate another specific example, the "third shift tail section mechanics" group 1720 may include "mechanical tool storage devices" in the inventory control systems subset 1722, and "third shift tail section mechanical technicians" in the system users subset 1724, and the "tail section work location" in the inventory work locations 1726. The technician included among the "third shift tail section mechanical technicians" and assigned to the group 1720 may have access to the tail section mechanical tool storage devices between the hours of 10:30 pm to 7:30 am Monday through Friday.

Automated Inventory Control System with Capability to Import User List and Data from Active Directory Many industries store employee data in an Active Directory. The employee data may include name, employee number, badge number, and/or other identifying data. It is desirable to have the capability to download certain employee information from Active Directory for use in an automated inventory control system for use in identifying authorized users and their appropriate access to the tool storage device or administrations computer workstation. The current method of loading employee data into the inventory control system is to add the user information such as name, employee or badge number, or photograph manually. This disclosure will describe a process whereby Active Directory information can be automatically transferred to the automated inventory control system and used appropriately.

Referring again to FIG. 15, the inventory control system 1510 according to this implementation includes at least one drawer or tray including storage locations for storing objects, and at least one sensing device configured to detect the presence or absence of objects in the storage locations. The inventory control system 1510 also includes a data processor configured to receive information from an Active Directory system 1562 to populate fields in a database of the inventory control system 1510. The information may include a list of users of the inventory control system 1510 and their information and may be automatically transferred from an existing Active Directory system 1562 to the inventory control system 1510. Alternatively or additionally, the information may be transferred from the Active Directory system 1562 to the administrator software. The administrator software may include the inventory control admin client 1520 residing on the central server 1540. Upon receiving this information, the inventory control admin client 1520 push this information to the inventory control system 1510. The information may be distributed to all of the inventory control systems 1510. Alternatively, the information may be selectively distributed to the inventory control systems 1510. The selective distribution may be based on user access rights, for example. The employees having access rights to specific inventory control systems 1510 may have their information downloaded to those systems 1510; whereas, the employees not having access rights to those systems 1510 may not have their information downloaded to them.

As noted above, currently, users may have to be manually entered into the inventory control administration software and/or the inventory control system 1510. This can be a time-consuming process with the possibility of human error. In this implementation, the administration software and/or the inventory control system 1510 is configured to interface with and import users from the Active Directory system to the inventory control systems. These users are imported in their entirety or as a filtered subset. All user information that is pertinent to the inventory control system 1510 may also be imported. Examples of this information include, but are not limited to, Name, Title, ID Number, and Badge Number.

The Active Directory system 1562 is monitored for any user additions, user removals, or changes in user information. The inventory control system 1510 and/or the inventory control admin client 1520 may periodically review the content of the Active Directory system 1562 for any updates. These updates may be automatically applied in the administration software and/or the inventory control system 1510 without human intervention. Alternatively, these updates may be automatically applied only after a confirmation prompt has been presented and accepted by the administrator.

The interface to the Active Directory system 1562 is also used to automatically log the current operating system user into the administration software. This eliminates the step of manually entering the inventory control system administration credentials into the administration software and instead uses the credentials used when logging into the operating system. In this configuration the administration software allows one to log in as a user other than the user that is currently logged into the operating system.

Lock Down of Selected Toolboxes for Auditing

In a normal work environment, the inventory contained in a tool storage device may be periodically audited. These audits can be scheduled to occur on a regular basis or can occur during a non-scheduled inspection. For example, in the aerospace world, audits are typically required at the end of each shift and prior to the release of the aircraft undergoing assembly, maintenance, or repair work. A problem in current inventory control environments is that there is no automated centralized control over the lock state of tool storage devices. An individual or group of individuals must inspect each inventory storage device during an audit to insure they are locked, all inventory is accounted for, and that they remain locked until the work object (e.g., an aircraft) is certified to leave the area and the tool storage devices are released for use. This is an inefficient method of ensuring all tools or stored objects are accounted for.

Since one of the primary functions of automated inventory control systems is to ensure that all tools are accounted for and that no work product leaves the work area with a tool in it when work is concluded, this disclosure describes the ability for the administrative application to "lock down" tool storage devices until authorized auditors complete an audit of the contents. The capability to "lock down" selected tool storage devices can be on a timed basis as well as by authorized users. It can be preceded by a requirement to return all tools to the tool storage device prior to "lock down." The administrator can define authorized auditors for each tool storage device and the number of auditors required to complete an audit on each individual tool storage device.

Referring again to FIG. 15, in this implementation, the administrator using the administrative client 1520 on the central server 1540 has the capability to identify and change settings on the inventory control systems 1510, such as the lock status of the individual tool storage devices in the inventory control systems 1510. The administrative using the administrative client on the computer 1540 may provide commands over a network 1530 or LAN 1532 to the inventory control system 1510 to remotely control the storage device locking mechanism such as, locking mechanism 1006 shown in FIG. 10, which is operatively connected to the local data processor to prevent access to the drawers 1030 unless the proper credentials are presented.

The administrator identifies a drawer or a group of drawers in each of the inventory control systems 1510 to lock down, then activates a software program causing a lock down message to be transmitted from the central server 1540 to each of the inventory control systems 1510 via the network 1530 or LAN 1532. The inventory control systems 1510 each receives the message and acts accordingly. For example, if the message is locking all of the drawers within the tool storage device, the processor of the inventory control system 1510 locks all of the drawers. Alternatively, if the message is for locking some of the drawers within the storage device, the processor of the inventory control system 1510 selectively locks only those drawers within the tool storage device. In another implementation, the lock down message may be sent to a group and not all of the inventory control systems 1510. The central server 1540 may distinguish the inventory control systems 1510 based on their respective IP address. To this end, only the inventory control systems 1510 within the designated group will receive the lock down message from the central server 1540 and will act according to the lock down command.

Following this lock down command distributed to the inventory control systems 1510, the lock may not re-open until the administrator sends another command to unlock the inventory control systems 1510. Alternatively, the lock may re-open for only a specific authorized users such as, for example, auditors to allow for auditing the content of the tool storage devices. The auditors may present credentials to the inventory control system 1510 and upon successful authentication may be granted access to the tool storage device of the inventory control system 1510.

The lock down mode may be optionally set by the administrator to automatically occur at specific times during the working day, such as lunch time or end of shift. The lock down mode may also be set for a specific duration of time. The lock down mode may not be necessarily associated with an audit. However, if lock down mode is associated with an audit, the system may automatically go into an audit mode when a user with specific rights to access a tool storage device during lockdown and designated as the auditor opens the tool storage device.

As shown by the above discussion, functions relating to the inventory control system may be implemented on computers connected for communication via the components of a communication network, operating as a server or storage system as shown in FIGS. 8 and 15. Although special purpose devices may be used, such devices also may be implemented using one or more hardware platforms intended to represent a general class of data processing device commonly used to run "server" programming so as to implement the functions of the server 802, 1540 discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for performing inventory determination and various other functionalities of the inventory control system. The software code is executable by the general-purpose computer that functions as the inventory control system. In operation, the code is stored within the general-purpose computer platform. At other times, however, the software may be stored at other locations and/or transported for loading into the appropriate general-purpose computer system. Execution of such code by a processor of the computer platform enables the platform to implement the advanced functionalities of the inventory control system for monitoring removal and replacement of tools within tool storage device thereof, in essentially the manner performed in the implementations discussed and illustrated herein. Execution of such code by a processor of the computer platform also enables the platform to implement the methodology for enabling communications between inventory control system and remote systems written in different communication protocols.

Figure 18:
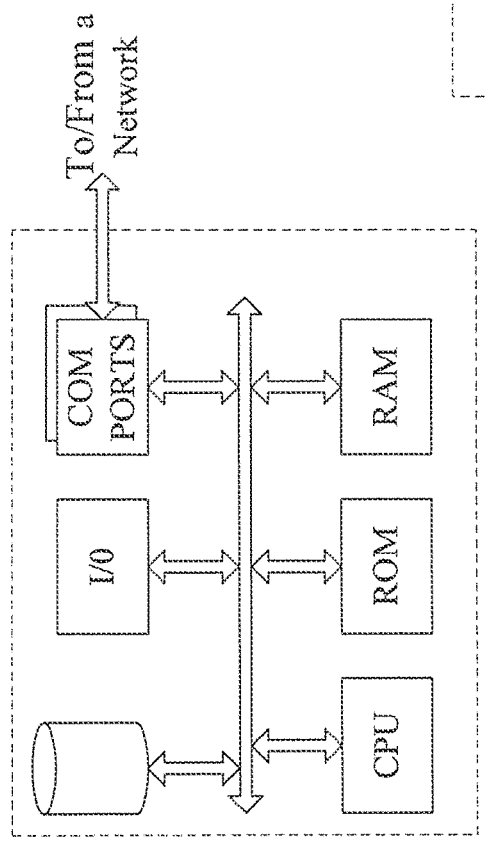
FIGS. 18 and 19 illustrate functional block diagram illustrations of general purpose computer hardware platforms.
Figure 19:
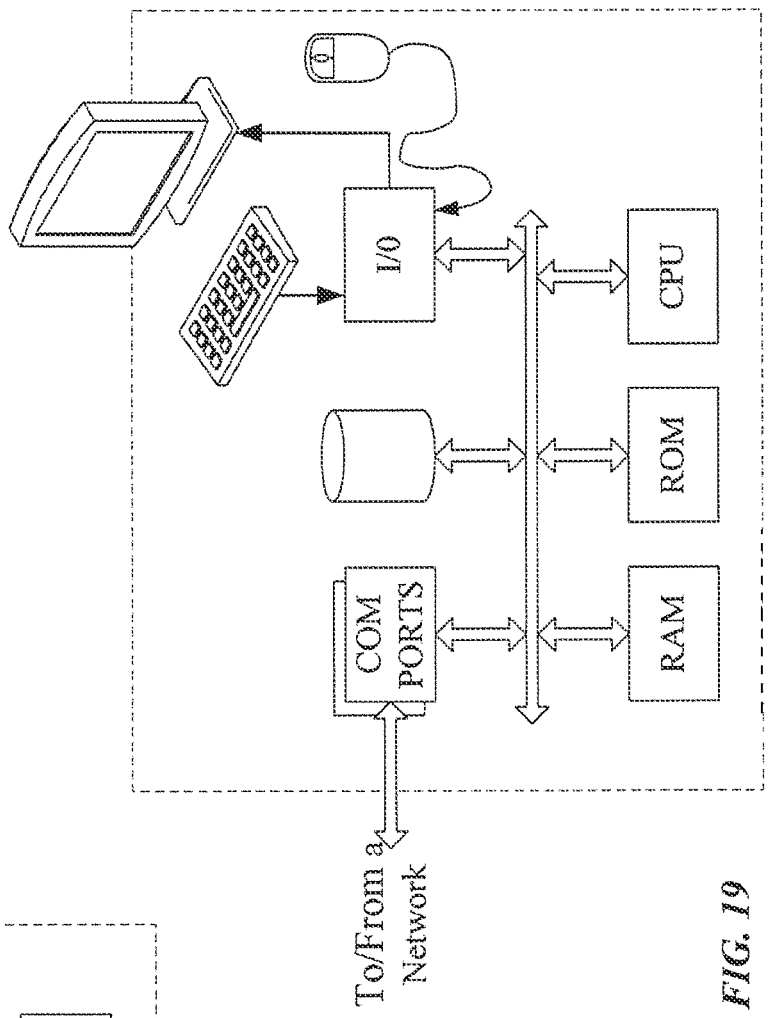

FIGS. 18 and 19 provide functional block diagram illustrations of general purpose computer hardware platforms. FIG. 18 illustrates a network or host computer platform, as may typically be used to implement a server. FIG. 19 depicts a computer with user interface elements, as may be used to implement a personal computer or other type of work station or terminal device, although the computer of FIG. 19 may also act as a server if appropriately programmed. It is believed that the general structure and general operation of such equipment as shown in FIGS. 18 and 19 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device (e.g., the inventory control system) similarly includes a data communication interface CPU, main memory and one or more mass storage devices for storing user data and the various executable programs (see FIG. 19). The various types of inventory control systems will also include various user input and output elements. For example, the inventory control system may include a keyboard and a cursor control/selection device such as a mouse, trackball, joystick or touchpad; and a display for visual outputs. A microphone and speaker enable audio input and output. Some other inventory control systems include similar but smaller input and output elements. The inventory control system may utilize touch sensitive display screens, instead of separate keyboard and cursor control elements. The hardware elements, operating systems and programming languages of such user terminal devices also are conventional in nature.

Hence, aspects of the methods of monitoring removal and replacement of tools within an inventory control system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server 802, 1540 to the inventory control system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the monitoring removal and replacement of tools within an inventory control system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Complex Filtering of Events in Data Log and Audit Images

According to this embodiment, an inventory control system for monitoring the removal and replacement of objects has at least one drawer or tray including storage locations for storing objects, and at least one image sensing device configured to form an image of the storage locations. A data processor is configured to receive information representing the image of the storage locations and data representing the usage of the objects associated with the image. The data processor is further configured to display audit images of the storage drawers or trays, and is also configured to apply complex filtering techniques to display the audit images according to user definable usage data fields associated with the audit images. The filtering technique comprises filtering out any object-specific events for objects other than an object of interest, and filtering out any container-specific events for containers other than a container of interest.

Automated tool control systems store event data and call up that data for review. Such log event data may include employee name, employee number, date, time, action, tool name, tool number, box name, box ID, drawer or tray, parent location, child location, and other pertinent data fields known to those of skill in the art.

Simple, or naïve, manual filtering provides only basic logic for field choices, and limits the events contained in the log files or audit images to be displayed to the user. Disadvantageously, not all relevant events can be displayed using manually selected field choices.

Each event that is generated in the system is tagged with an appropriate set of source identification numbers that allow unique identification of the item involved in the event. Thus, if a tool was issued from a toolbox to an employee, there would be a "TOOL ISSUED" event logged, with a number identifying the box, tool, drawer, and employee. If a box level event occurred (e.g., "BOX STARTUP"), then there would be a box identification logged, but no tool and employee identification values, since there are no tools or employees associated with that event. If a user wishes to filter the list of all events in the system, they could specify a target box, tool, employee, drawer, event type, drawer, time range, etc.

In this embodiment, complex filter logic is automatically applied to the log file data and/or stored images, and all relevant data related to a single event occurrence is presented chronologically on the tool control system's display. The filter logic is to first filter out any events that did not occur on the toolbox of interest ("the target toolbox"), then filter out any tool-specific events for tools other than the tool of interest ("the target tool") and filter out any drawer-specific events for drawers other than the drawer of interest ("the target drawer"). The list of filtered events is displayed to the user.

The logic of the automated complex filtering in this embodiment can be expressed in the following manner:

If (target_toolbox_match AND [target_tool_match OR {(not_a_tool_event AND target_drawer_match} OR {not_a_drawer_event AND not_a_tool_event}])

THEN display_event

In the above expression, "target_toolbox_match" indicates that the box ID recorded for an event matches the desired box ID from the filter, and "target_tool_match" indicates that the tool ID recorded for an event matches the desired tool ID from the filter. "Not_a_tool_event" means the event did not target a specific tool (e.g., the event is a drawer open). This could be determined by checking for an empty tool ID field, or by comparing the event type to a list the defines "not a tool event." "Target_drawer_match" indicates that the drawer ID recorded for an event matches the desired drawer ID from the filter. "Not_a_drawer_event" indicates the event did not target a specific drawer (e.g., the event is a hardware failure on the toolbox). This could be determined by checking for an empty drawer ID field or by comparing the event type to a list that defines "not a drawer event." "Display_event" indicates that the event is shown in the filtered list.

Figure 20:
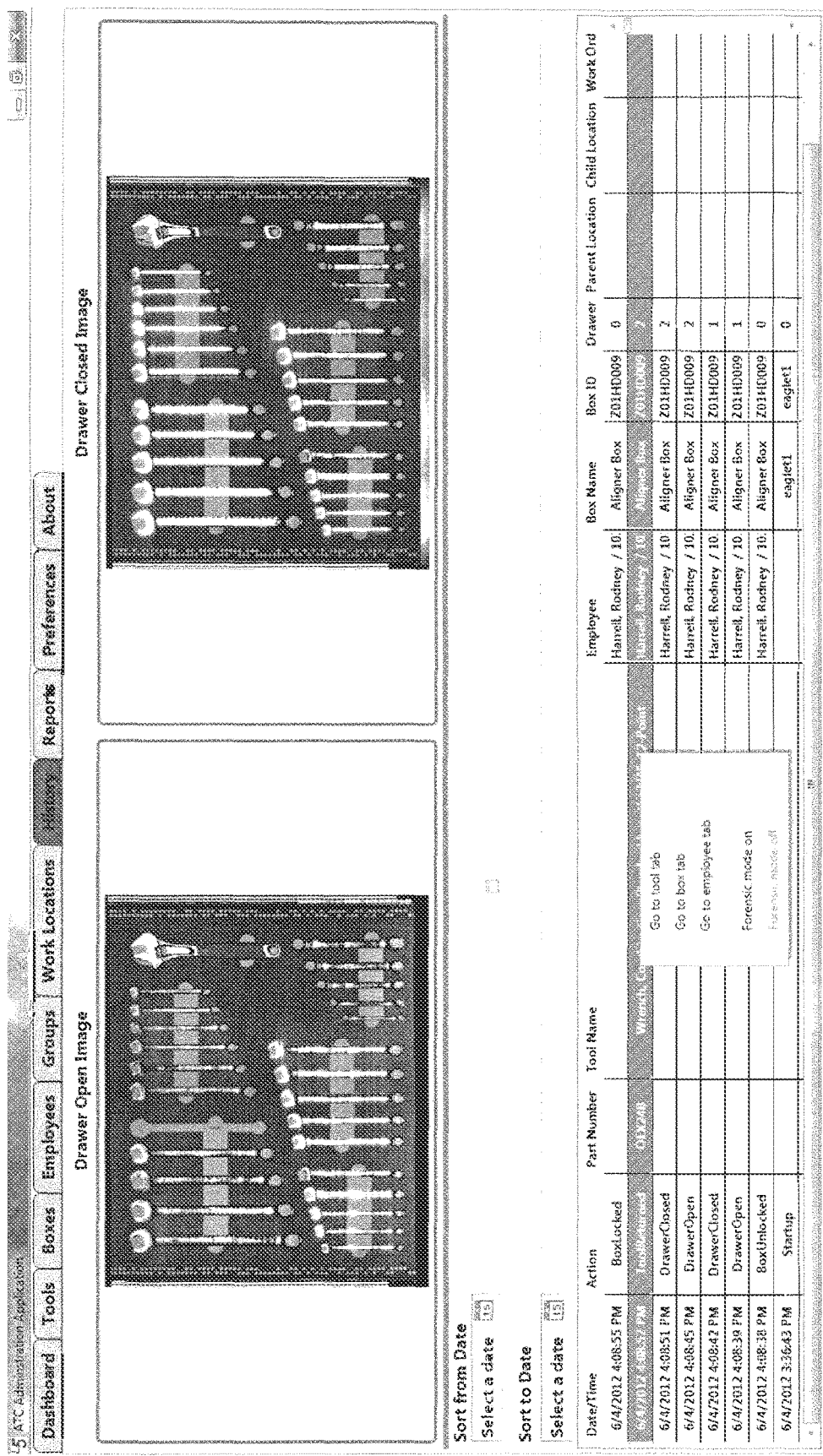
FIGS. 20 and 21 are illustrative images of an exemplary audit record and images taken during access to an exemplary system according to this disclosure.
Figure 21:
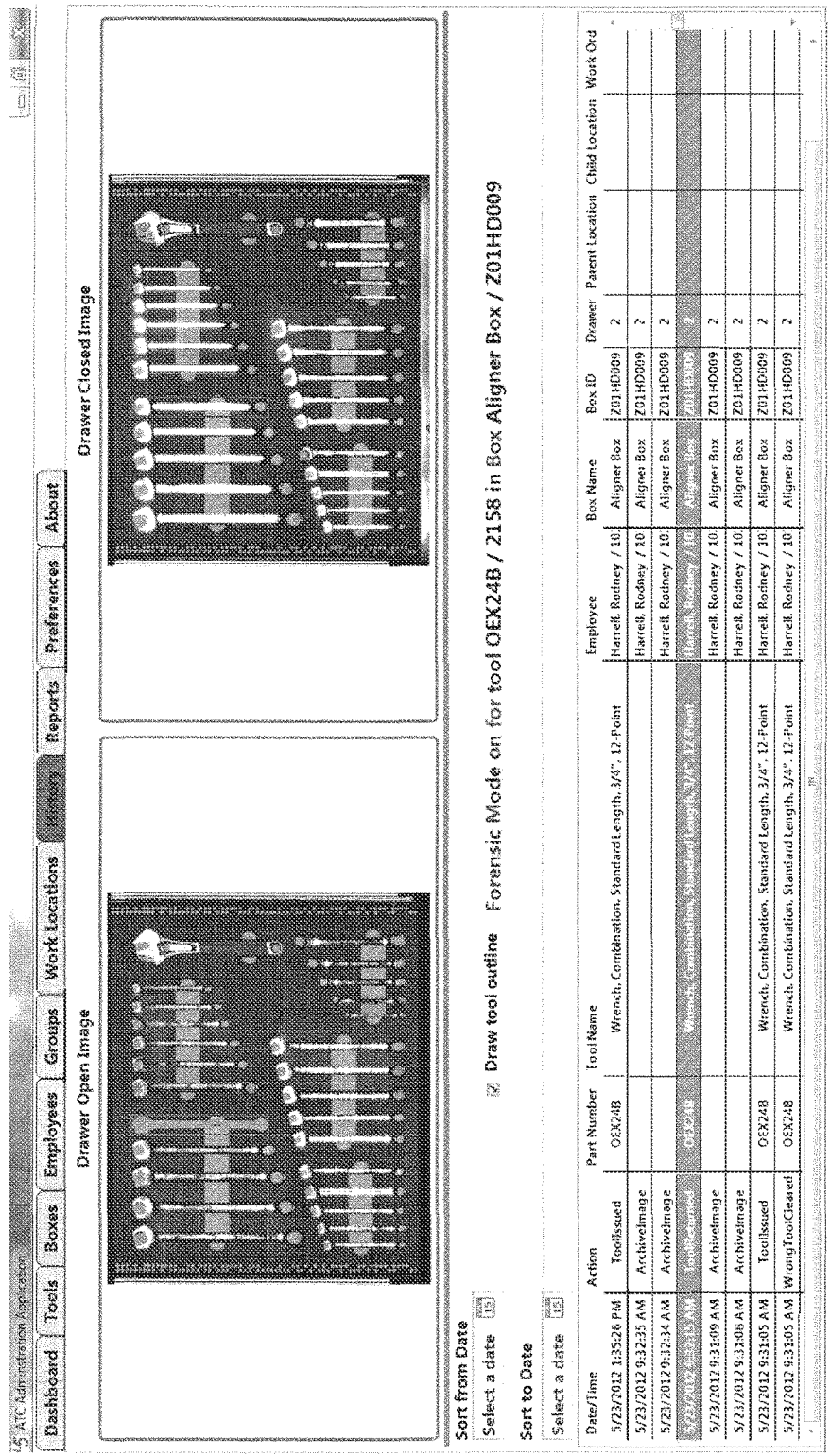

To activate this embodiment in an automated tool control system, the user right clicks on a listed tool event shown in a table on the display screen. A pop-up box appears on the screen with a choice of "Forensics On" or "Forensics Off" as shown in FIG. 20. When "Forensics On" is chosen, the ATC invokes the complex filtering algorithms and applies them to the available data. The box then displays tool level events if they match the target tool, drawer or tray level events if they match the target drawer or tray, and box level events (see FIG. 21).

The events described above are displayed in chronological order. The displayed events are individually searchable and can include, but are not limited to, the following:
Date/Time
Action
Part Number
Tool Name
Employee
Box Name
Box ID
Drawer or tray
Parent Location
Child Location The benefit of this embodiment is that in two button clicks, the user has all relevant data related to a tool event displayed, rather than having to manually manipulate filters or fields to research the same data. For example, if at the end of a shift during a scheduled toolbox audit, tool "Pick, Radiator Hose, Soft Grip, 10.30" is missing from drawer or tray 3 in the box named "Mechanical Lab," the administrator user right clicks on the issued tool line item displayed on the screen for tool "Pick, Radiator Hose, Soft Grip, 10.30". The Forensics on/Forensics off pop-up block appears and the user checks Forensics on (see FIG. 20).

The screen then displays all relevant and related events for Tool Box "Mechanical Lab," drawer 3, tool "Pick, Radiator Hose, Soft Grip, 10.30". The user can then quickly and easily search the displayed data, determine when the last time the tool was recognized as present, determine the last issue and to whom it was issued.

The same process is applied to other situations, such as incorrectly issued tools, wrong tools, user accesses, tool issue and any combination of the items listed above.

Simultaneous Zoom and Pan for Two Sequential Images

According to this embodiment, an inventory control system for monitoring the removal and replacement of objects has at least one drawer or tray including storage locations for storing objects, at least one image sensing device configured to form an image of the storage locations, and a display device. A data processor is configured to receive information representing images of the storage locations, and is further configured to display a plurality of images of the storage locations simultaneously on the display. The data processor is also configured to link the plurality of images to allow simultaneous zoom and pan of the images.

In this embodiment, the automated tool storage device administration computer displays at least one image of the storage device drawers or trays, which images are created as the drawers or trays are opened or closed. Individual images of a section of each drawer or tray layer are obtained and sewn together by a computer program run on each camera, as explained herein. These images are uploaded to the computer (data processor) residing on the individual tool storage device. The data processor combines the images from the cameras to produce a complete image of the entire scanned area of the drawer or tray (see, e.g., FIGS. 20 and 21). This complete drawer or tray image is sent to the administrator's computer via a network and stored in memory or in a network database where it is then available to the administrator.

The administrator can call up individual image files containing an open or closed scanned drawer or tray image, or the administrator can call up more than one full drawer or tray image. These images are associated with open or closed scans and can be sequential in time. The administrator cannot call up a plurality of non-sequential images to be displayed side by side; the images must be sequential.

If an administrator calls up more than one sequential image of the same drawer or tray, one on the open scan and one on the closed scan, they are then able to compare the images for differences. This embodiment enables the two simultaneously displayed sequential images of the same drawer or tray to be linked together so that they pan and zoom together. This provides ease of use.

Those of ordinary skill in the art will appreciate that pan & zoom features are commonplace in software that displays images, and will therefore understand how to implement this embodiment. A typical implementation captures a "mouse down" event from the user interface and calculates a transform that translates the displayed image's horizontal and vertical offset based on subsequent mouse movement (pan). Mouse wheel scroll events are captured and used to apply a scale transform to the displayed image (zoom). Other user interface features (scroll bars, buttons, etc.) may be used for the same purpose. The administrator software captures user pan & zoom interface requests for either of two simultaneously displayed images, and applies a transform equally to both displayed images.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. An inventory control system for monitoring removal and replacement of objects stored in the system, the system comprising:
   a plurality of storage containers, each including a plurality of storage locations for storing objects;
   an image sensing device configured to capture image data of the containers, including image data of the plurality of storage locations;
   a display device; and
   a data processor configured to:
   receive information representing captured images of the storage locations and data representing usage or status of the objects associated with the images;
   display on the display device audit images of the storage container; and
   apply, based on a forensics mode, a filtering technique to display the audit images according to the status or user definable usage data fields associated with the audit images;
   wherein the filtering technique is for selecting audit images associated with one event out of a plurality of events occurring in the system, and the filtering technique comprises filtering out any object-specific events for objects other than an object of interest, and filtering out any container-specific events for containers other than a container of interest.

2. The inventory control system of claim 1, wherein the data processor is configured to receive the information based on image data from the image sensing device.

3. The inventory control system of claim 1, wherein the data processor is configured to display the audit images in a simultaneous zoom and pan configuration.

4. The inventory control system of claim 1, wherein the data processor is configured to display the audit images of the storage container images chronologically according to the one event.

5. The inventory control system of claim 1, wherein the data processor is configured to apply the filtering technique based on the filtering technique comprising filtering according to at least one of: target box, tool, object, employee, drawer, event type, drawer, or time range.

6. The inventory control system of claim 1, wherein the data processor is further configured to search the plurality of events based on a temporal parameter, action, part number, tool name, object name, employee name, employee number, box name, box identifier, drawer, tray, parent location, or child location.

7. The inventory control system of claim 1, wherein the data processor is further configured to display all events of the plurality of events corresponding to the object of interest or the container of interest.

8. The inventory control system of claim 1, wherein the data processor is further configured to store log event data.

9. The inventory control system of claim 1, wherein the plurality of events comprise at least one of: a tool issue event, an object issue event, an object return event, a toolbox event, a box level event, or a drawer event.

10. The inventory control system of claim 1, wherein each event of the plurality of events is tagged with source identification numbers.

11. A method for monitoring removal and replacement of objects stored in an inventory control system, the method comprising:
    receiving information representing captured images of a plurality of storage locations and data representing usage of the objects associated with the images;
    displaying, on a display device, audit images of the storage container; and
    applying, based on a forensics mode, a filtering technique to display the audit images according to user definable usage data fields associated with the audit images;
    wherein the filtering technique is for selecting audit images associated with one event out of a plurality of events occurring in the system, and the filtering technique comprises filtering out any object-specific events for objects other than an object of interest, and filtering out any container-specific events for containers other than a container of interest.

12. The method of claim 11, wherein receiving the information comprising receiving the information based on image data from an image sensing device.

13. The method of claim 11, wherein displaying the audit images comprises displaying the audit images in a simultaneous zoom and pan configuration on the display device.

14. The method of claim 11, wherein displaying the audit images comprises displaying display the audit images chronologically according to the one event.

15. The method of claim 11, wherein applying the filtering technique comprises applying the filtering technique based on the filtering technique comprising filtering according to at least one of: target box, tool, object, employee, drawer, event type, drawer, or time range.

16. The method of claim 11, further comprising searching the plurality of events based on a temporal parameter, action, part number, tool name, object identifier, employee name, employee number, box name, box identifier, drawer, tray, parent location, or child location.

17. The method of claim 11, further comprising displaying all events of the plurality of events corresponding to the object of interest or the container of interest.

18. The method of claim 11, further comprising storing log event data.

19. The method of claim 11, wherein the plurality of events comprise at least one of: a tool issue event, an object issue event, a tool return event, an object return event, a toolbox event, a box level event, or a drawer event.

20. The method of claim 11, wherein each event of the plurality of events is tagged with source identification numbers.

* * * * *